July 14, 1959

O. B. ECCHER 2,894,559

LAMINATING MACHINE

Filed Feb. 21, 1957

INVENTOR.
Oreste B. Eccher
BY
James G. Bedell
ATTORNEY,

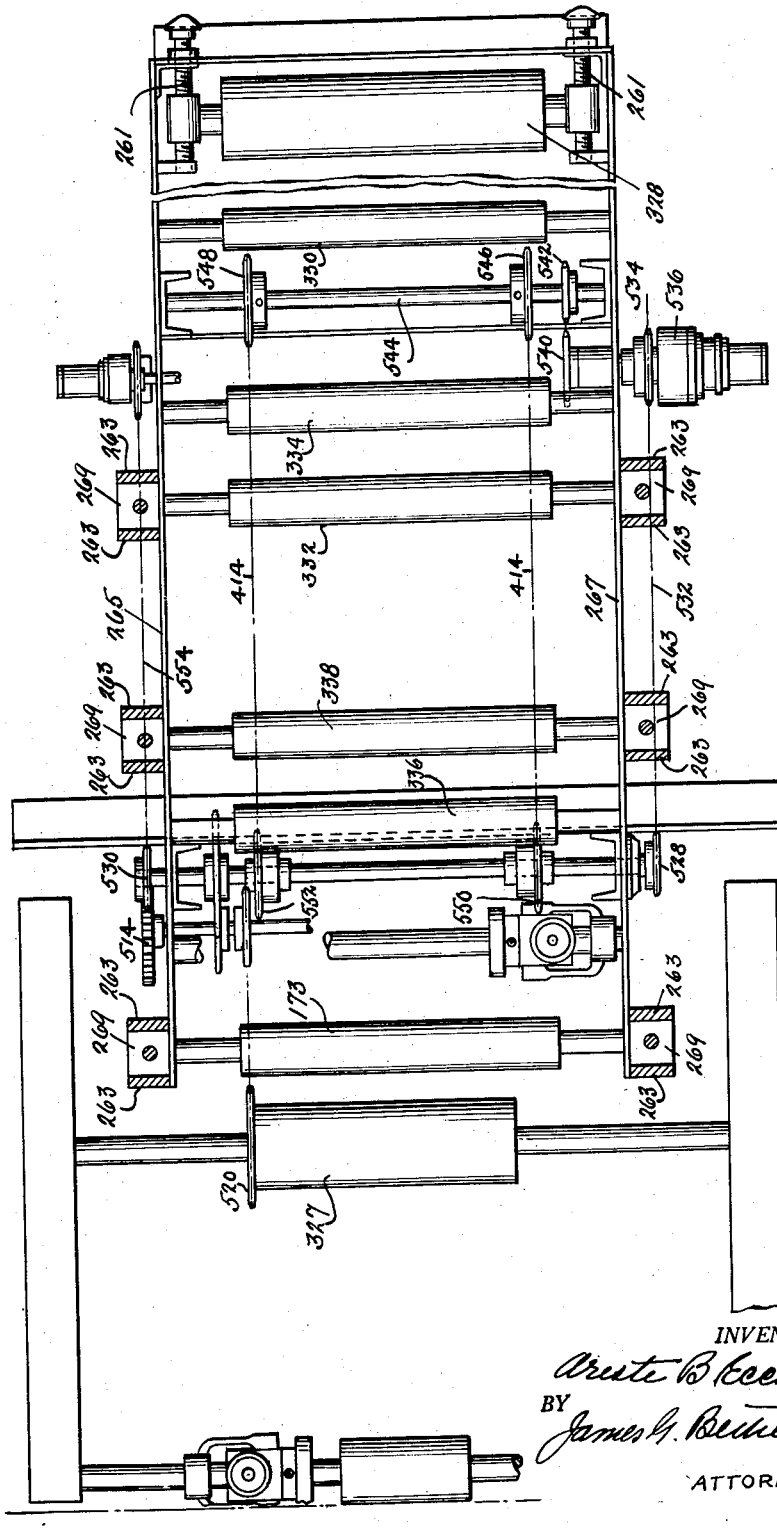

July 14, 1959  O. B. ECCHER  2,894,559
LAMINATING MACHINE
Filed Feb. 21, 1957  27 Sheets-Sheet 7
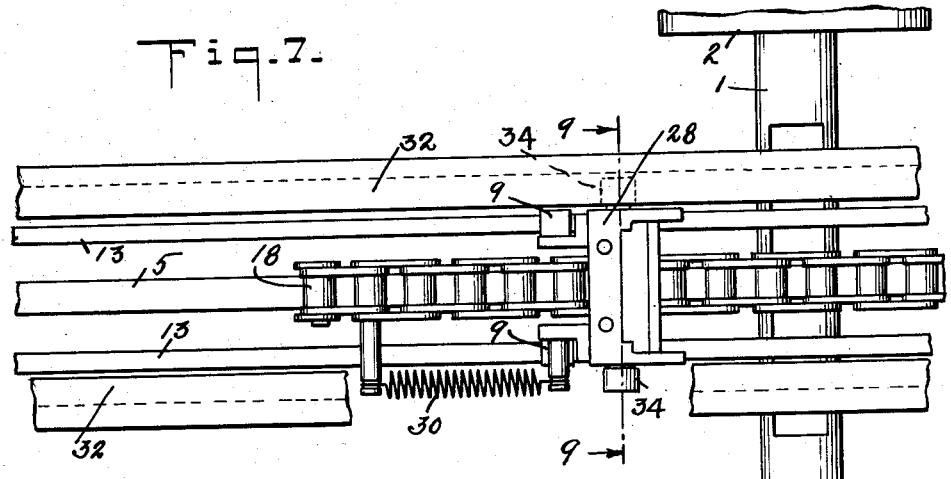
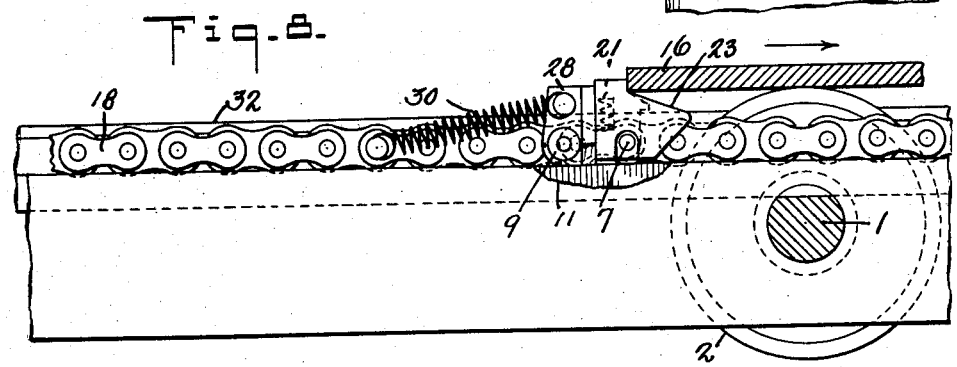
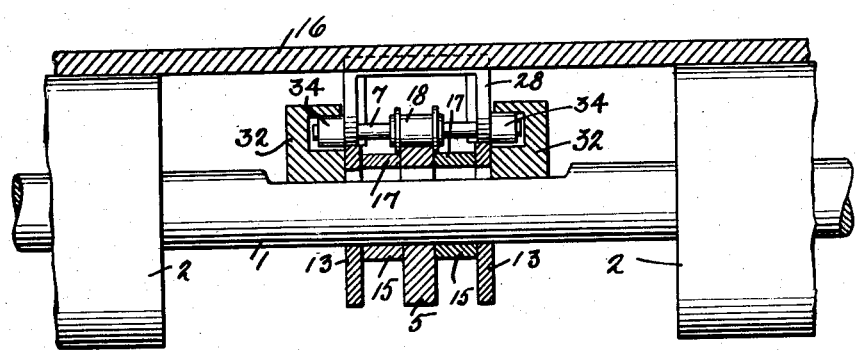
INVENTOR
Ante B. Eccher
BY
James H. Bewell
ATTORNEY July 14, 1959     O. B. ECCHER     2,894,559
LAMINATING MACHINE
Filed Feb. 21, 1957                      27 Sheets-Sheet 8
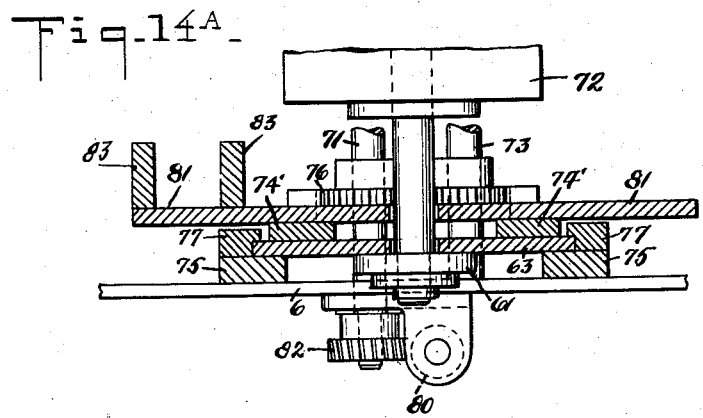
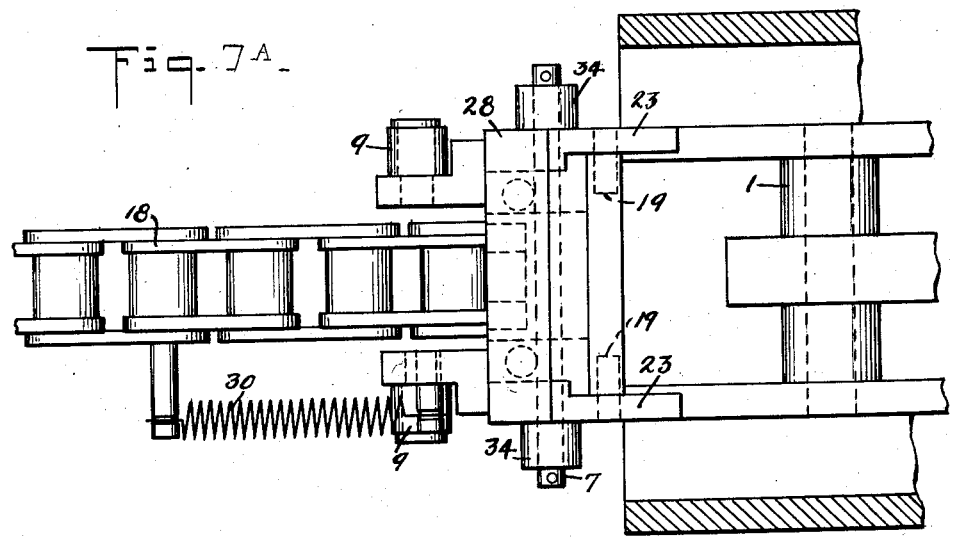
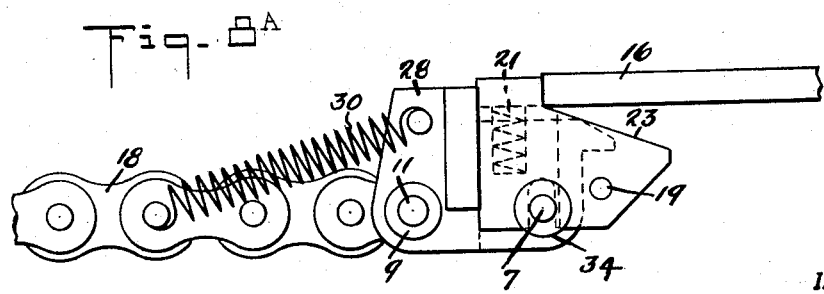
INVENTOR.

July 14, 1959
O. B. ECCHER
2,894,559
LAMINATING MACHINE
Filed Feb. 21, 1957
27 Sheets-Sheet 9
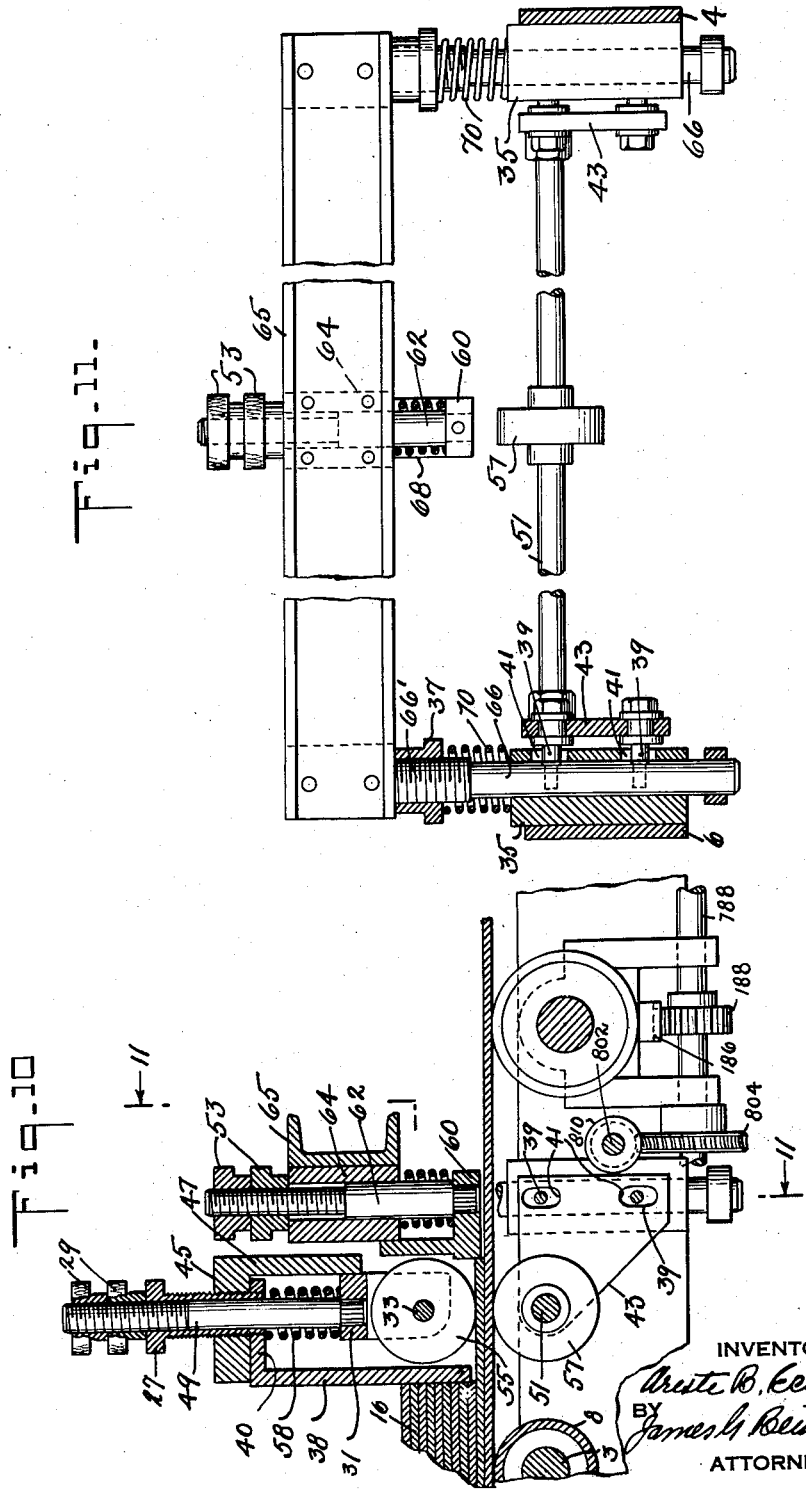
INVENTOR
Oreste B. Eccher
BY
James G. Bestull
ATTORNEY

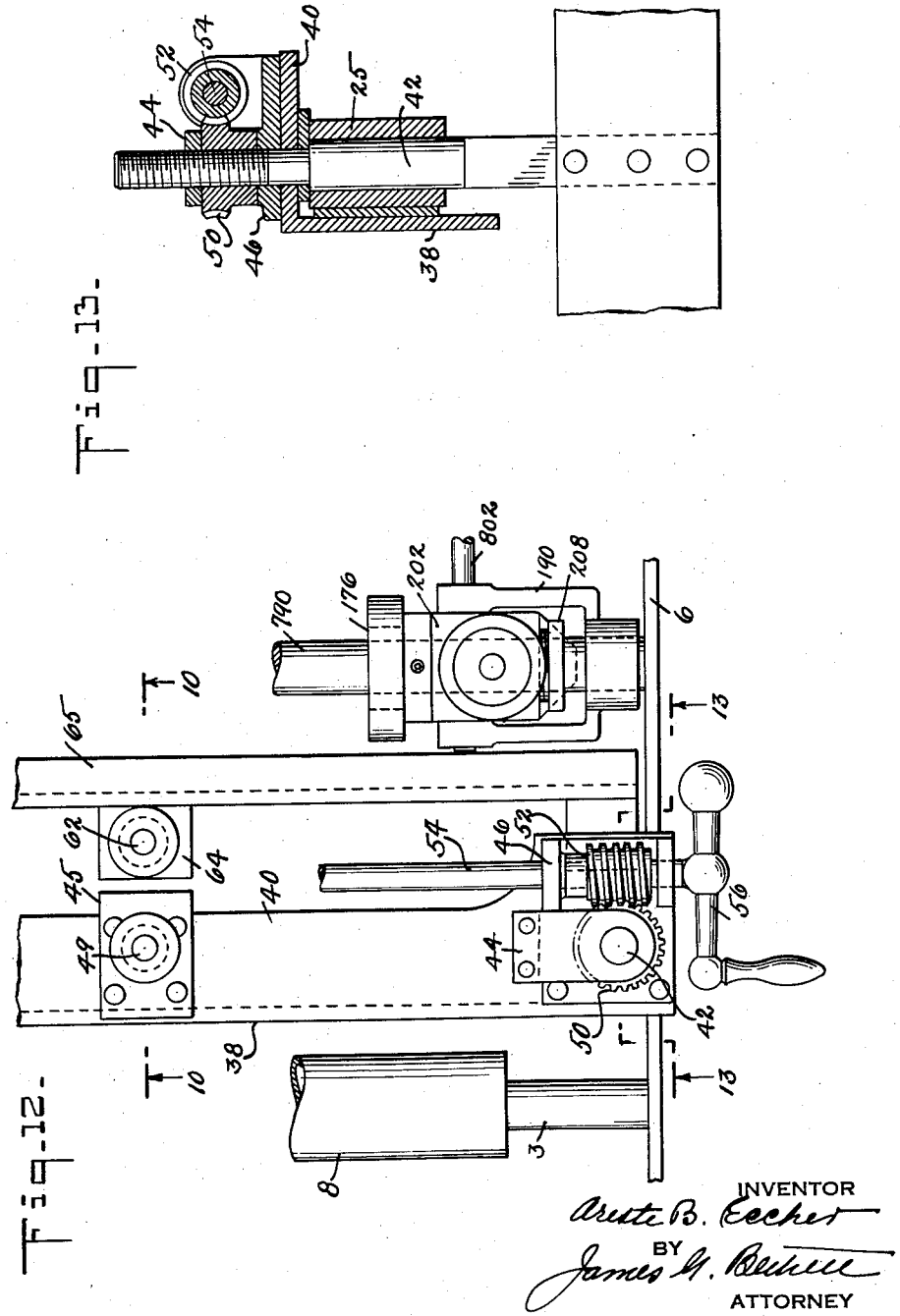

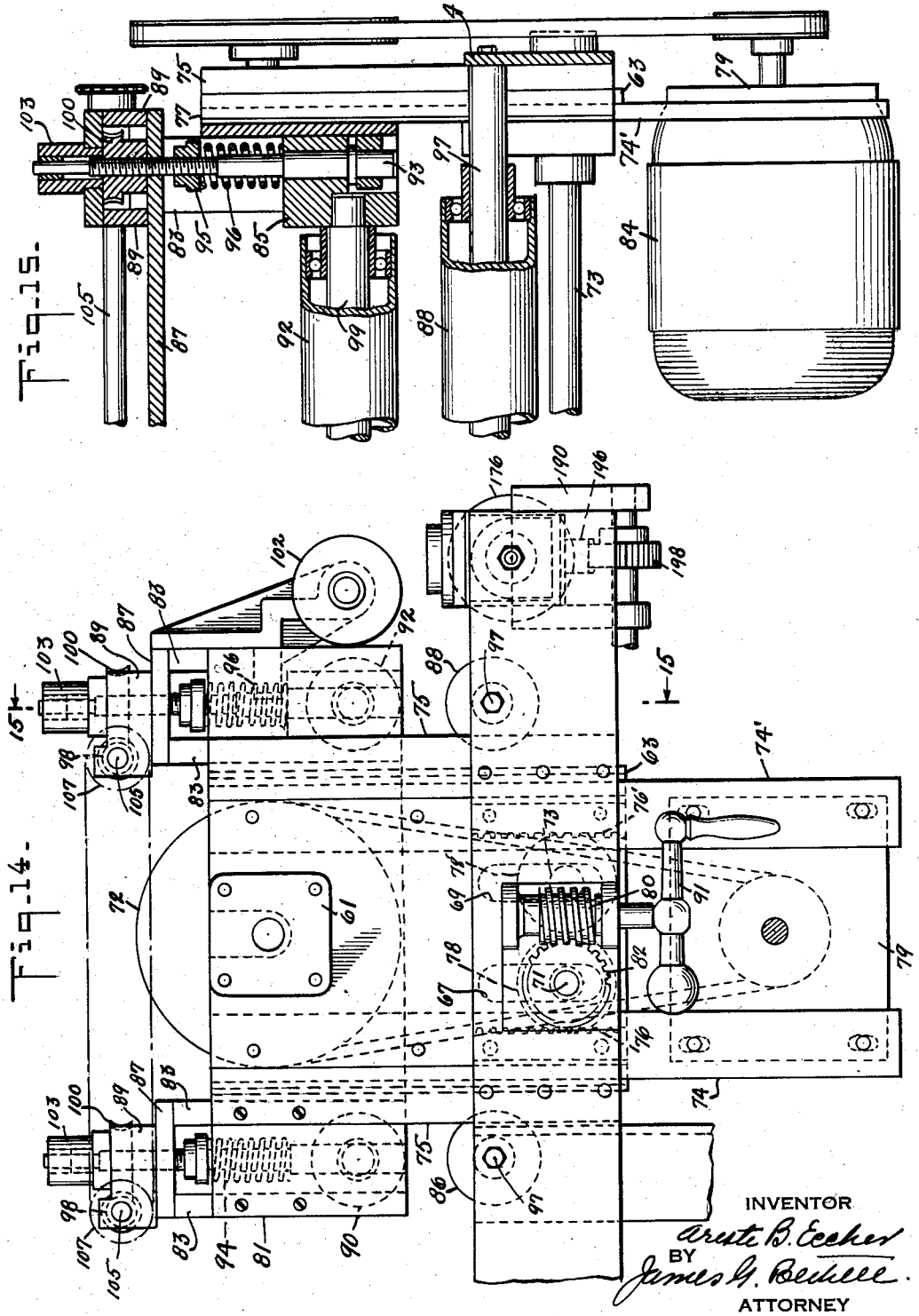

July 14, 1959     O. B. ECCHER     2,894,559
LAMINATING MACHINE
Filed Feb. 21, 1957     27 Sheets-Sheet 12
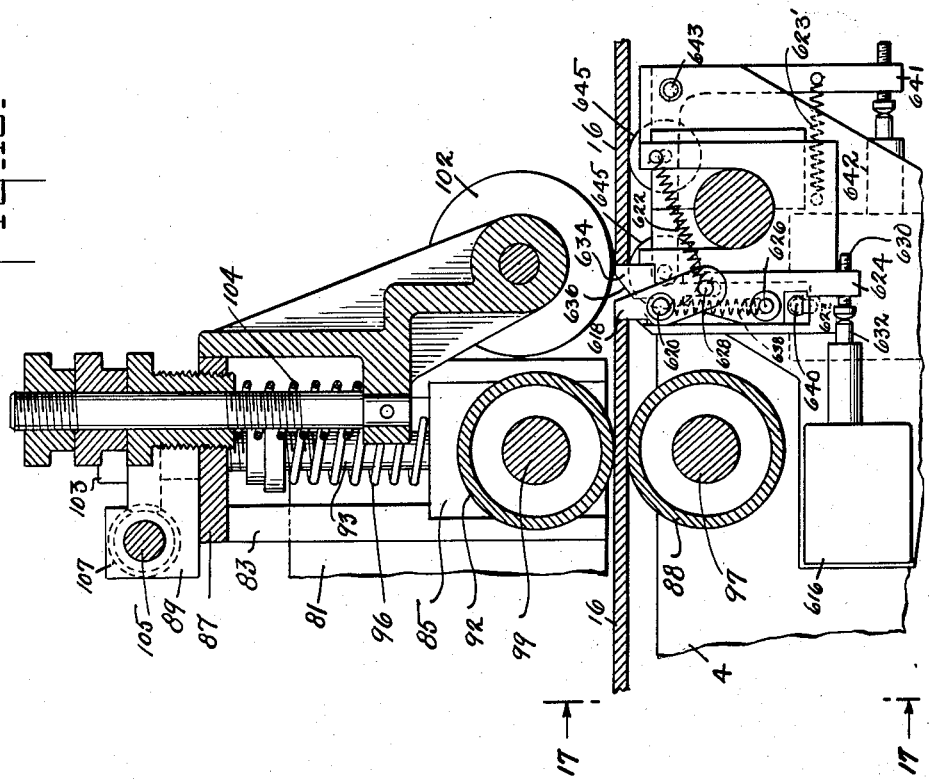
INVENTOR
Oreste B. Eccher
BY James G. Bethell
ATTORNEY

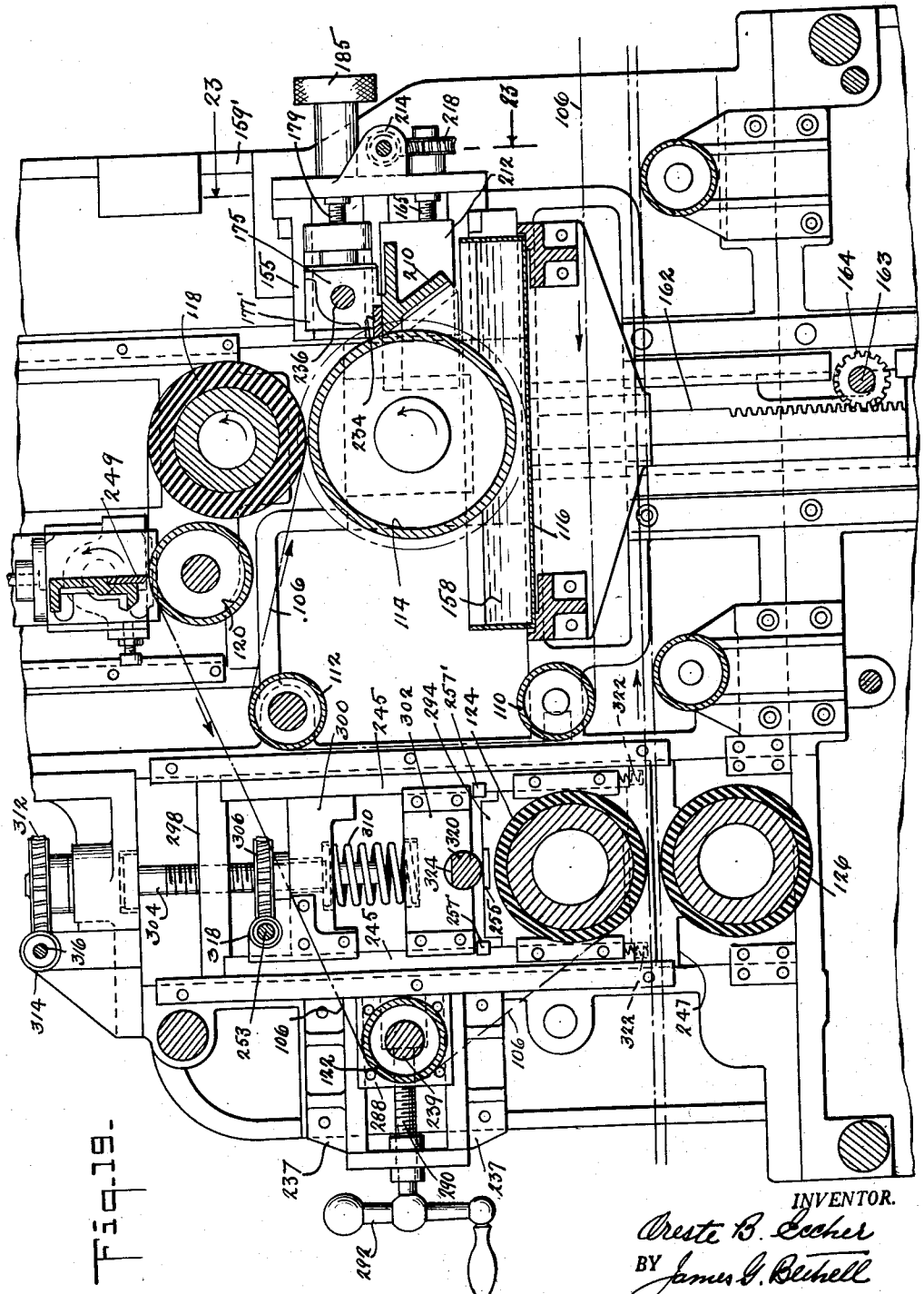

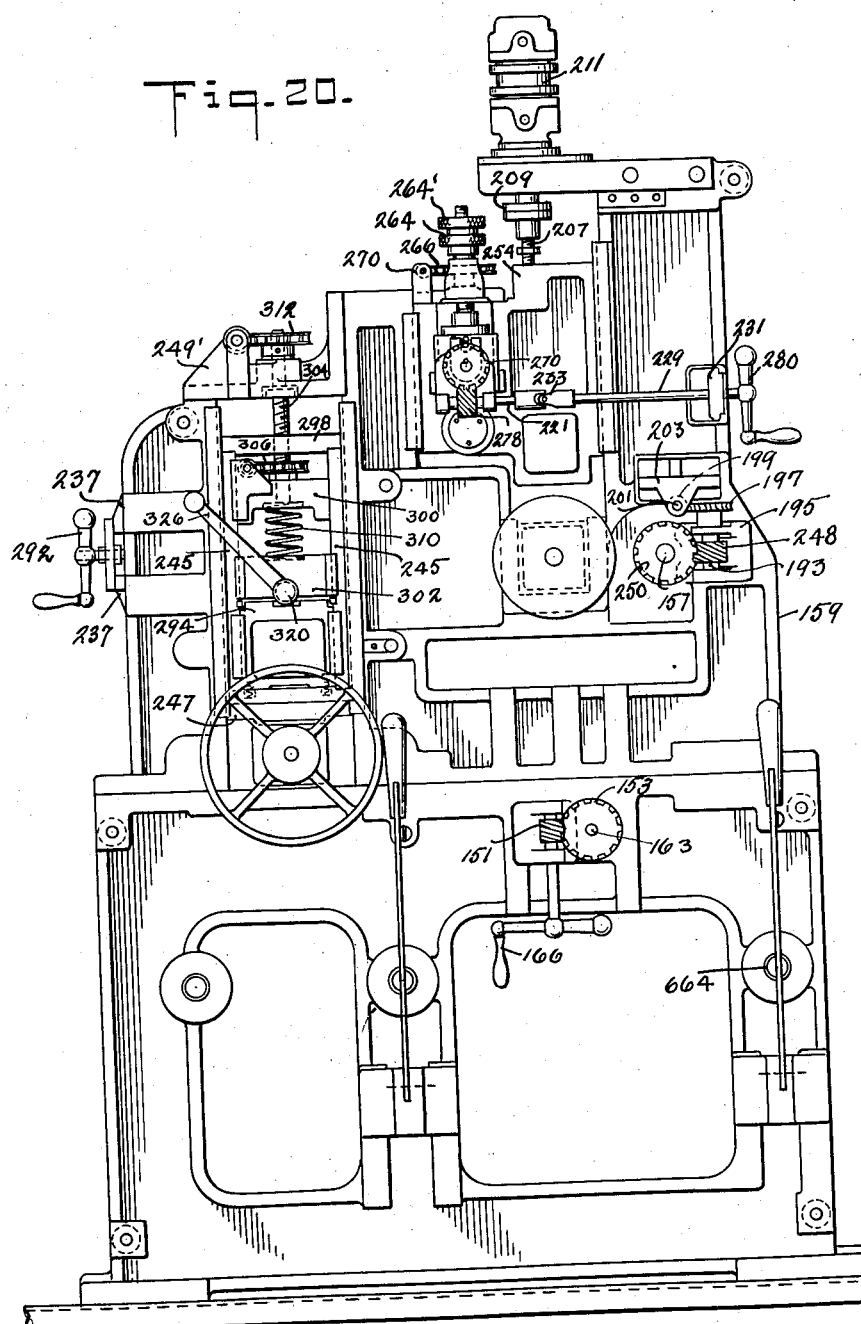

July 14, 1959
O. B. ECCHER
2,894,559
LAMINATING MACHINE
Filed Feb. 21, 1957
27 Sheets-Sheet 15
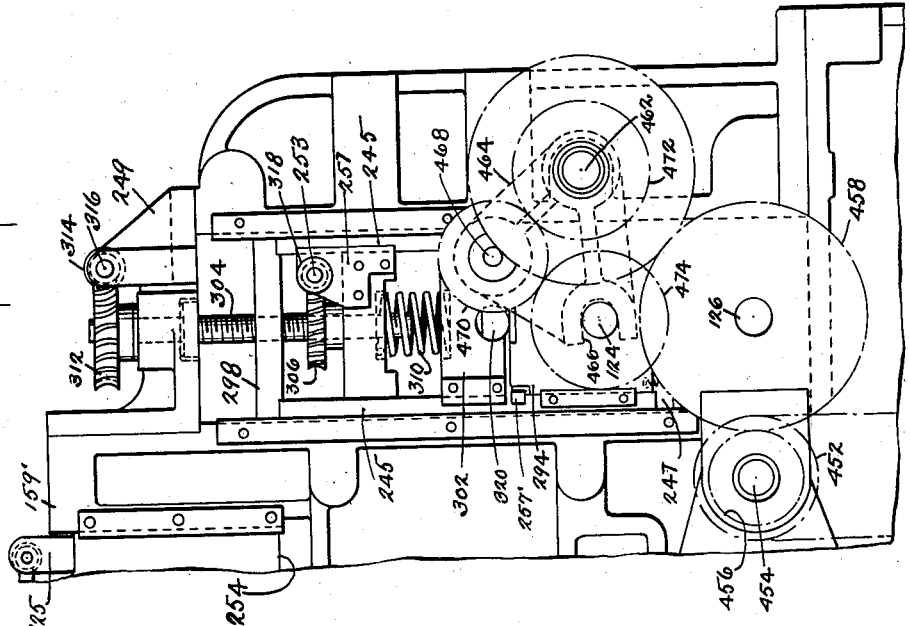
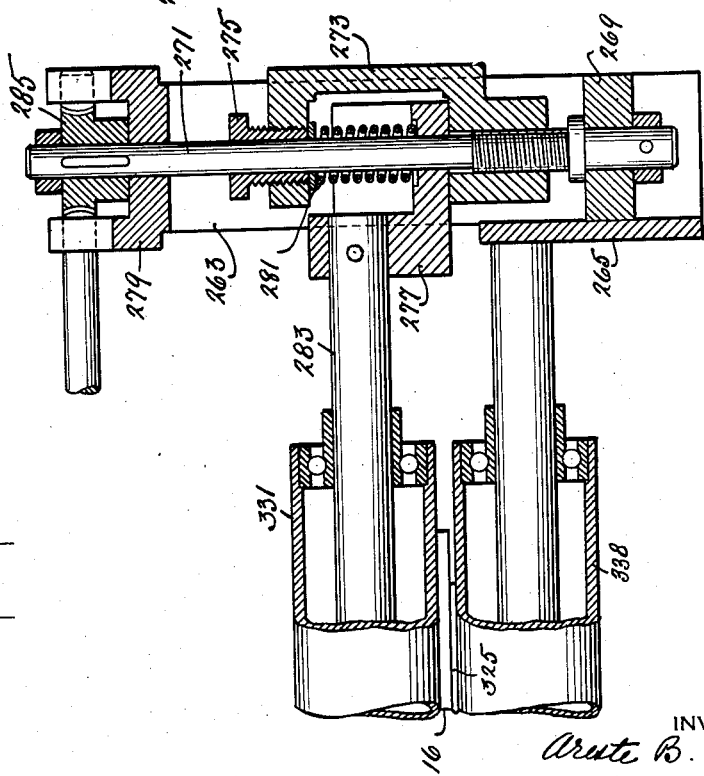
INVENTOR
Ariste B. Eccher
BY
James G. Bethell
ATTORNEY

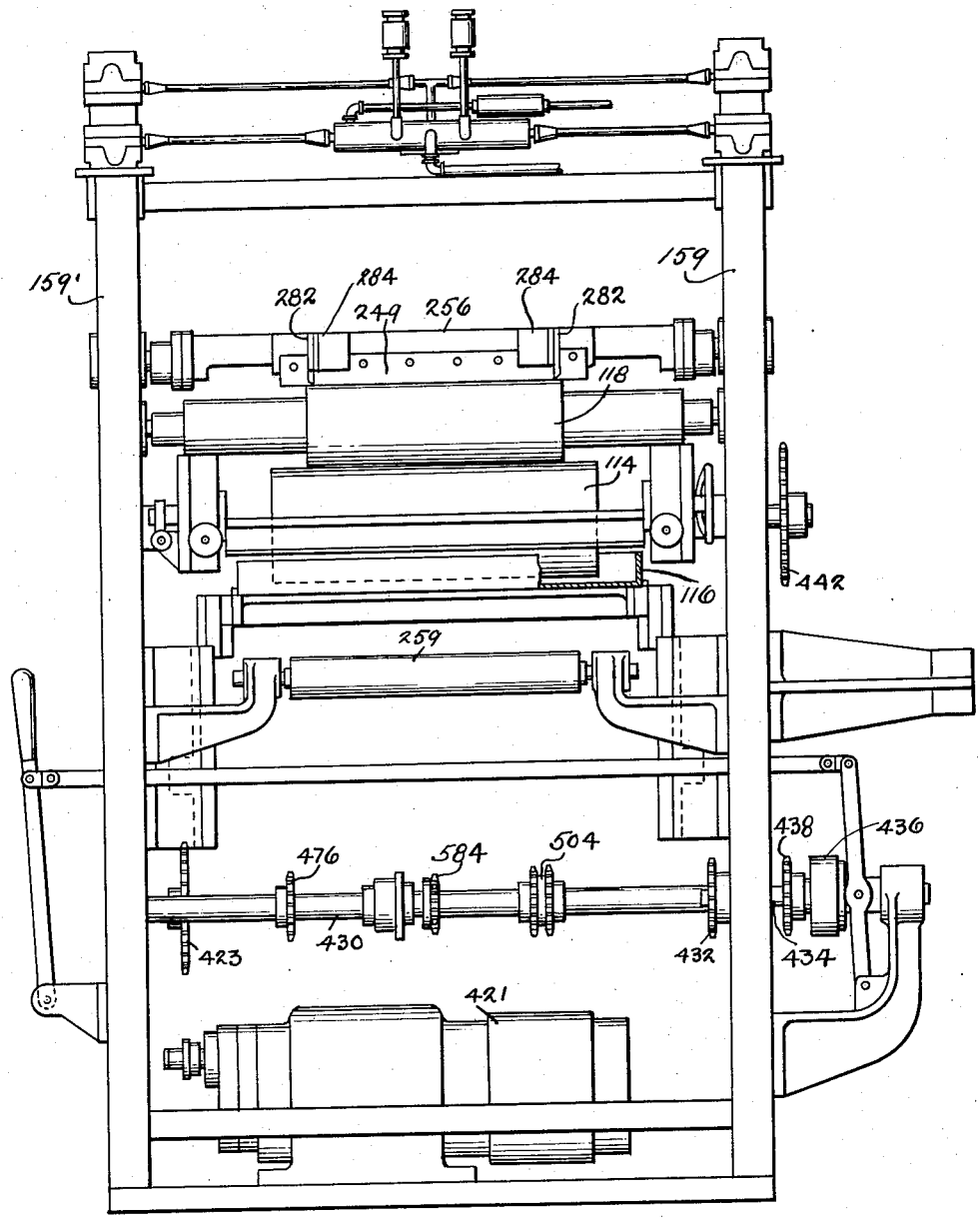

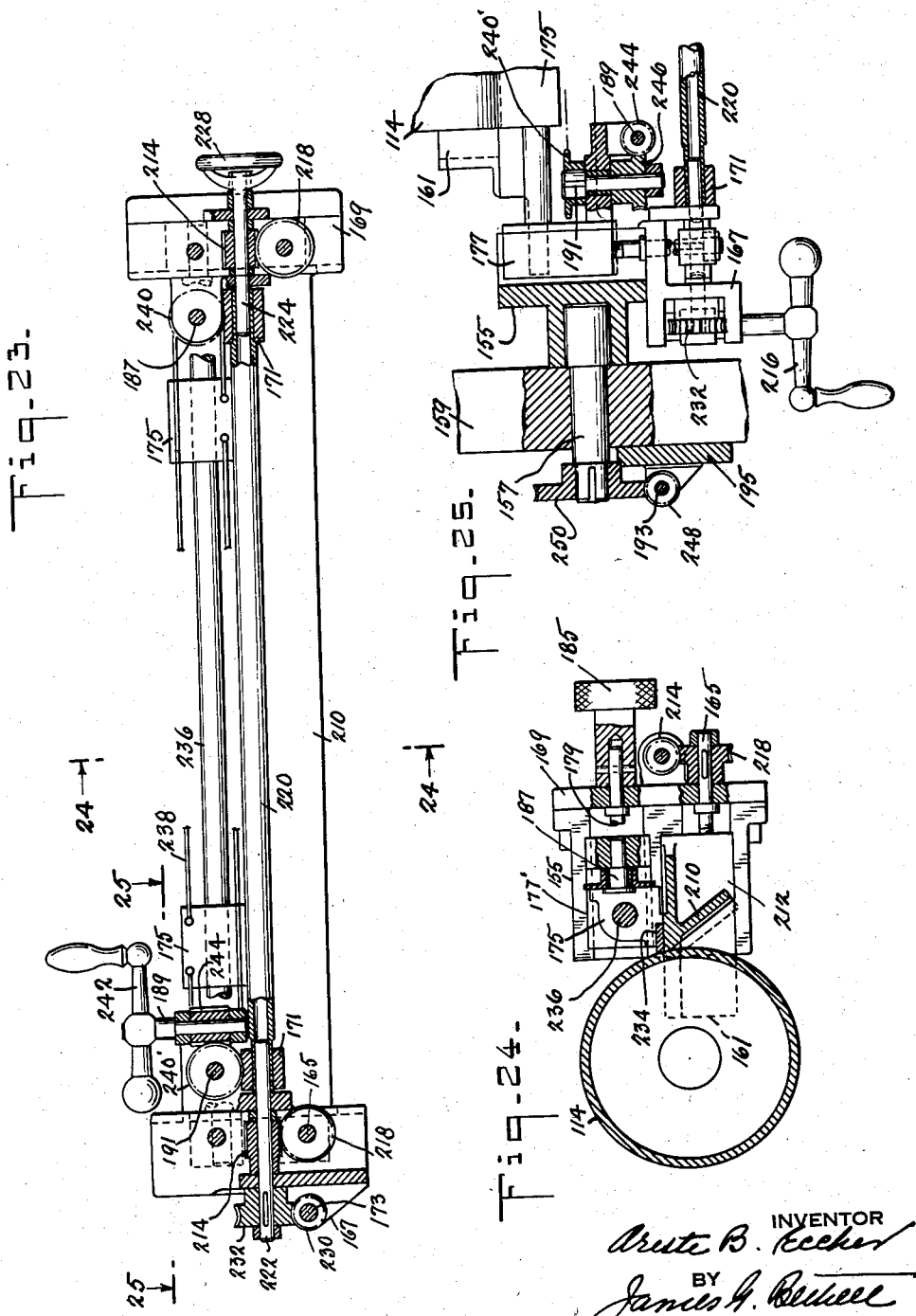

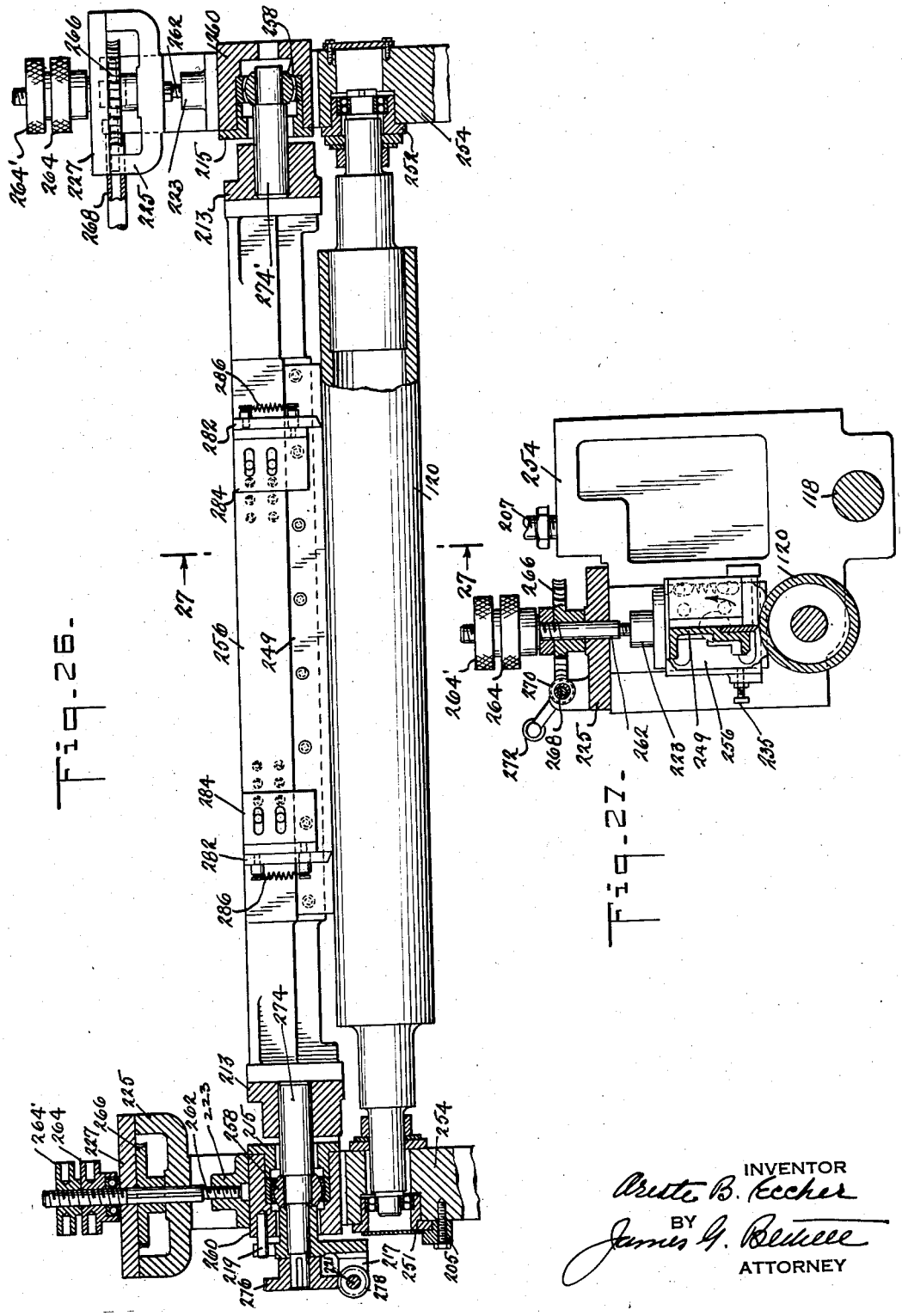

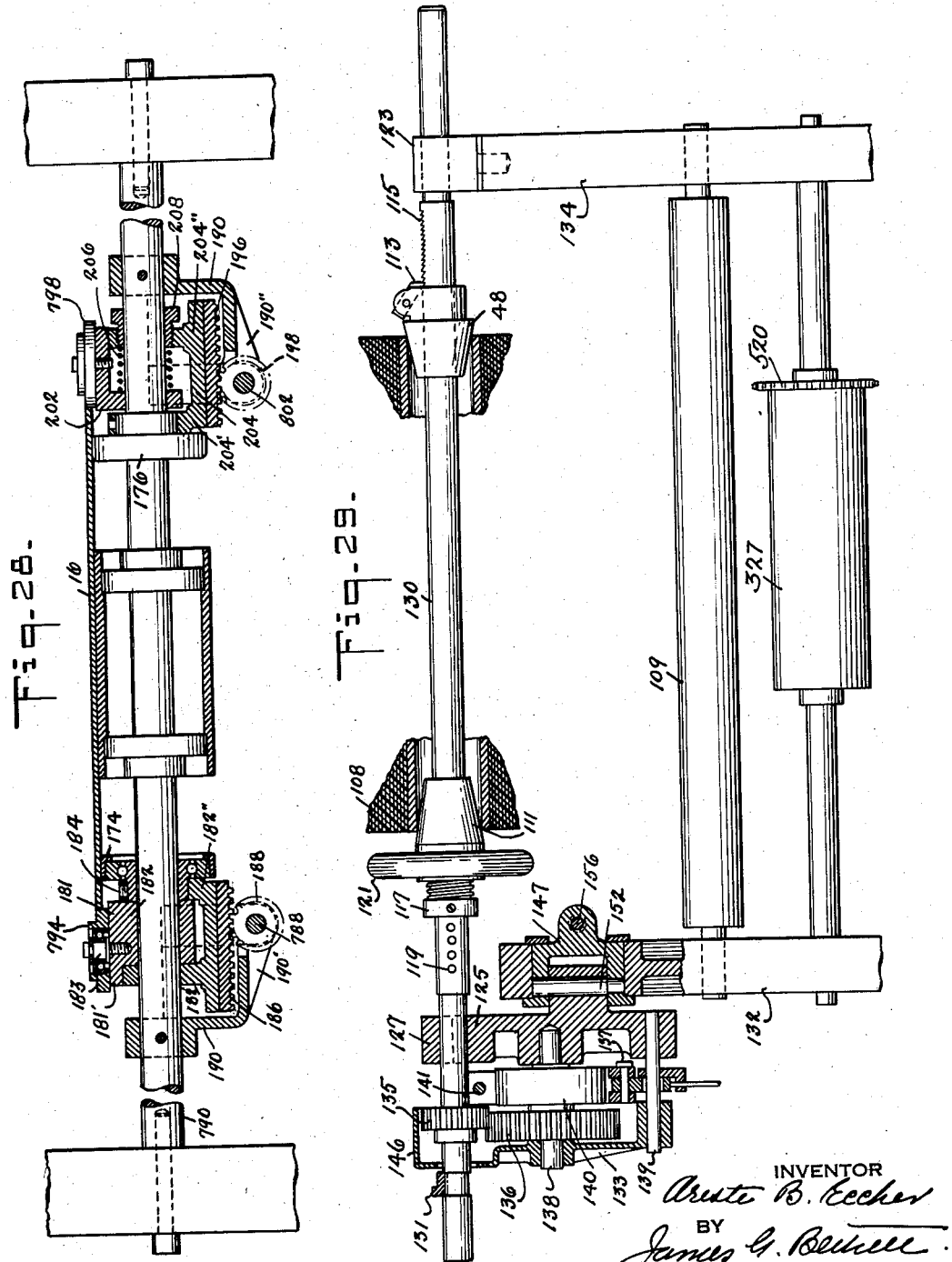

July 14, 1959  O. B. ECCHER  2,894,559
LAMINATING MACHINE
Filed Feb. 21, 1957  27 Sheets-Sheet 20
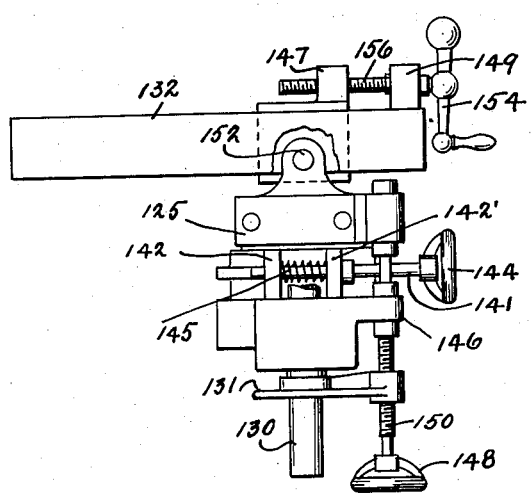
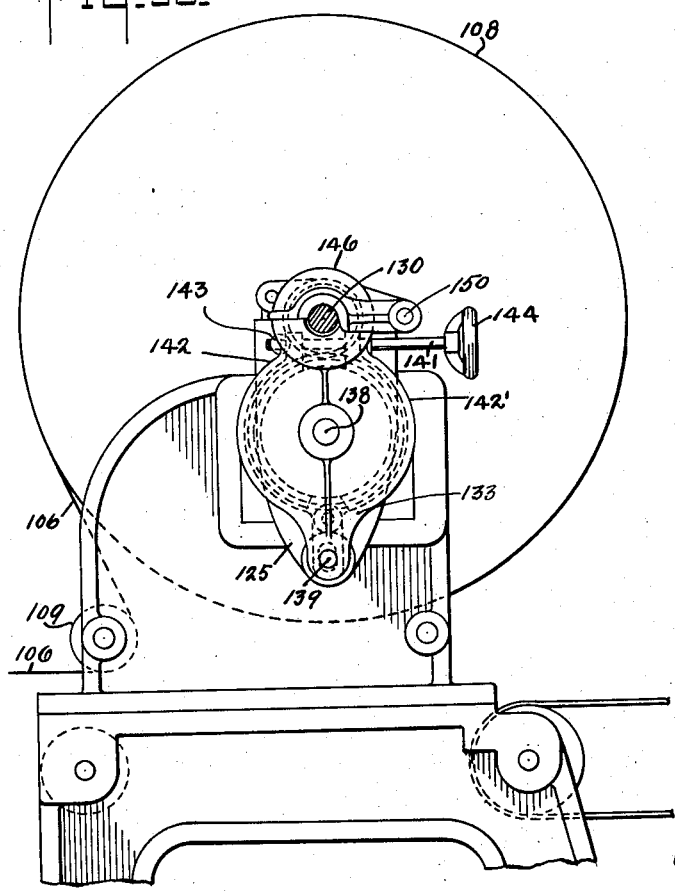
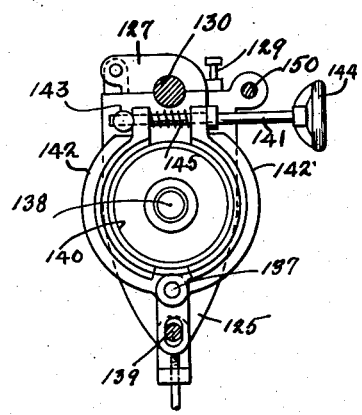
INVENTOR
Orute B. Eccher
BY
James H. Bechtell
ATTORNEY

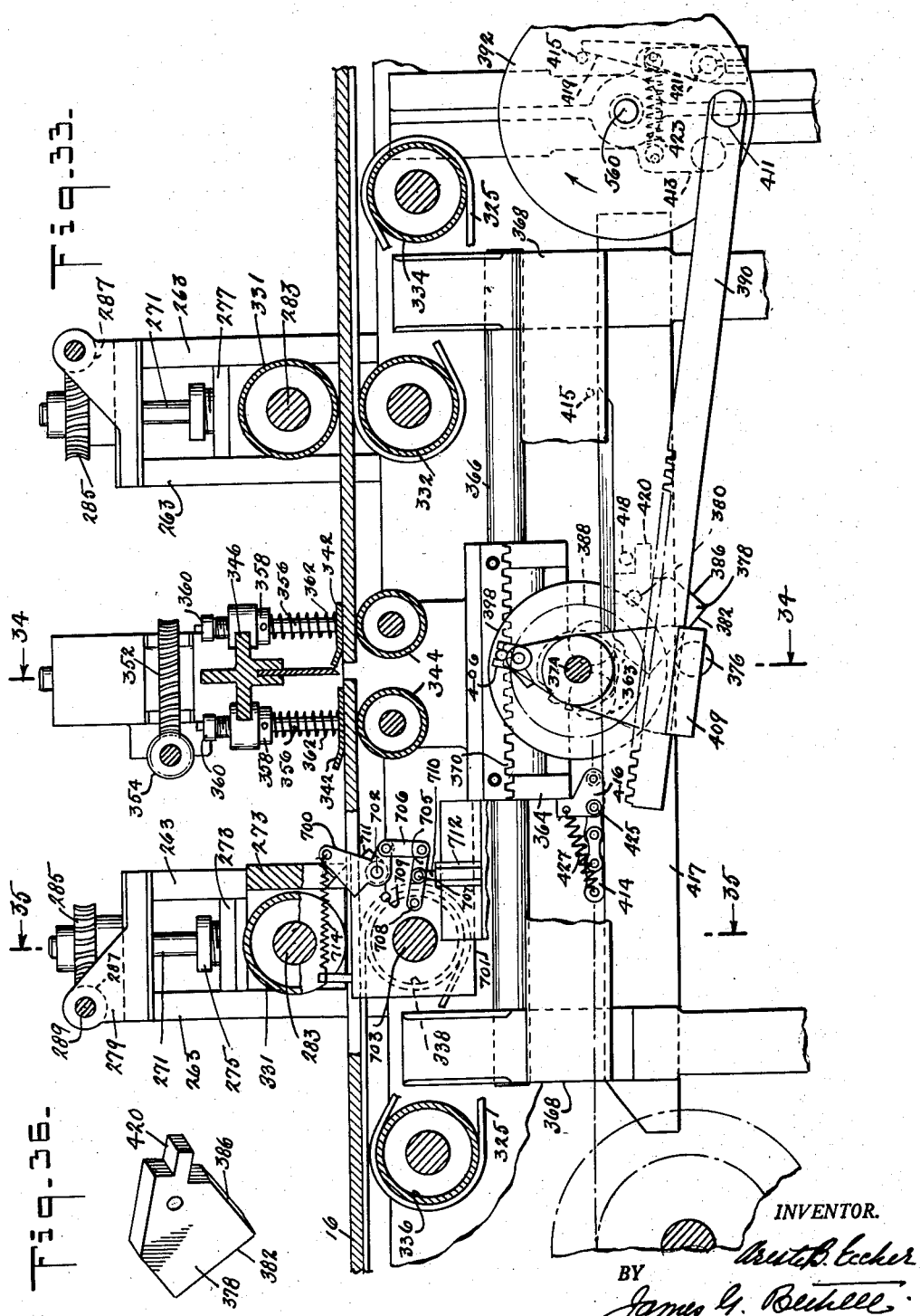

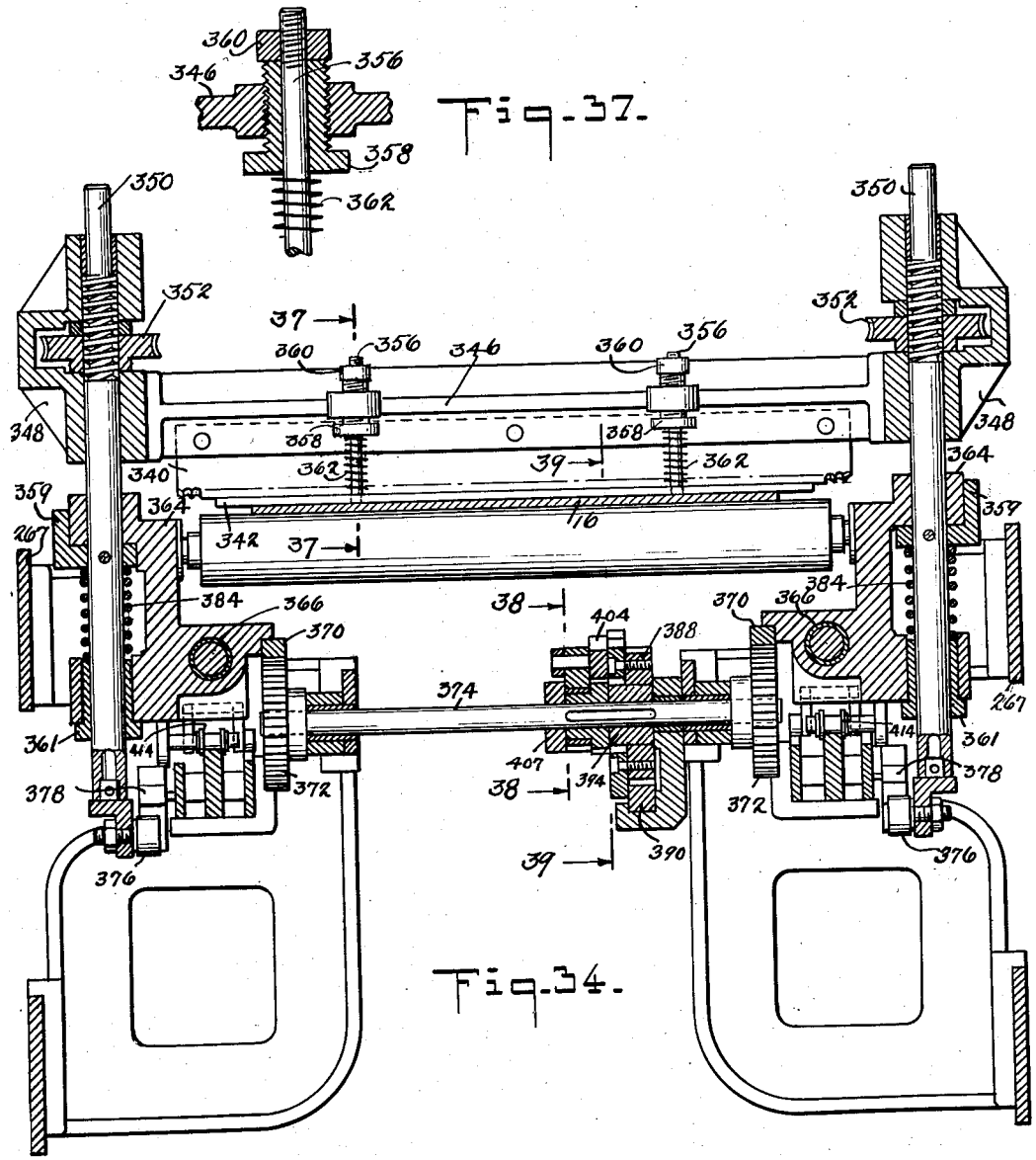

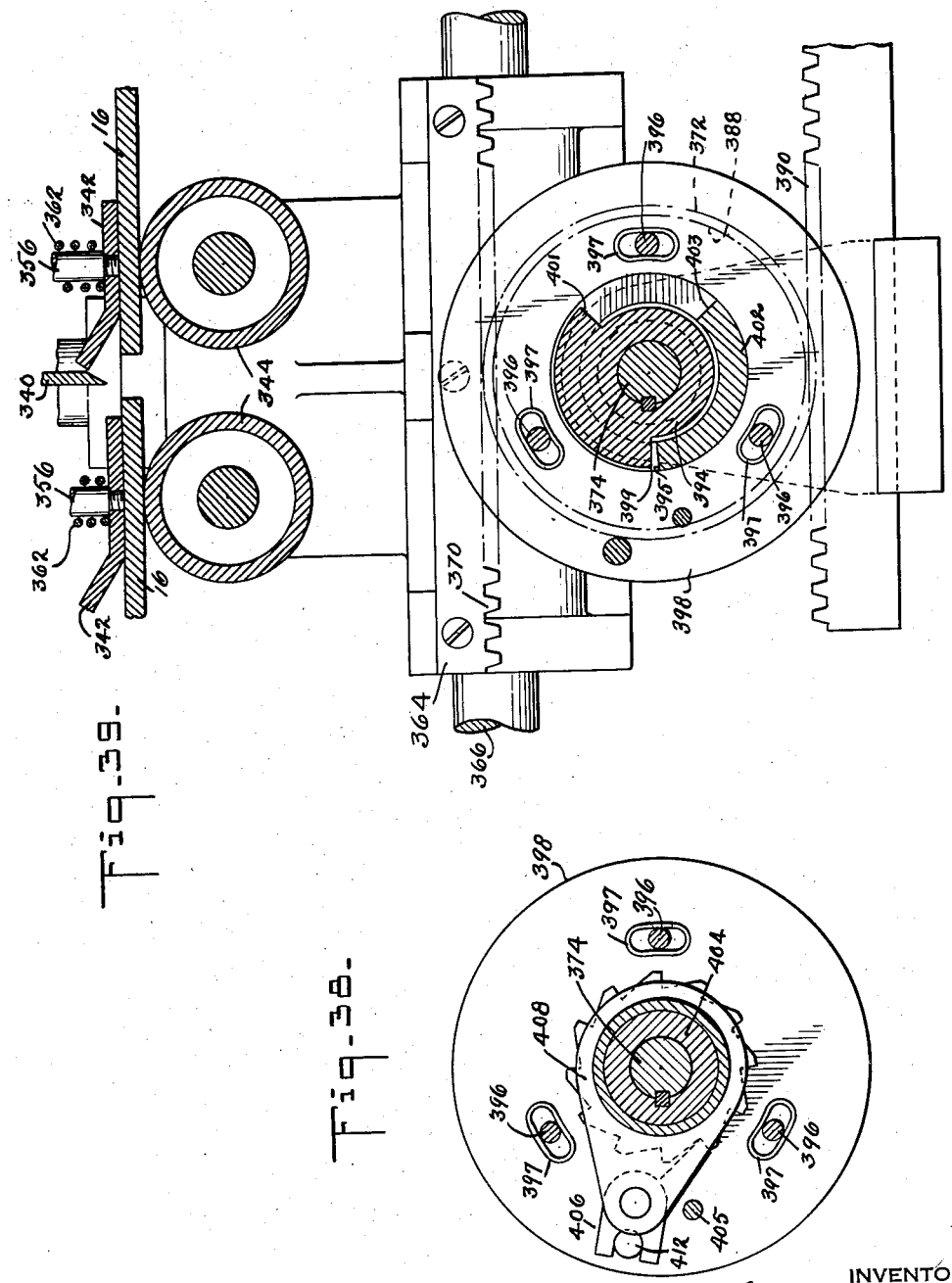

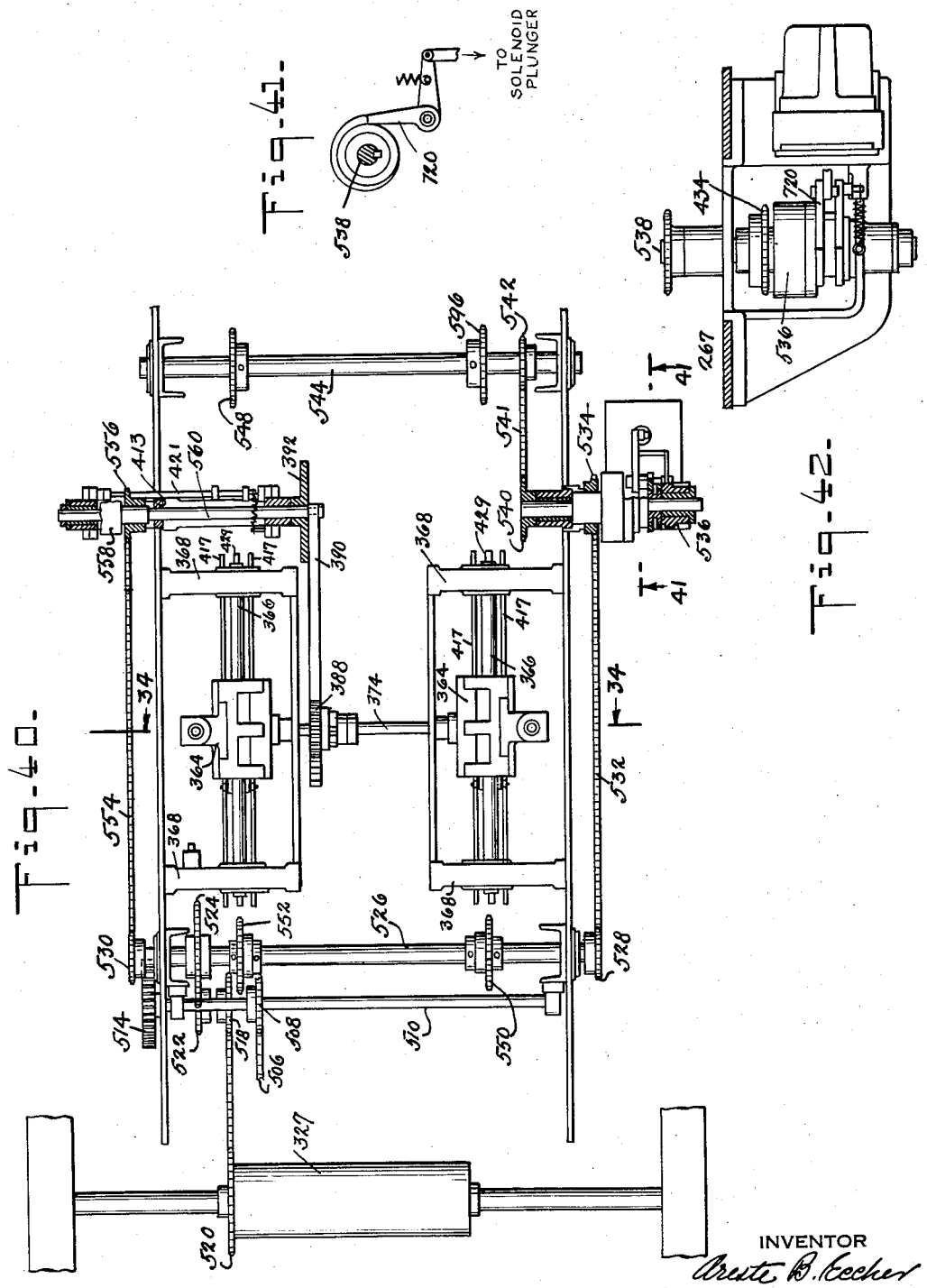

July 14, 1959
O. B. ECCHER
2,894,559
LAMINATING MACHINE
Filed Feb. 21, 1957
27 Sheets-Sheet 25
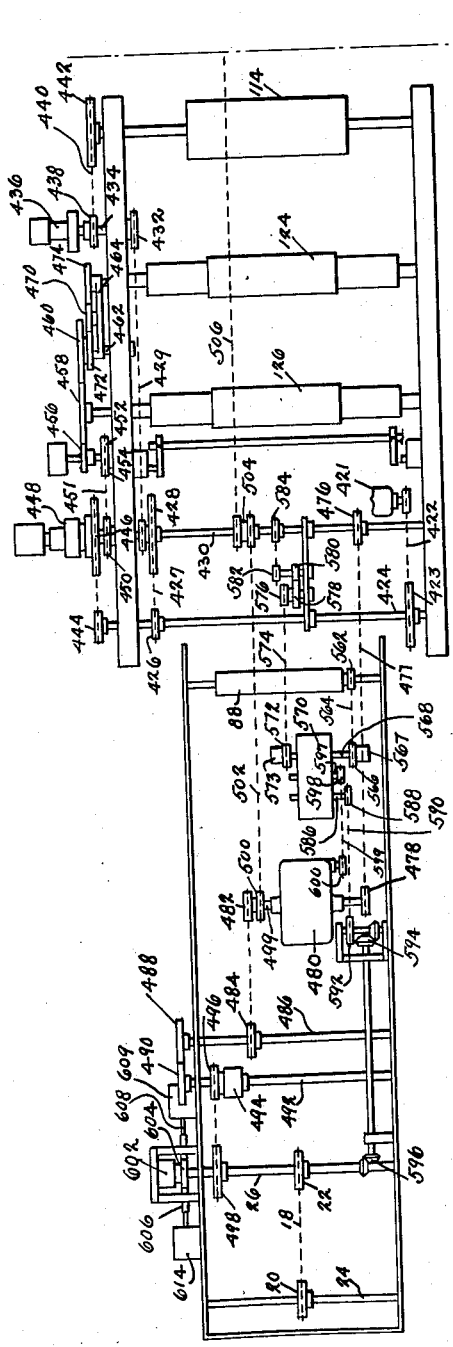
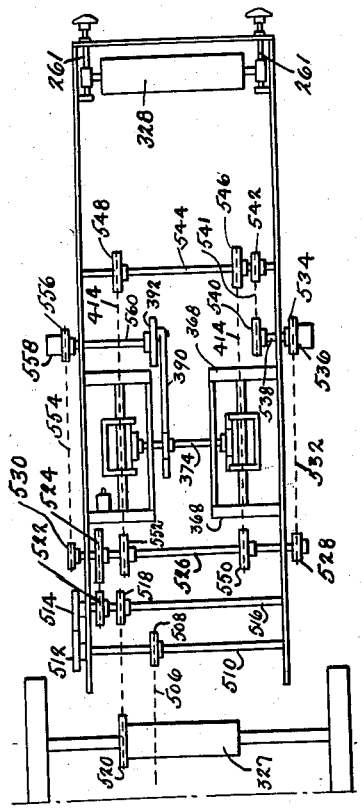
Fig. 43.
INVENTOR
Oreste B. Eccher
BY James G. Bethell
ATTORNEY July 14, 1959     O. B. ECCHER     2,894,559
LAMINATING MACHINE
Filed Feb. 21, 1957     27 Sheets-Sheet 26
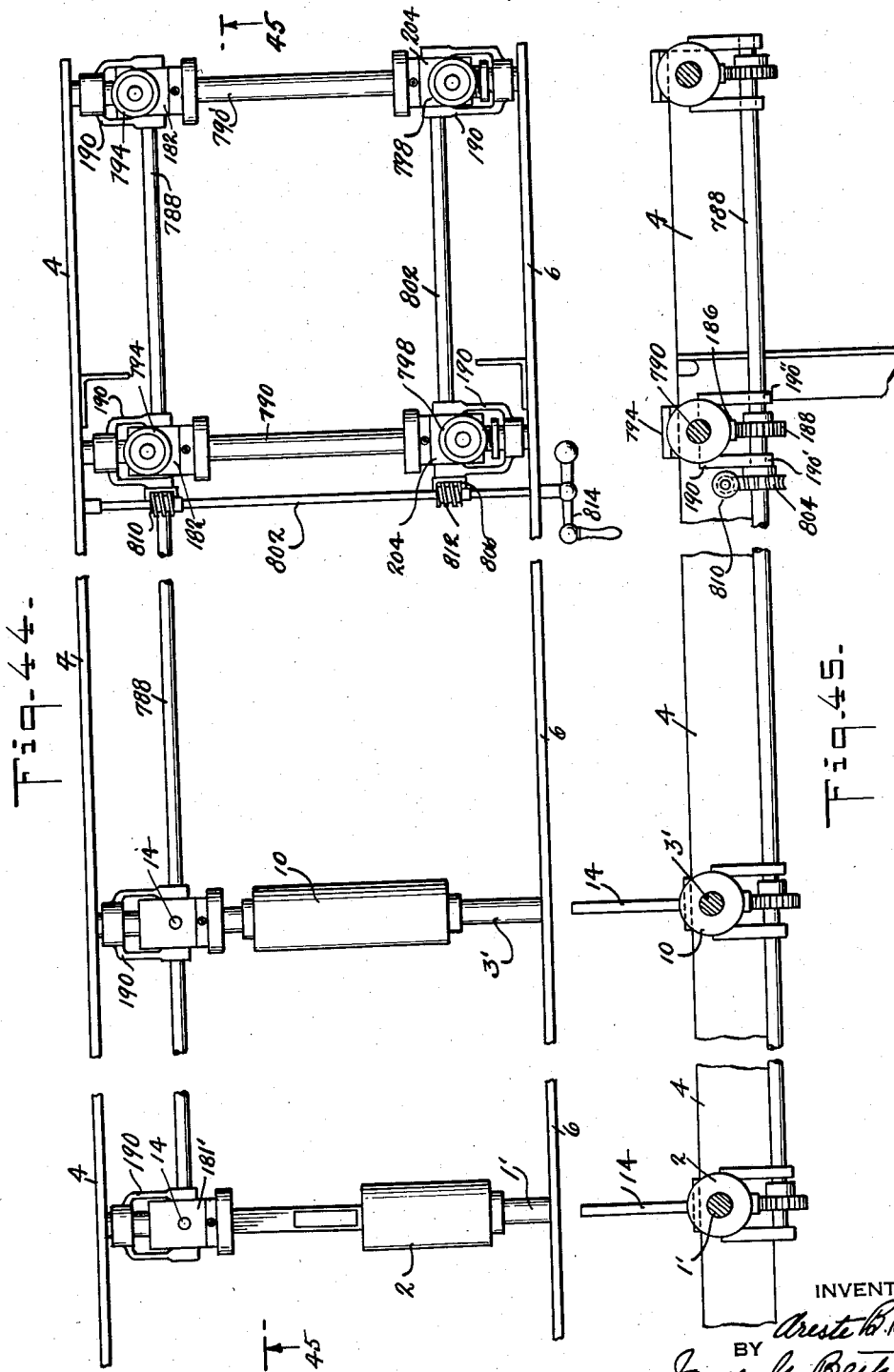
INVENTOR
Areste B. Eccher
BY James G. Bethell
ATTORNEY

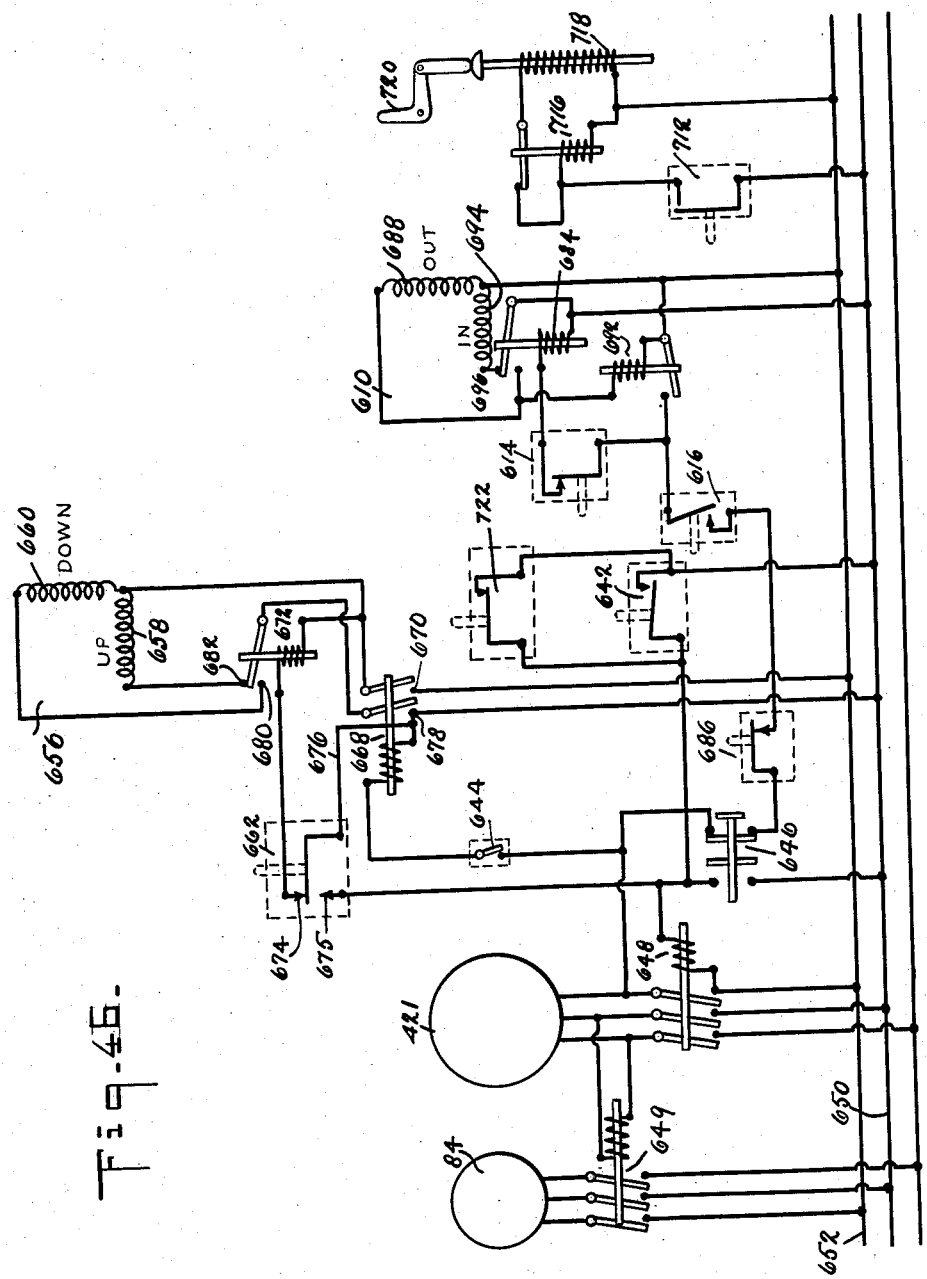

United States Patent Office 2,894,559
Patented July 14, 1959

2,894,559

LAMINATING MACHINE

Oreste B. Eccher, Brooklyn, N.Y., assignor to Potdevin Machine Co., Teterboro, N.J., a corporation of New York Application February 21, 1957, Serial No. 641,560

20 Claims. (Cl. 154—1.6)

My invention in its broadest aspects relates to the production of composite or laminated sheet material.

More specifically, my invention provides an apparatus for drawing a coating material in the web from a supply roll and applying it to successive workpieces, which may be sheet metal, commercial wall board of wood, paper and wood fiber, asbestos fiber, gypsum, etc. In the detailed description to follow I shall describe the coating material as a thin film mounted on a temporary supporting carrier web of paper, for example, which eventually is peeled from the coating material. This is merely illustrative in that, if the coating material has enough body and sufficient strength to be self-supporting, the carrier web is unnecessary and is not employed.

My improved apparatus is automatic in operation and provides for feeding the workpieces successively through the machine, each piece as it is fed forward being combined with the coating web. The workpieces moved forward in spaced relation, and the coating web together with its carrier, if one is used, are severed at the gap between successive lengths and the coated or laminated workpieces discharged successively from the machine.

The workpieces are charged or loaded in superimposed relation into a magazine provided at the feed end of the machine and are fed successively from this magazine to a combining station, where the coating material is applied or combined. The coating material, in the form of a roll of a continuous web, is mounted adjacent the combining station, and as this web is drawn from the supply roll, a suitable adhesive is applied to one face of the web, and this face is pressed into firm contact with the workpiece to produce a permanent laminated structure.

As above noted, the workpieces are advanced successively in spaced relation, each workpiece, as it reaches the combining station, being combined with the coating web. The coating web and its carrier, if one is employed, are cut off between successive workpieces, and the finished pieces are discharged successively from the discharge end of the machine. The workpieces are fed from the loading magazine by a feed chain carrying feed lugs, this chain advancing the workpieces to the combining station, the work being advanced through the combining station by the combining rollers, which also draw the coating web from the supply roll. The spacing of the workpieces as they are moved out of the loading magazine is set at a nominal value by the difference between the length of the workpieces and the length of feed chain between lugs.

The drive for the machine is designed to drive the feed chain, the combining rollers, and the carrier for the cut-off knife at exactly the same speed. The discharge conveyor, which discharges the finished pieces successively from the discharge end of the machine, is driven at slightly higher speed than the feed chain etc. but slips under the workpieces between the conveyor and the cut-off knife.

Synchronizing the three drives, viz., feed chain, combining rollers, and cut-off, would present no problem were the combining rollers made of steel, for example. However, I found that steel rollers could not be used with certain coating materials without damage to these materials. Consequently, I employ resilient rubber rollers. These rollers, because they are resilient, deform under the pressure employed and, hence, their peripheral speed is not equal to the product circumference and revolutions per minute of the rollers. For a given revolutions per minute the peripheral speed of the combining rollers is a function of pressure, and since, with a given pressure and nip setting, differences in work thickness tend to increase or decrease the pressure, the peripheral speed of the rollers varies. Because of these factors it was found necessary to incorporate a work-speed-measuring device and to provide means to bring the speed of the feed chain and of the carriage for the cut-off knife into close synchronism with the work speed. Owing to the high degree of accuray required to bring the drives into exact synchronism, I found it preferable to bring the feed chain and cut-off carriage speed into as close synchronism as will not interfere with the cut-off cycle while remaining at a value slightly lower than work speed. This, however, has a tendency to increase the gap between successive workpieces, which is objectionable not only for reasons of economy but because eventually it would interfere with the proper operation of the cut-off cycle. To limit the gap to a certain value—for example, between one-half inch and one inch—I provide gap-sensing mechanism which, in effect, constantly measures the width of of the gap between workpieces, and when the gap reaches its maximum width, the gap-sensing device automatically initiates the operation of accelerating mechanism, which momentarily accelerates the feed chain to restore the gap to its original minimum width. This operation takes place, say every fifteen or twenty workpieces, depending, of course, upon the ratio between the speed of the feed chain and the speed imparted to the workpieces after they leave this chain.

The cut-off mechanism operates intermittently, and its operation is controlled by the workpieces, so that, by maintaining the proper workpiece linear speed and, hence, proper gap width between workpieces, I am assured that the cut-off mechanism will always operate at proper intervals to sever the coating web at the gap between successive workpieces.

As already pointed out, the workpieces are stacked or superimposed in the loading magazine, and I have provided means for moving them successively out of the magazine from the bottom of the stack, means being provided to prevent more than one workpiece being advanced at a time. I provide also for brushing the surface of each advancing workpiece before it reaches the combining station, so as to ensure that the upper surface of each workpiece will be free of foreign materials when it reaches the combining station, where it is combined with the coating web.

In the combining operation, where the coating layer or web and the workpiece are combined, the workpieces are delivered successively to the nip of the combining rollers by the feed chain lugs, which then move out of engagement with the workpieces. The work is, therefore, under the complete control of the combining rollers, and absolute synchronism of coating web and workpieces is achieved. In this way, wringling of the coating web is prevented.

I also provide for rotation of the coating roller in the adhesive when the machine is not operating, thereby avoiding setting-up of the adhesive on the coating roller.

In the embodiment of my invention as illustrated in the accompanying drawings I employ two driving motors, one motor for driving the cleaning brush, while the other motor drives all of the other units of the machine through suitable clutches, transmissions, etc., as will be brought out fully hereinafter.

Other novel features of my invention will be developed in the detailed description which follows.

In the accompanying drawings,

Figs. 4, 5 and 6 are substantially plan views of Figs. 1, 2, and 3, respectively;

Fig. 7 is a fragmentary view in plan of the feed chain;

Fig. 7A is a similar view of the feed chain on an enlarged scale;

Fig. 8 is an elevational view of Fig. 7;

Fig. 8A is an elevational view on an enlarged scale of the feed-lug construction;

Fig. 9 is a section taken substantially on the line 9—9 of Fig. 7;

Fig. 10 is a section taken substantially on the line 10—10 of Fig. 12, showing the front end of the feed magazine;

Fig. 11 is a partial section on the line 11—11 of Fig. 10;

Fig. 12 is a fragmentary plan view of the front end of the feed magazine;

Fig. 13 is a front elevation in part section on the line 13—13 of Fig. 12;

Fig. 14 is an end-elevational view of the brushing station;

Fig. 14A is a fragmentary top plan of the brushing station, partially in section;

Fig. 15 is a sectional view of the brushing station taken substantially on the line 15—15 of Fig. 14;

Fig. 16 is an enlarged view, partially in section, of the gap-sensing or gap-measuring station;

Fig. 17 is an elevational view of the gap-sensing equipment looking from left to right along the line 17—17 of Fig. 16;

Fig. 18 is a plan view of Fig. 16;

Fig. 19 is a view, partially in section, of the web-coating equipment and the combining station;

Fig. 20 is an elevation of the equipment shown in Fig. 19, taken from the same side of the machine as Fig. 1, for example;

Fig. 21 is an elevation of the equipment shown in Fig. 19, taken from the opposite side of the machine to that shown in Fig. 20;

Fig. 22 is an elevation of the coating equipment and combining station, taken from the discharge end of the machine and facing the feed end;

Fig. 23 is a view in part section on the line 23—23 of Fig. 19, showing part of a ductor blade assembly;

Fig. 24 is a view on the line 24—24 of Fig. 23;

Fig. 25 is a view on the line 25—25 of Fig. 23;

Fig. 26 is an elevational view in part section of the coating-blade assembly;

Fig. 27 is a section on the line 27—27 of Fig. 26;

Fig. 28 is a section on the line 28—28 of Fig. 3;

Fig. 29 is a view in part section of the unwind mechanism for the coating web, taken substantially on the line 29—29 of Fig. 3;

Fig. 30 is an end elevation of the left-hand end of the unwind mechanism of Fig. 29;

Fig. 31 is a plan view of the same end of the unwind mechanism as in Fig. 30;

Fig. 32 is a fragmentary view of the brake for the unwind mechanism of Figs. 30 and 31;

Fig. 33 is a sectional, elevational view of the cut-off station;

Fig. 34 is a section on the lines 34—34 of Figs. 33 and 40;

Fig. 35 is a section taken substantially on the lines 35—35 of Figs. 3 and 33;

Fig. 36 is an isometric view of a cam, forming part of the cut-off mechanism shown in Fig. 33;

Fig. 37 is a section on the line 37—37 of Fig. 34;

Fig. 38 is a section taken on the line 38—38 of Fig. 34 showing part of the over-speed device of the cut-off mechanism;

Fig. 39 is still another view of the over-speed device of the cut-off mechanism and is a section taken on the line 39—39 of Fig. 34;

Fig. 40 is a plan view showing the base support of the cut-off mechanism;

Fig. 41 is a fragmentary view taken on the line 41—41 of Fig. 40;

Fig. 42 is an end-elevational view of a solenoid-actuated, single-revolution clutch shown in Fig. 40;

Fig. 43 is a schematic showing of the machine drive;

Fig. 44 is a plan view illustrating adjusting mechanism at the charging end of the machine for effecting lateral adjustment of the workpieces;

Fig. 45 is a section on the line 45—45 of Fig. 44; and

Fig. 46 is a wiring diagram of the electrical equipment employed in my machine.

Figure 1:
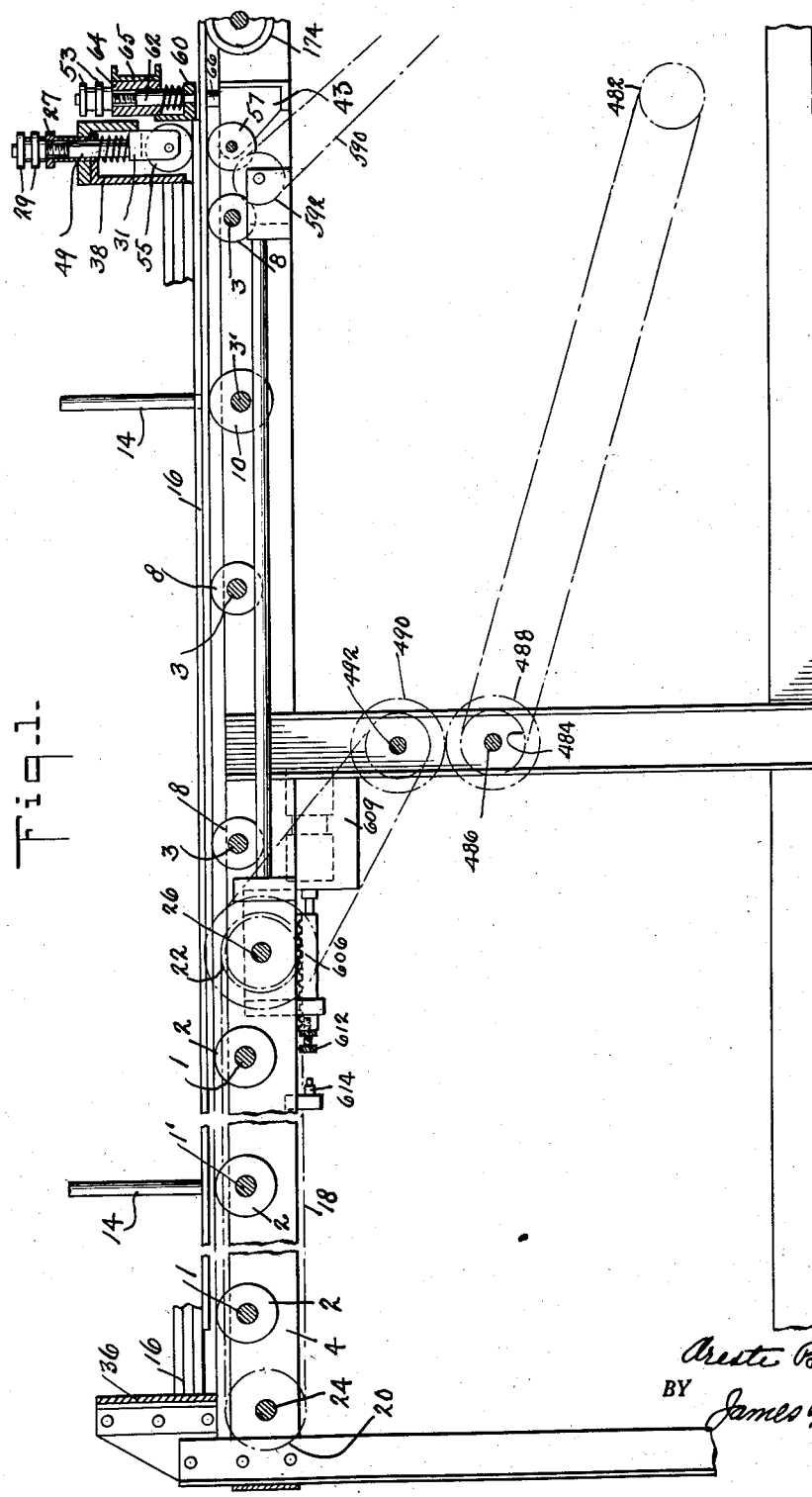
Fig. 1 is a side-elevational view, partially in section, with some parts eliminated, of the in-feed or charging end of my improved machine.
Figure 2:
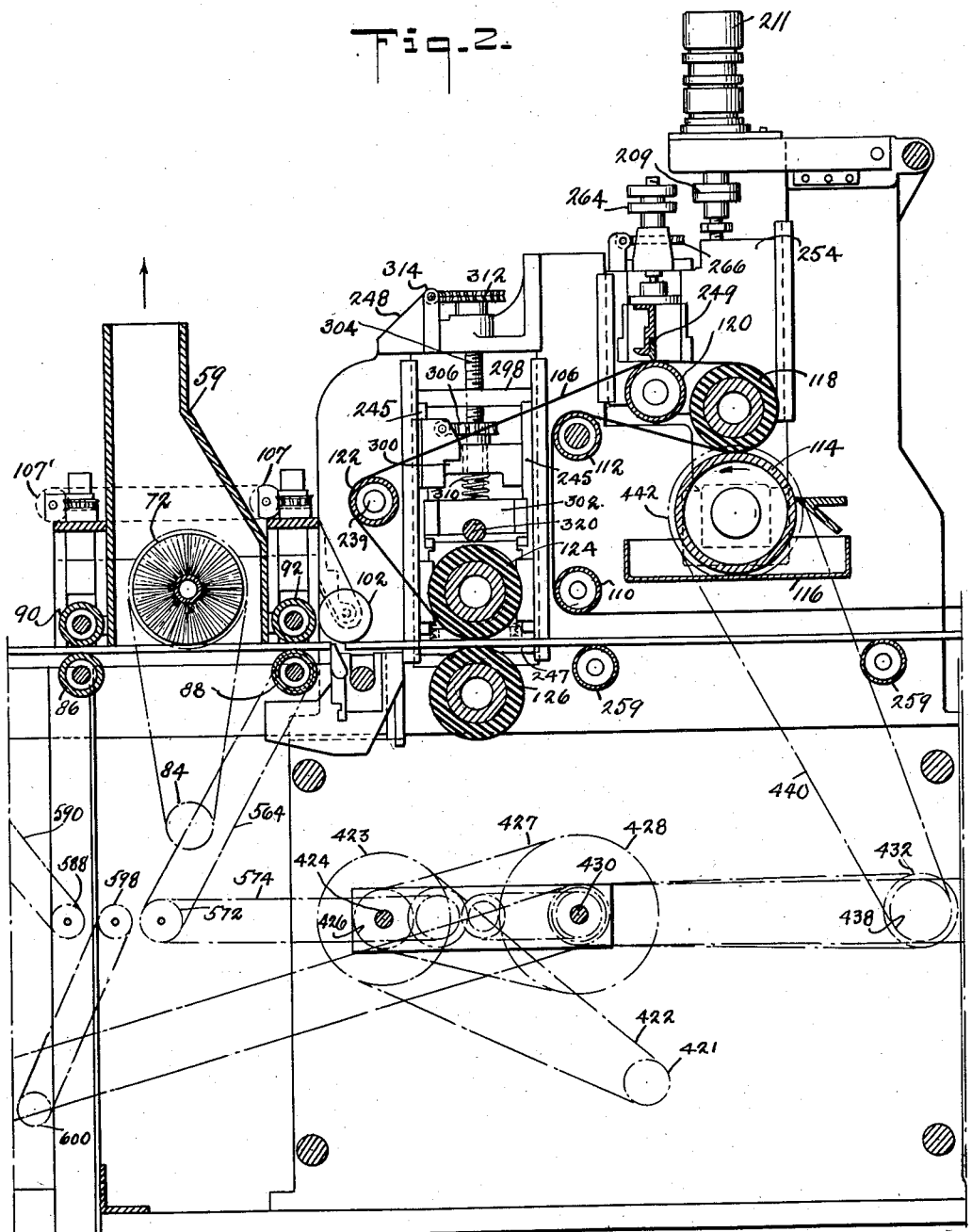
Fig. 2 is an elevational view, also partially in section and with some parts eliminated, taken from the same side of the machine as Fig. 1, showing the brushing station, the station at which adhesive is applied to the coating web, and the combining station, where the web and workpieces are combined.

*Infeed or loading end of the machine*

These parts are best illustrated in Figs. 1, 4, 7 to 13 inclusive, 44, and 45, these drawings showing the feed chain, loading magazine, and adjusting mechanism for effecting lateral adjustment of the workpieces.

2 designates idler rollers extending transversely of the machine and freely rotatable on tie rods 1 and 1'. Beyond these idler rollers I provide additional, transversely extending, freely rotatable idler rollers 8 and intermediate roller 10, carried by the tie rods 3 and 3', respectively. As will be more fully explained hereinafter, I also provide vertically extending guide elements or stakes 14 at the side of this end of the machine, these guide elements being laterally adjustable on the tie rods 1' and 3' across side frames 4 and 6. The tie rods 1' and 3' also carry adjustable support rollers 174.

In loading the machine, the workpieces 16 are stacked in superimposed relation upon the rollers above referred to. Each of the rollers 2 comprises two sections (Fig. 4), spaced from each other, to make provision for installation and operation of a driven feed chain 18, which extends lengthwise of the machine and is carried by sprockets 20 and 22. The sprocket 20 is mounted freely on tie rod 24. Sprocket 22 is keyed to driven shaft 26, which is rotatable in bearings in the side frames 4 and 6. The rollers of chain 18 are supported between the sprockets 20 and 22 by bar 5 (Figs. 7 and 9).

As will be seen from Figs. 1, 8, and 9, the plane of the upper face of the upper run of the chain 18 lies a substantial distance below the lower face of the bottom workpiece of a stack resting upon the rollers 2. In order that the bottom workpiece of the stack may be fed forward successively by the feed chain 18, I provide the chain with a feed lug 28. This lug straddles the chain and is pivoted at its forward end to a pin 7, which passes through a roller link and the plates of a pin link of the feed chain. The outer ends of pin 7 carry rollers 34, which ride in a guide 32 in contact with the upper edge of a slot in the guide. The rear end of the lug 28 carries rollers 9 on pins 11. These rollers ride on bars 13 at each side of the bar 5. The bars 13 are held in spaced relation to the bar 5 by collars 15 and spacers 17. A spring 30 tends to rotate the lug 28 counterclockwise about the pin 7. The construction just described is best shown in Figs. 7, 8, and 9.

When work is being fed through the machine, it tends to rotate the lug 28 about pin 7 and to lift the chain. This is prevented by rollers 34 riding in guides 32. The lug 28 is, in addition, provided with an outer member slidably mounted on the inner member and retained by pin 19 and urged upward by spring 21. The forward end of the outer member is inclined as at 23. In operation, the lug acts at the center of the workpiece, and its outer member is urged upward to feel the bottom of the workpiece. Since the height of the inner member of the feed lug has to be less than the thickness of the thinnest workpiece, this inner member would fail to feed if the work was warped or arched in an amount equal to the height of the inner member. By providing the outer member, a comparatively large warpage can be tolerated without interfering with the operation of the feed mechanism. The inclined portion serves to seat the lug at the proper height as the lug approaches the work. Secured to the extreme feeding or loading end of the machine and extending across the machine frames is a stop member 36, which functions as the rear wall of the magazine when stacking the workpieces 16 upon the rollers 2, 8, etc.

It will be apparent from the description so far given that, with the machine in operation, the lug 28 of the feed chain 18 will engage successively the rear end of the bottom workpiece 16 of the stack, moving the workpiece forward to the nip of the combining rollers. At this time the rollers 9 of the feed lug 28 have reached the forward end of the bars 13, and the spring 30 will pivot the lug about the pin 7 away from the work, which by this time is in the nip of the combining rollers.

The required length of the feed chain or the spacing of the lugs upon the chain, if more than one lug is employed, depends upon the length of the workpieces being handled and is equal to work length plus minimum gap between workpieces.

Feed magazine

Referring particularly to Figs. 1 and 10-13 of the drawings, it will be seen that adjacent the forward roller of the two rollers 8 I provide a magazine front, which takes the form of a transverse plate comprising a vertically extending wall 38, flanged at the top, as shown at 40, this flange extending forwardly of the machine in a horizontal plane. A vertical post 42 (Figs. 12 and 13) is secured to the side frame 6, and another is secured to side frame 4, these posts passing upwardly through bearings 25, secured to the inner face of wall 38 and flange 40. Brackets 46 are secured to the upper face of the flange 40 adjacent each end thereof, the posts 42, above referred to, passing through these brackets. Threaded on each post 42 is a worm gear 50. These worm gears are driven through worms 52 on a rod 54, mounted in the brackets 46 and driven by a handle 56. The posts 42 also pass through brackets 44, which overlie each worm gear 50 and are rigidly secured to the flange 40 of the magazine front wall 38. Obviously, by turning the handle 56, the wall 38, its flange 40, brackets 46, gears 50, worms 52, shaft 54, and brackets 44 may be adjusted vertically. (Fig. 13 shows the magazine wall in its lowest position.)

The lower edge of the magazine wall 38 terminates short of the plane of the upper faces of the rollers 2, 8, and 10 a distance slightly greater than the thickness of two workpieces 16 (see Fig. 10), so that two workpieces, but not three, may pass together beneath the lower edge of 38. The mechanism above described for adjusting the wall 38 enables the machine to accommodate workpieces ranging in thickness from one-quarter inch to as much as one and one-half inches.

Secured to the upper face of the flange 40 of magazine front wall 38, intermediate the ends of the flange, is a strap 45, having a depending flange 47, which extends downwardly from the rear edge of the flange 40 parallel to the front wall 38 of the magazine (see Fig. 10). Threaded through strap 45 and extending through flange 40 is a hollow, threaded knob 27. A rod 49 extends through knob 27, the upper end of which is threaded to receive lock nuts 29. The lower end of rod 49 carries a yoke 31 in which roller 55 idles on a stub shaft 33. Between the lower end of knob 27 and the upper face of yoke 31 is a spring 58, whose pressure may be varied through knob 27. The flange 47 of strap 45 extends downwardly to overlap the rear of yoke 31, thereby preventing rotation of yoke 31, rod 49, roller 55, etc. and limiting motion of these parts to motion in a vertical plane. In normal operation the roller 55 is set slightly below the lowermost edge of magazine wall 38, and the pressure on spring 58 is adjusted through knob 27 to such a value as is sufficient to actuate the single feed device to be described later. Once this setting is made, the lock nuts 29 are tightened, so that rod 49 and associated parts are locked, allowing only a slight, vertical, upward movement.

It will be seen that, with the magazine front wall 38 set two and one-half times workpiece thickness above the roller 8, a single workpiece, bowed by that amount, could be fed through, which would not be possible if the magazine wall 38 were set at a distance slightly greater than one workpiece thickness. Single feed for thick workpieces can be obtained readily by setting the magazine wall above roller 8 to slightly less than the combined thickness of two workpieces. To handle comparatively thin workpieces, which have a tendency to warp or bow, I provide a single-feed construction or device now to be described and best illustrated in Figs. 10 and 11.

Single-feed device

The single-feed device comprises a stop 60, carried by a rod 62, extending vertically through a member 64, secured to a transverse member 65. This transverse member is mounted on vertical rods or posts 66, which extend through bearings 35, which are fastened to the frames 4 and 6. The posts 66 are square at their upper ends where they are fastened to 65. At this same end the posts are threaded, as seen at 66', for the reception of nuts 37. The lower ends of the posts are round and slidable in the bearings 35. Threaded into the posts 66 are flanged studs 39, which pass through slots 41 in the bearings 35. These flanged studs 39 carry plates 43, which in turn carry an idle shaft 51 and idler roller 57. This whole mechanism is supported by compression springs 70, each of which rests on a bearing 35.

In normal operation the nuts 37 are adjusted so that the springs 70 support the posts 66 and all parts fastened to them, so that the top of roller 57 is approximately one workpiece thickness above the top of adjacent roller 8 (almost touching roller 55). The stop 60, which has a portion overlapping 64 to prevent rotation, is adjusted by knobs 53 so that its lowermost portion is approximately one and one-half workpiece thicknesses from the top of roller 57. In effect, the roller 57 is urged upwardly in the path of the work by springs 70 and "feels" for the bottom of a narrow central portion of the workpiece. Since the gap between the top of roller 57 and the bottom of stop 60 is constant for a given thickness of work and is less than two thicknesses of work, only one workpiece will be fed through the machine, whether straight or bowed. If a second workpiece is fed beneath the wall 38 (by friction), the roller 55 will rise, compressing spring 58. After the trailing edge of the bottom workpiece has passed the front edge of the stop 60, the spring 58 will expand and force the bottom of the upper workpiece into contact with roller 57. Adjustment to accommodate work of different thicknesses is made through the nuts 53, the spring 68 being a tensioning member to apply a downward force on 62 to prevent the lock nut 53 from shaking loose and changing the setting of the stop 60.

Brushing mechanism

The upper surface of each workpiece, after it passes the stop mechanism etc. just described in connection with Fig. 10, is thoroughly brushed to free this surface of any foreign materials before entering the combining station, where it is to be combined with the coating web. In this connection, reference will be made particularly to Figs. 2, 5, 14, 14A, 15 and 16.

The brush, which is designated 72 and enclosed by a hood 59 (Fig. 2) connected to an exhaust system to remove the dustings, rotates in bearings 61, carried at the top of a vertically extending and vertically adjustable slide plate 63. The slide plate 63 is slotted at the top to facilitate removal of the brush and is provided at the bottom with slots 67 and 69 to clear the shaft 71 and tie rod 73. Vertically extending bars 75, fastened to the side frames 4 and 6, together with gibs 77, fastened to the bars 75, provide ways for the slide plate 63. Slide plate 63 also carries vertically extending bars 74' on the near side and bars 74 on the far side of the machine. The bars 74' extend the full length of the slide plate 63. The bars 74 extend below the lower edge of slide plate 63 to form a support for plate 79, on which the brush driving motor 84 is mounted. At their upper end the bars 74 and 74' carry plates 81. Fastened to the extreme ends of plates 81 are bars 83, also vertically extending, these bars forming guides for spring-loaded slide block 85. Bars 74 and 74' also carry racks 76 and 76', respectively. Carried at the upper ends of bars 83 are end plates 87, which extend transversely of the machine and serve as tie plates and as supports for worm brackets 89. The forwardmost plate 87 also serves as a support and guide for a roller 102, which acts in conjunction with the gap-sensing device to be described later.

The slide plate 63 and all parts carried by it are vertically adjustable to accommodate workpieces of different thicknesses. The adjustment is made manually through a handwheel, which drives worm 80 and shaft 71 through worm wheel 82. On the inside of the frame, fixed on shaft 71, are two gears 78, which mesh on one side with rack 76 and on the other with gear 78', which idles on tie rod 73. Gear 78' also meshes with the rack 76'. It will be seen, therefore, that turning handwheel 91 will turn the shaft 71, which will drive racks 76 and 76' (and, hence, the slide plate 63, to which they are attached through 74 and 74') either up or down.

Mounted in the machine side frames 4 and 6 at one side of the brush 72 is an idler roller 86, and at the other side is a speed-measuring roller 88. These rollers, idling on tie rods 97, secured to frames 4 and 6, are fixed so far as vertical adjustment is concerned and are in position to be engaged by and support each workpiece 16 as it advances through the machine. Cooperating with these rollers are upper presser or hold-down rollers 90 and 92. These latter rollers (see Figs. 14 and 15) are spring-loaded by springs 94 and 96, respectively, and are carried in the slide blocks 85, which are guided on rods 93 between bars 83, and since these rollers are carried by instrumentalities fixed to slide plate 63, they are moved vertically with the brush when the latter is adjusted.

The blocks 85 also carry a hold-down roller 102, which is spring-loaded by spring 104. This roller is engaged by each workpiece 16 as it advances through the machine and, as will be explained later on, cooperates with the gap-sensing mechanism (Fig. 16) for controlling the width of gap between successive workpieces, to keep this gap within the range of one-half inch minimum to one inch maximum.

The rollers 90 and 92 are resiliently mounted between the bars 83 under the action of springs 94 and 96 so as to accomodate for variations in work thickness in any one run. The brush is lowered over the work so that its lowermost bristles are bent slightly to provide for a sweeper action, the rollers 90 and 92 riding on the top face of the workpiece. Nut 95 is provided to vary the pressure exerted by spring 96, in order to ensure sufficient pressure on roller 92 and, hence, pressure applied to the work, to drive the speed-measuring roller 88.

The rollers 90 and 92 are also provided with an adjustment independent of the brush adjustment. This adjustment is necessary in order to compensate for brush wear. As the brush wears, its diameter decreases, and, as a consequence, rollers 90 and 92 have to be raised a corresponding amount in order to maintain the same relationship between the bottom of the brush and the bottom of the rollers 90 and 92. This adjustment is provided as follows: Rollers 90 and 92 are free to turn on rods 99, carried in slide block 85. A rod 93, which is collared near its lower end, passes through the slide block 85, the block resting on the upper surface of the collar. The lowest portion of the rod 93 passes through block 101, fixed to the bars 83 (Fig. 15). The upper portion of rod 93, which is threaded for a length, passes through but is not threaded into plate 87. Above the plate 87 and threaded onto rod 93 is the worm wheel 100, and above the worm wheel is a cap 103, fastened to worm bracket 89. Above the threaded portion the rod 93 is turned to a smaller diameter and extends through a bearing at the top of the cap 103. The worm wheel 100 meshes with worm 98, mounted on transverse shafts 105 between the brackets 89. Mounted on the shafts 105 on the outside of worm brackets 89 are sprockets 107, connected by a chain, so that turning any one of the shafts 105 will turn the other and thereby adjust the rollers 90 and 92 simultaneously and by the same amount. Turning any one of the shafts 105 turns worm wheels 100 through worm 98, which is pinned to the shaft. The threaded worm wheel 100 acts as a nut and, since it is constrained from vertical motion by the plate 87 and cap 103, the rod 96 will be urged upwardly, its collared portion lifting slide block 85 and, therefore, rollers 90 and 92. It will be noted that this adjustment is accomplished without changing the pressure setting of springs 94 and 96.

Mechanism for centering and squaring work with the combining rollers

To ensure that the workpieces are properly fed to the combining rollers 124 and 126, that is, properly centered and square to the rollers, side guide rollers 794 and 798 are provided. These rollers, as well as the stakes 14, are provided with an adjustment to move them toward or away from the center of the machine. This adjustment is best shown in Figs. 28, 44, and 45. Fig. 28 may be considered a typical transverse, sectional elevation through each tie rod carrying elements of this adjustment, if the idler rollers also carried on these tie rods be disregarded.

Referring to these figures, it will be seen that adjacent the frames 4 and 6 and fixed to tie rods 790 and 790' is a bracket 190, the construction of this bracket being best seen in Fig. 28. The bracket 190 is hollowed out beyond the hub to receive a slide 182 on the far side of the machine and a slide 204 on the near side. The slides 182 and 204 fit between vertically extending side walls 190' and 190" of bracket 190, these side walls preventing rotation of the slides about the tie rods. As seen in Fig. 28, the slides 182 and 204 are machined out at their center portion, forming roughly a U-shape.

Referring now to slide 182 (as viewed in Fig. 28), it will be seen that it carries two vertical projections or walls 182' and 182". The left-hand projection 182' is bored for a slide fit on the tie rod; the right-hand projection 182" is bored out to receive the hub of support roller 174. Rollers 174 and 176 are made by pressing a steel tire over the outer race of a standard "extended inner race" ball bearing, the extended inner race furnishing the hub of rollers 174 and 176. A short screw 184 is threaded into projection 182″ and partly into the hub of 174, thereby securing the hub of the roller to the slide 182 without locking it to the tie rod. Roller 174, therefore, will follow the slide when the latter is moved along the tie rod and will be free to rotate. Between the two vertically extending walls 182′ and 182″ of slide 182 is a block 181. This block is bored for a slide fit on the tie rod and has a lip 181′, which extends over the top of the wall 182′. The lip 181″ acts as a lock to prevent rotation of 181 about the tie rod. Side guide rollers 794, which are fitted with ball bearings, are free to revolve on stub shaft 183, screwed into the top of the block 181. Secured to the bottom of the slide 182 is a rack 186. This rack is in mesh with a gear 188, fixed to shaft 788. This shaft is journalled in bearings at the lower extremity of the side walls 190′ and 190″ of the bracket 190.

The slide 204 is similar in construction to the slide 182, just described, but differs in that on this side of the machine the side guide rollers are resiliently mounted to provide for slight variations in work width in any one run. The left-hand wall 204′ of slide 204 is fitted with support roller 176 in the same manner as roll 174 is fitted to 182″, rollers 176 and 174 being identical in construction. Threaded into the right-hand wall 204″ is bushing 208, this bushing being bored for a slide fit on the tie rod. Between the walls 204′ and 204″ of slide 204 is bracket 202, comprising a vertical and a horizontal leg. The vertical leg of bracket 202 is bored for a slide fit on the tie rod. The horizontal leg extends over the wall 204″ of slide 204 to prevent rotation about the tie rod and to provide additional bearing surface to facilitate sliding of bracket 202 along the tie rod. The bracket 202 is urged toward the wall 204′ by a spring 206. The force exerted by this spring is adjustable through the threaded bushing 208. The side guide rollers 798 are mounted on top of bracket 202 in the same manner as the side rollers 794 are attached to the block 181, as previously described. The bottom of slide 204 is fitted with a rack 196. This rack is in mesh with a gear 198, fixed on shaft 802, which is journalled in bearings at the lower extremity of the side walls 190′ and 190″ of the bracket 190.

With reference to Figs. 44 and 45 it will be seen that tie rods 1′ and 3′ are also fitted at the far side with brackets 190. These brackets and associated parts are identical with the corresponding parts on tie rods 790 and 790′, except for block 181′. This block 181′ carries the stakes 14 instead of side guide rollers 794. The stakes 14 are screwed into the block 181′ so that their innermost point is in line with the innermost point of side rollers 794. The shaft 788 extends through all four brackets on the far side of the machine, and fixed on the shaft within each bracket are gears 188, meshing with corresponding racks 186. These racks, as previously described, are attached to the slide 182. Similarly, a shaft 802 extends through the two brackets on the near side of the machine. Fixed to the shaft 802, within each bracket, are gears 198, in mesh with rack 196, which is fixed to slide block 204. Adjacent the tie rod 790, the shaft 788 carries worm wheel 804, fixed to the shaft. Fixed to the shaft 802 is a worm wheel 806. The threads on these worm wheels are of opposite hand. In mesh with the worm wheels 804 and 806 are worms 810 and 812, fixed on the shaft 808. These worms also have threads of opposite hand, the right-hand threaded worm meshing with the right-hand threaded worm wheel, and the left-hand threaded worm meshing with the left-hand threaded worm wheel. The shaft 808 is journalled in suitable bearings in the side frames 4 and 6 and is turned by crank 814. Obviously, turning crank 814 will turn shafts 788 and 802 and the gears 188 and 198 fixed to these shafts in opposite directions. Rotation of gears 188 and 198 will move racks 186 and 196, the slides 182 and 204 to which the racks are attached, and all parts mounted on or constrained by these slides toward or away from each other as required.

*Web-coating and combining station*

The next step following the brushing of each workpiece is to apply the coating web to the upper face of each workpiece, viz., combine the two. As already mentioned, the coating web is in a continuous length, illustrated as backed with paper, for example, although, as above pointed out, a backing may be unnecessary. It is necessary, however, to apply an adhesive to the face of the coating web as it is drawn off its supply roll and then to combine the web with each workpiece as the workpieces move forward successively through the machine.

Figure 3:
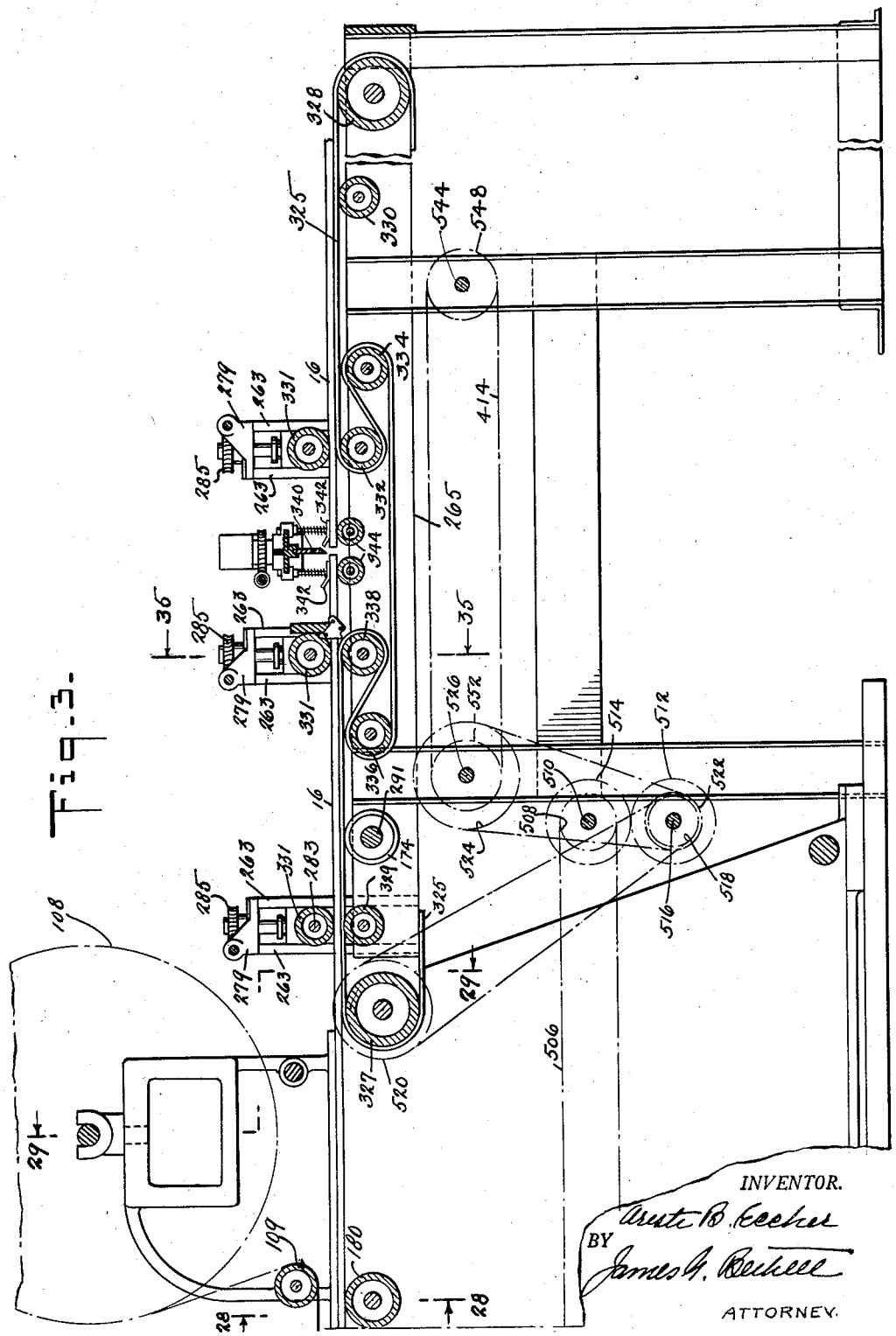
Fig. 3 is an elevational view, in part section, with some parts eliminated, taken at the same side of the machine as Fig. 1 and showing the cut-off and discharge mechanism.

Referring to Figs. 2, 3, 19, and 29–32 of the drawings, the supply roll carrying the coating material in the form of a continuous web 106 is seen in Figs. 3 and 30 and has been designated 108. The web passes from the supply roll 108 about idler rollers 109, 110, and 112, thence between adhesive-applying roller 114, which rotates in adhesive-supply tank 116, and backing roller 118. Leaving the backing roller 118, the web passes over roller 120 and then about a tension-equalizing or snub roller 122; from thence downwardly and forwardly about upper combining roller 124, where it meets the advancing workpiece, this roller cooperating with a lower combining roller 126 immediately below it. The passage of the workpiece and coating web effects the progressive combining of the two.

Referring to Figs. 29 to 32 in particular, it will be seen that the web-supply roll 108 is mounted on paper-roll cones 48 and 111, carried by mill-roll shaft 130. The cones 48 and 111 are keyed to the shaft 130 to prevent rotation of these cones about the shaft. The cone 48 is laterally adjustable on shaft 130 and is provided with a spring-loaded pawl 113, which engages notches 115 in the shaft 130. This will prevent motion of cone 48 toward frame 134 once its position on the shaft has been determined. The cone 111 is slidable on the shaft 130. To the left of cone 111, as viewed in Fig. 29, is threaded bushing 117, bored for a slide fit on shaft 130 and provided with a set screw to fit into shallow bores 119 on the shaft 130. Mounted on the bushing 117 is threaded handwheel 121, which has a hub extension in contact with the large end of core 11. It will be obvious from this construction that turning handwheel 121 will force the cones 111 and 48 into a tight engagement with the paper-roll core, locking the core to the cones and, therefore, to the shaft 130, to which the cones are keyed. It will also be evident that this construction allows for mounting of paper rolls of different widths and for stepped adjustment to centralize the mill roll, the stepped adjustment being a multiple of the pitch or spacing of the notches 115 and the shallow holes 119 of shaft 130. An additional, finer, lateral adjustment of the shaft 130 is provided and will be described later.

The right-hand end of shaft 130, as viewed in Fig. 29, is mounted in an open bearing 123, which is pivotally mounted on frame 134. The left-hand end of shaft 130 is journalled in a split bearing, the lower half being in a bracket 125 and the upper half in bearing cap 127. The bearing cap 127 is hinged on the bracket 125 and may be opened by extracting lock pin 129, so that the shaft 130 may be lifted out of its bearings. Outside the left-hand bearing the shaft 130 carries a gear 135, which is fixed to the shaft, and beyond the gear the shaft 130 is necked down to receive a lateral adjustment bracket 131. This bracket is open at the bottom, where it straddles the shaft 130, and is threaded at the support end on lateral adjustment rod 150. This rod is journalled in the bracket 125 and is fixed laterally by collars on each side of the bracket 125. Turning handwheel 148 will cause the bracket 131 and, therefore, shaft 130, by its action on the shoulders of the necked-down portion of the shaft, to move laterally in or out, depending on the direction of rotation of the handwheel. The lateral adjustment rod 150 also carries upper gear guard 146, which is pivotally mounted between collars on the rod 150. It readily will be seen that both bracket 131 and upper gear guard 146 may be pivoted away from the shaft 130 when it is desired to remove the shaft.

The gear 135 on shaft 130 (Fig. 30) meshes with a wide-face gear 136, which is mounted on the hub of a brake drum 140. The wide face of gear 136 allows substantially all of the face of gear 135 to be in mesh with gear 136 over the entire range of lateral adjustment. The brake drum 140, with the gear 136 keyed to its hub, is rotatably mounted on stationary stub shaft 138, which is pressed into the bracket 125. This stub shaft also serves as a support for the lower gear guard 133. Cooperating with the brake drum 140 are two brake bands 142 and 142'. The lower end of brake band 142' is bifurcated and pivotally mounted to 142 on pin 137. Band 142 carries a downwardly extending, slotted projection, which fits about rod 139, which is pressed into the bracket 125. The rod 139 prevents rotation of the brake bands 142 and 142' and also furnishes a support for the lower gear guard 133. The pressure between the brake bands 142 and 142' and the brake drum is adjusted through handwheel 144, pinned to a rod 141, which also carries a collar pinned to it where it enters the upper portion of brake band 142' (best seen in Figs. 31 and 32). The rod 141 also passes through the upper part of brake band 142 and is threaded into a cylindrical nut 143. Between the two straps surrounding rod 141 is a spring 145, which serves to separate the two straps when the pressure is released. Provision is also made to swing the shaft 130 in a horizontal plane for the purpose of equalizing the tension on each side of the web 106.

It will be seen from Figs. 29 and 31 that the bracket 125, which carries the brake drum and associated parts and also furnishes the left-hand bearing of shaft 130, is pivotally mounted on a pin 152, carried in a slide 147, which is constrained to move in a slot in frame 132. Adjustment is made through crank 154, pinned to screw 156, which is collared to restrain its movement to rotation in a block 149, fastened to the frame 132. The screw 156 is threaded into a projection of the slide 147. Obviously, turning the screw 156 through crank 154 will move the slide 147 and, therefore, the bracket 125 forward or backward, as desired. During such movement of the slide 147, the shaft 130 and bearing 123 will pivot in the frame 134. During this same movement, the bracket 125 will pivot about pivot 152, so that the bearings of the shaft 130 will remain in perfect alignment in spite of the obliquity created by moving the left-hand bearing forward or backward with respect to the right-hand bearings. It will be noted also that the mesh of gears 135 and 136 is not disturbed by this adjustment, and that there is no twisting of the teeth of one gear in the tooth spaces of the other. In other words, the shaft 130 will ride free in its bearings, and gears 135 and 136 will remain in proper mesh in spite of obliquity imparted to the shaft by a considerably large movement of the slide 147 either forward or backward.

As above pointed out, the coating web 106 is drawn off the supply roll 108 and passes about the rollers 109, 110, and 112 and thence between adhesive-applying roller 114 and backing roller 118. The adhesive-applying roller 114 is driven in the direction of the arrow, and, as will be explained later on, provision is made to have this roller continue its rotation after the rest of the machine has been shut off, to prevent setting of the adhesive on the face of this roller. The roller rotates in adhesive 158, carried in the tank 116. This tank, as seen in Fig. 19, is vertically adjustable through the medium of rack 162 and pinion 164, mounted on shaft 163 and and manipulated by handle 166 (Fig. 20) through worm 151 and worm wheel 153, fixed to shaft 163, so as to permit the tank to be lowered sufficiently to permit of its removal for cleaning or replacement etc.

*Ductor-blade mechanism for adhesive-applying roller*

Reference will now be made to Figs. 19, 23, 24, and 25 of the drawings, wherein I illustrate the ductor-blade mechanism, which cooperates with the roller 114 in applying adhesive to the coating web 106 before combining the web with the workpieces.

The ductor blade, designated 210, is cast in a V-shape for rigidity and extends lengthwise of the roller 114. The blade terminates at each end in blocks 212, cast integral with the blade. These blocks are slidably mounted in the lower slot of support blocks 155. Each support block 155 is provided with a hub, into which is pressed stub shaft 157, which is rotatably supported in the machine frame 159 and right-side machine frame 159' (Fig. 19). The ductor blade 210 is arranged to move toward or away from the adhesive-applying roller 114 for the purpose of metering or regulating the thickness of the layer of adhesive on the face of the roller 114. The blade 210 is also adjustable to ensure parallelism with the face of the roller, as will be explained later. At the extremities of the roller 114 the ductor blade 210 also carries scrapers 161, which serve to scrape the ends of the roller 114 clean of adhesive and prevent adhesive "build-up" thereon.

Threaded into the end blocks 212 of the ductor blade 210 are screws 165, whose motion is constrained to rotation in end brackets 167 and 169, which are fastened to the blocks 155. Keyed to each screw 165 is worm wheel 218, in mesh with worms 214, one of which is pinned to short shaft 222 and the other of which is pinned to short shaft 224, these short shafts passing through bearings in the brackets 167 and 169, respectively. The inner ends of the shafts 222 and 224 fit into a tube 220, the ends of which have been bored for a free fit over the shafts. These ends moreover are slotted or cut along the axis of the tube to form four resilient prongs, which can be deflected toward the center of the tube. Over the slotted ends of tube 220 are placed sleeves or collars 171, provided with four equally spaced set screws along the periphery of the collars. Each of these screws will be opposite one of the prongs on the tube 220, so that, by tightening these set screws, the prongs of tube 220 may be pressed into tight engagement with the stub shafts 222 and 224. It is evident that by this construction the tube 220 may be locked to the shafts 222 and 224, so that all three members rotate together, or either end of the tube may be loosened, so that either shaft may be rotated independently of the other. Shaft 224 is fitted with handwheel 228 for turning the shaft independently of tube 220 and shaft 222. Keyed to shaft 222 is worm wheel 232, which meshes with worm 230, pinned to shaft 173, supported in bracket 167 and fitted with crank 216. With the tube 220 locked to shafts 222 and 224, turning of the crank 216 will turn shaft 173 and the worm 230, driving worm wheel 232, and, therefore, the shaft 222, tube 220, and the shaft 224. The worms 214, mounted on the shafts 222 and 224, will in turn drive the worm gears 218 and turn the screw 165, to which these worm gears are keyed. Since the motion of the screw 165 is constrained to rotation, turning the screw, which is threaded in block 212 of the ductor blade, will cause the ductor blade to move toward or away from the roller 114, depending upon the direction of rotation of the screw.

In setting up the machine, the tube 220 is locked to shafts 222 and 224, as above described, and the ductor blade is brought into close proximity with the roller 114. If the space between the ductor blade and the roller at one end is not the same as the space between the ductor blade and the roller at its opposite end, the blade is not parallel to the face of the roller. The blade may be brought into parallelism with the face of the roller by loosening the tube 220 from shaft 224 and turning handwheel 228. Turning this handwheel will turn shaft 224, worm 214, worm gear 218, and screw 165. This will bring the right-hand end of the ductor blade 210 (as viewed in Fig. 23) in or out, as required, to obtain parallelism between the roller and the blade. It will be noted that this adjustment could have been done at the left-hand side of the machine (as viewed in Fig. 23) by loosening the tube 220 from shaft 222 and turning crank 216. The adjustment on this side, however, would take longer to make because of the double worm and gear reduction from crank 216 and screw 165. Once parallelism between the ductor blade 210 and the roller 114 has been established, the tube 220 is locked on the shafts 222 and 224, and turning crank 216 will move the ductor blade parallel to the roller 114 toward or away from the roller 114 to increase or decrease the thickness of the adhesive film on roller 114 as desired. It will also be noted that, due to the double worm and gear reduction and the relatively fine pitch of screws 165, the blade is adapted for very accurate adjustment and fine metering of the adhesive on the surface of roller 114. The excess of the adhesive picked up by the roller 114 will flow down the inclined lower surface of the blade back into the adhesive reservoir or tank 116.

Above the ductor blade 210 and cooperating with the roller 114 is a pair of wiper pads 234, secured to block 175. These pads, which engage the roller face, wipe the surface of the roller 114 at each end free of adhesive and are made of a relatively soft material, such as nylon, so as not to damage the surface of the roller. The coating web 106 is wider than the workpieces 16, and the pads 234 will keep the projecting sides of the web free of adhesive. The wiper pad blocks 175 are slidably mounted on a rod 236, extending transversely of the machine and carried in slide blocks 177 and 177'. These slide blocks are in turn slidably mounted in the upper groove or slot of carrier block 155. Threaded into the blocks 177 and 177', on each side of the machine, are screws 179, whose motion is constrained to rotation in the end brackets 167 and 169, the ends of the screws being fitted with knobs 185. Turning of these knobs will turn the screws 179 and cause the blocks 177 and 177', the rod 236 mounted on these blocks, and wiper pad 234 and wiper block 175 to move toward or away from the roller 114, depending on the direction of rotation of the screw. This adjustment serves to press the wiper pads into contact with the roller 114 with sufficient force to wipe said roller free of adhesive for the width of the pad. To suit the machine to webs of various widths, a further adjustment is added to blocks 175 and pads 234 to cause them to move transversely toward or away from each other, to vary the space between them. Means for making this adjustment are provided as follows:

The slide block 177' on the right-hand side of the machine, as viewed in Fig. 23 and as shown in Fig. 24, carries an inward extension towards the center of the machine on which is mounted the stub shaft 187, carrying an idler sprocket 240. On the left-hand side of the machine, as shown in Fig. 25, the slide block 177 also carries an inwardly extending projection, which provides bearings for a worm shaft and also carries shaft 191, which is rotatably mounted therein. Keyed to one end of the shaft 191 is sprocket 240', and keyed to the other end is worm wheel 246, meshing with worm 244, pinned to shaft 189. A chain 238 is mounted on the sprockets 240 and 240'. From Fig. 23 it will be seen that one block 175 is attached to the upper lead or run of the chain 238, while the other block is attached to the lower lead or run of the chain. Obviously, by turning handwheel 242, the pads can be moved forward or away from each other to adjust them for proper spacing.

In addition to the adjustability of the ductor blade already described, the blade can be pivoted clockwise away from the roller 114 for cleaning purposes.

As previously mentioned, the carrier blocks 155 have shafts 157 pressed into their hubs, these shafts extending through the machine frames 159 and 159' and being rotatably mounted therein. On the left-hand side of the machine, keyed to shaft 157 is worm wheel 250 (Figs. 20 and 25), meshing worm 248, which is pinned to shaft 193. The shaft 193 is free to rotate in bearings in bracket 195, which is fastened to the outside of the machine frame 159 (Figs. 20 and 25). Keyed to the upper portion of shaft 193 is worm gear 197, which meshes with worm 199, pinned to shaft 201. The shaft 201 is mounted in bearings in bracket 203, fastened to the machine frame 159 and is fitted with a crank (not shown). Turning the crank on shaft 201 will evidently turn the carrier block 155 and all parts mounted thereon through the medium of the gear train just described. It should be pointed out that the block 155 and cooperating parts mounted thereon can move only in a clockwise direction from the position shown in Fig. 24 and, of course, counterclockwise back to the same position. To accomplish this, the shaft 157 is fitted with a lever (not shown), which cooperates with a stationary block fastened to the machine frame 159'. With the block 155 in the position shown in Fig. 24, the lever is in contact with the stationary block, preventing counterclockwise rotation of the shaft 157 and, therefore, block 155. This feature allows for pivoting the ductor blade away from the roller 114 for cleaning purposes and to rotate it back to the original position. It should also be noted that the mounting of the ductor blade and wiper pads is such as to allow adjustment of the ductor blade without disrupting the setting of the wiper pads and vice versa.

*Mechanism for controlling thickness of adhesive layer on coating web*

As previously pointed out, after the web 106 passes between adhesive-applying roller 114 and backing roller 118, it passes over a roller 120 with its uncoated face in contact with this roller. The face of the roller 120 is very accurately ground, and cooperating with it is a blade 249, also accurately ground. The function of this construction is accurately to control the thickness of the adhesive coating on the face of the web 106 before the adhesive-coated face of the web is brought into contact with the face of a workpiece.

It will be apparent from Figs. 19, 25, and 27 that, since the blade 249 overlies the cylindrical surface of roller 120, the blade and roller must be in exact alignment, in order accurately to maintain an even thickness of adhesive over the entire width of the coated portion of the web 106. Provision has been made to bring these two elements into exact alignment, as will be described later.

The web 106 often varies slightly in thickness from one edge to the other, and an adjustment has been provided to allow for this variation. Furthermore, since the coating on the web 106 in many cases is a mere film, the blade 249 is provided with an exceedingly fine adjustment relative to the roller 120. The blade 249 is also provided with a coarse adjustment so that it may be brought quickly into relatively close proximity to the top of the web 106. Means are also provided to vary the angle between a vertical plane through the axis of the roller 120 and the plane of the blade 249, as required by different adhesives, and further means are provided to rotate the blade 249 in a counterclockwise direction, as indicated by the arrows in Figs. 19 and 27, for cleaning purposes. The above-mentioned adjustments and further control means will be explained in the detailed description which follows of the elements and instrumentalities connected with this station.

As best seen in Figs. 26 and 27, the roller 120 is fitted at each end with self-aligning ball bearings mounted in flanged eccentrics 251 and 252. These eccentrics are rotatably mounted in blocks 254 and clamped thereto by dogs 205. The ends of backing roller 118 are also provided with self-aligning ball bearings, carried in block 254. As best seen in Fig. 20, the block 254 is slidably mounted in side frames 159 and 159' and fastened at its upper end, through screw 207 and coupling 209, to the piston rod of throw-off cylinders 211. The block 254 also carries adjustment and support means for the coating blade 249.

Considering now the adjustment of the roller 120, it will be seen that a variety of adjustments may be imparted to the roller 120 by turning the eccentrics 251 and 252. For example, by turning the eccentrics to the same amount in the same direction, the axis of the roller 120 will be moved parallel to itself forward or backward. It should be noted that this forward or backward movement is also accompanied by a movement in the vertical plane, since the eccentrics move the axis of the roller 120 in a circular path whose radius is equal to the eccentricity of 251 and 252. Another adjustment may be obtained by holding on eccentric fixed and rotating the other, in which case one end of the roller will be moved forward or backward with respect to the other. A further adjustment is possible by turning one eccentric forward and the other backward, in which case one end of the roller is moved forward and the other backward, the amount of forward or backward movement being proportioned to the amount of rotation of the eccentrics. Evidently, by manipulating the eccentrics 251 and 252, it is possible to bring the axis of the roller 120 into perfect alignment with the blade 249. As previously pointed out, the adjustments in the horizontal plane are accompanied by movements in the vertical plane. These latter movements, however, are compensated for, as will be explained in the description of the blade-adjusting mechanism.

As best seen in Figs. 26 and 27, the coating blade 249 is mounted on a transverse member 256, which is fastened to blocks 213. Pressed into each block 213 are stub shafts 274 and 274', respectively, passing through spherical bearings 258, carried in slide block 260 and held in position therein by bearing caps 215, which are fastened to the slide block 260. Beyond the bearings 258, the stub shaft 274 carries a worm bracket 217, the stub shaft 274 being rotatable therein. The worm bracket 217 is held from rotation by a pin 219, passing through a slot at the upper portion of bracket 217, and pressed into the block 260; keyed to stub shaft 274 is a worm gear 276, meshing with a worm 278, pinned to a shaft 221, journalled in the bracket 217. Fastened to each block 260 is a flange 223, and threaded into this flange is rod 262, which extends upward through brackets 225, which are fastened to the blocks 254 and bridge the slot in which the blocks 260 are slidably mounted. As may be seen in Fig. 26, the rods 262 are threaded at both ends, the lower end being provided with a fine-pitch thread, and the upper end being provided with a relatively coarse-pitch thread. The intermediate, unthreaded portion of rods 262 is key-seated, and mounted thereon are worm gears 266, which are fitted with a short key. The worm gears 266 are constrained to rotary motion by bridge plates 227 and the bracket 225. Threaded on rods 262 above the bridge plates 227 are adjusting nuts 264, provided with anti-friction thrust bearings and with lock nuts 264'. The worm wheels 266 are in mesh with worms 270, pinned to stub shafts of a composite adjusting shaft generally designated as 268, the stub shafts being journalled in the brackets 225. The adjusting shaft 268 is similar in construction to the ductor roll adjusting shaft previously described. In brief, the adjusting shaft 268 is composed of three parts, namely, two outer stub shafts and an intermediate tubular section. The outer stub shafts, to which the worms 270 are pinned, are journalled in the brackets 225 and are fitted at their outer extremities with handles 272. The inner extremities of the stub shafts fit into the tubular intermediate section, whose ends are provided with means whereby they may be engaged or disengaged to or from driving contact with the end stub shafts.

It will be evident from the above description and from Figs. 26 and 27 that, by loosening lock nuts 264' and turning adjusting nuts 264, the coating-regulating knife assembly may be moved toward or away from the roller 120. It will be noted that the rods 262 are held from rotation by the key in worm gear 266, which is a self-locking, single-thread worm gear. For each turn of the adjusting nuts 264, the rods 262 and, therefore, the coating-regulating knife assembly will move up or down a distance equal to the pitch of the relatively coarse thread at the upper portion of the rods 262. It will also be noted that the spherical ball bearings allow each side of the coating-regulating knife assembly to be adjusted separately and by different amounts without impairing its freedom to turn freely in said bearings. This constitutes a quick adjustment of the blade to bring it into relatively close proximity to the cooperating roller 120.

As previously pointed out, the coating-regulating knife assembly is also provided with an exceedingly fine adjustment relative to the roller 120, which is accomplished as follows: After the knife assembly has been brought into close relation by the above described "quick" adjustment, the lock nuts 264' are drawn up tight against the adjusting nuts 264. The action of the lock nuts is to prevent rotation of the adjusting nuts relative to rods 262, which may be caused by vibrations of the machine, and the anti-friction thrust bearing in adjusting nut 264 frees said nut from any frictional drag which would be imposed on it by the bridge plate 227, if the nut were in direct contact with bridge plate 227. The frictional drag above referred to would tend to rotate the nut 264 relatively to rod 262 when the latter is turned by worm gear 266. With the above construction, however, tightening of the lock nuts 264' will allow the adjusting nut 264 to turn freely as an integral part of the rod 262. From Fig. 26 it may be seen that, with the lock nuts drawn up tight against the adjusting nuts 264, the rod 262 is restrained from any motion downward, since, in effect, the nuts 264 and 264' form an integral part of rod 262. The rod 262 is further restrained from any motion upward by the force of gravity of the coating-regulating knife assembly. The motion of the rod 262 is, therefore, constrained to rotation. Turning handle 272 will turn worm gear 266, which will turn rod 262, keyed to it. Turning of the rod 262 will cause the threaded flanges 223 to climb up or down on the lower threaded portion of the rods 262 and thereby adjust the coating-regulating knife assembly bodily toward or away from the roller 120. It will be noted that, with a large reduction ratio between the worm 270 and the worm gear 266 and a fine-pitch thread at the lower extremity of rod 262, an extremely fine adjustment may be obtained in the order of a fraction of a thousandth of an inch per revolution of handle 272.

As previously pointed out, the split construction of the shaft 268 allows for separate adjustment of each side of the coating blade to compensate for either or both variation in thickness along the width of the web 106 and obliquity (in the vertical plane) of roller 120 resulting from the vertical movement imparted to the roller 120 by the eccentrics 251 and 252. After the coating blade assembly has been adjusted to pass the same thickness of adhesive over the width of the web 106, the tubular portion of shaft 268 may be clamped to the stub shafts, and the coating knife assembly may be moved parallel to this setting to allow a greater or lesser thickness of adhesive to pass through by turning either one of the handles 272 at either side of the machine.

As previously pointed out, the blade assembly may also be pivoted about the stub shafts 274 and 274' in the counterclockwise direction, as shown by the arrows in Figs. 19 and 27. This pivoting action is accomplished by turning crank 280, best shown in Fig. 20. The crank 280 is fixed to shaft 229, which is rotatably and slidably mounted in a spherical bearing carried in bracket 231, fastened to machine frame 159. The inner extremity of the shaft 229 is connected through universal joint 233 to worm shaft 221. The universal joint 233 and the spherical bearing in bracket 231 are provided to allow vertical travel of block 254 without damage to shafts 221 and 229 or interference with their operation in either the "up" or "down" position of block 254.

Clockwise rotation of the coating blade assembly is prevented by screws 235, carried by inwardly extending projections on bearing caps 215. These screws bear against the rear end of carrier blocks 213 to provide a stop against clockwise rotation of the coating blade assembly. It is evident that by moving the screws 235 in or out, the angularity of the blade assembly with respect to the roller 120 may be changed. Once this angularity has been established, the blade assembly may be swung anticlockwise in the direction of the arrow for cleaning purposes and then swung back to the original position against the stop screws 235. Evidently, turning of hand crank 280 will turn shafts 229 and 221, the worm 278, pinned to shaft 221, turning the worm gear 276 and thereby the coating knife assembly, which is keyed to worm gear 276 through stub shaft 274. It should also be noted that the mounting of worm bracket 217 is such as to allow a great degree of obliquity of the coating blade without interfering with the mesh between worm 278 and worm wheel 276.

To provide against undesirable lateral spreading of the adhesive under the action of the blade 249, the blade carries two side dams or shoes 282, slidably mounted in blocks 284, mounted on the face of the coating-knife carrier 256. The blocks 284 and, hence, the dams or shoes are capable of adjustment relative to each other to accommodate webs of different widths. Each shoe or dam is slidably mounted on its supporting bracket 284 and is urged toward the web 106 by its own weight and the action of light spring 286.

Backing roller adjustment

Provision is also made to bring the backing roller 118 into proper operating position with the coating roller 114. As previously mentioned, the backing roller is supported in self-aligning bearings carried in slide block 254. The slide block 254 is supported by the piston rods of the throw-off cylinder 211 through the medium of couplings 209 and screws 207. The screws are provided with left-hand and right-hand threads at their upper and lower ends, respectively. The lower ends of screws 207 are threaded into the block 254 and the upper ends into the lower half of coupling 209. The couplings 209 are of standard construction, being composed of two parts fastened together by bolts or screws through their flanges. As previously mentioned, the lower half of the coupling 209 is threaded to receive the upper portion of the screws 207; the upper half is pinned or otherwise fastened to the piston rod of cylinder 211. The piston rod of cylinder 211 is provided with an anti-rotation element to prevent rotation of the piston rod when the screws 207 are turned. In operation, the backing roller is brought into close proximity to the roller 114 so that the web 106 almost touches but does not come in contact with the surface of roller 114.

As will be explained later, provision is also made to lift the web 106 away from the coating position, when it is desired to run the coating roller independently of the rest of the machine to prevent adhesive from setting up on the roller 114, the lifting action being exerted through the throw-off cylinder 211.

Tension-equalizing snub roller

As already explained, the web 106, after it passes the roller 120 and blade 249, is led over a tension-equalizing snub roller 122. The function of this roller is twofold, namely, to equalize the tension on each side of the web and to vary the angle of wrap of the web 106 on roller 124 in order to secure a smoother, wrinkle-free application of the film to the workpieces 16. The roller 122 is ball-bearing-mounted on a shaft 239, which is mounted in spherical bearings carried in slide block 288. The block 288 is slidably mounted between rails 237, fastened to the machine frames. Threaded into the blocks 288 is a screw 290, which is constrained to rotation in cap 241, fastened to rails 237. The screws 290 are fitted with hand cranks 292. Obviously, turning of the handles 292 will cause the blocks 288 and, therefore, the roller 122 to move toward or away from roller 124, and, due to the spherical bearings in the blocks 288, one side may be moved independently of the other in order to equalize the tension on each side of the web 106.

Combining station

From the roller 122 (Fig. 19), the coated web 106 proceeds to the laminating or combining station, where it is applied to or combined with successive workpieces 16 as the web and workpieces pass between the combining rollers 124 and 126. The faces of the combining rollers are treated with a resilient material, such as rubber, so as not to produce unsightly patterns in the work due to hard spots in the film-supporting web or due to uneven thickness in the workpieces. The lower combining roller 126 is ball-bearing mounted in blocks fixed to the machine frames. The upper roller 124 is provided with three adjustments: one to raise and lower it in order to accommodate work of different thickness, one to vary the pressure with which it engages the web and workpieces as they pass between the rollers, and a third adjustment quickly to throw the upper roller 124 out of active engagement with the workpieces.

To facilitate the above adjustments, I provide a slide guided by and vertically adjustable between the frames 159 and 243. The slide (Fig. 19) is composed of two vertical members 245, an upper horizontal member 298, and a lower horizontal member 247, forming a rigid rectangular frame-like structure. Bridging the opening between frames 159 and 243 at their upper ends and fastened to these frames is worm bracket 249' (Fig. 20). Carried by and rotatably mounted in the bracket 249' is a threaded member 304. This member, above its threaded portion, is provided with a shoulder or collar of substantially larger diameter, which fits into the bracket 249'. Above the shoulder, the threaded member or rod 304 has a cylindrical, unthreaded portion of substantially the same diameter as the threaded part which passes through a bore in the hub of the bracket 249'. Pinned to this upper extension of rod 304, above the hub of bracket 249', is a worm gear 312. It will be evident that the rod 304 is constrained to rotation in the bore of bracket 249'.

The rod 304 is threaded into the upper horizontal member 298 of the slide, so that turning of the rod 304 will cause the slide and everything mounted thereon to move up or down.

Inside the slide, below the cross-piece 298, is a cross-piece 300, which is capable of vertical movement within the slide and carries worm brackets 257. Threaded on rod 304 above the cross-piece 300 is worm gear 306, which meshes with worm 318, pinned to shaft 253, journalled in brackets 257. Below the gear 306, the threaded portion of rod 304 passes freely through the cross-piece 300 and extends beyond its lower face. Between the cross-piece 300 and lower cross-piece 302 is a compression spring 310. Like 300, the cross-piece 302 is slidably mounted inside the slide. The cross-piece 302 is bored to receive throw-off rod 320. The throw-off rod 320, in the position shown, is in contact with a wear plate 255, fastened to block 294. The block 294 is provided with ball bearings in which the upper combining roller 124 is journalled. The blocks 294 are slidably mounted within the slide and are supported by springs 322, which rest on the lower slide cross-piece 247 and fit into recesses machined in the lower face of bearing block 294. The force exerted by these springs is slightly greater than the combined weight of upper combining roller 124, bearing blocks 294, and any other elements mounted on the roller 124 or blocks 294. Between the cross-piece 302 and the block 294 each vertical member 245 is fitted with a square key 257′, which projects inwardly in the path of cross-piece 302 and block 294. The function of the keys 257′ is to limit the downward motion of cross-piece 302 in order to allow the block 294 to be thrust upward by the springs 322 when the throw-off rod 320 is moved to the off-position.

Worm gear 312 meshes with a worm 314, pinned to shaft 316, which is journalled in bracket 249 and is fitted with a crank handle (not shown) at each end. Obviously, rotation of the shaft 316 would rotate the rod 304 to raise or lower the slides and all elements carried in or by the slides. This adjustment serves to raise or lower the upper combining roller 124, in order to accommodate it to workpieces of different thickness.

As previously mentioned, the pressure exerted by the upper combining roller 124 on the workpieces is also adjustable. This adjustment is made by turning the shaft 253. Turning of the shaft 253 in the proper direction will turn the threaded worm gear through worm 318. While turning, the worm gear 306 will travel downwardly along the threaded portion of rod 304, forcing the cross-piece 300 downward, thereby compressing the spring 310 and increasing the pressure between the upper combining roller 124 and the workpieces 16. Conversely, this pressure may be reduced by turning the shaft 253 in the opposite direction. This will cause the worm gear 306 to travel upwardly, and the cross-piece 300 will also travel upwardly in contact with the hub of gear 306, being forced to travel upwardly by the action of spring 310 as it is allowed to expand in order to reduce the pressure. It should be noted that the construction is such as to allow this adjustment without disturbing the mesh of worm gear 306 with worm 318, since all parts are constrained to move in unison in the same direction and by the same amount.

To provide for quick disengagement of the roller 124 from the work, the rod 320 is provided with flats 324 within each cross-piece 302. The throw-off rod 320 carries a handle 326 (Fig. 20) and, by turning this handle, the throw-off rod may be turned until the flat 324 has been rotated 180° from the position shown in Fig. 19. At this position the spring 310 will force the cross-piece 302 downward a small amount against the key 257′. Simultaneously, the springs 322 will force the blocks 294, and thereby the roller 124, upward an amount sufficient to throw the roller 124 out of active engagement with the workpieces.

It should be noted that the slide may be raised or lowered without disturbing the pressure setting, and that the pressure may be varied without disturbing the slide setting.

*Discharge conveyor*

From the combining station the workpieces are advanced by the combining rollers 124 and 126 over support rollers 259 and 180 to the cut-off and discharge section of the machine. Beyond the support roller 180 the workpieces are carried by a belt 325. This belt, which is slightly smaller in width than the width of the narrowest workpiece, extends from the drive pulley 327 to the tail pulley 328, this latter pulley being provided with means for adjusting the belt tension through screws 261 (Fig. 6). The upper run of belt 325 is supported by idler rollers 329, 330, 332, and 338, and, as seen in Figs. 3 and 33, the belt is snubbed over rollers 338 and 336 and rollers 334 and 332 to provide an opening for the rollers 344, carried by the cut-off knife carriage and to allow the cut-off blade to travel substantially below the workpieces without damaging the belt.

The discharge section of the machine is also provided with three hold-down or presser rollers 331, two overlying the rollers 329 and 338 in front of the cut-off station and one overlying the roller 332 in back of the cut-off station. As best shown in Fig. 35, the rollers 331 are capable of vertical adjustment to accommodate workpieces of different thickness and resiliently mounted to accommodate slight variations in thickness in individual workpieces. To facilitate the above adjustments, vertically extending guide bars 263 are fastened to the frames 265 and 267. Also fastened to the side frames 265 and 267 and to the guide bars 263 is block 269. Rotatably mounted in block 269 is the vertically extending, shouldered rod 271, this rod being constrained to rotation in block 269 by its shoulder and a collar pinned to its lower extremity. Above the shoulder, the rod 271 carries a threaded portion, which passes through a tapped hole in the lower portion of carrier yoke 273. The motion of the yoke 273 is restricted to vertical translation, rotation being prevented by the guide bars 263, between which it is mounted with only sufficient clearance to allow it to slide freely. As seen in Fig. 35, the yoke 273 is hollowed out at its central portion in a U-shape, and its upper portion is threaded to receive threaded bushing 275. Above the threaded portion, the rod 271 is turned down to a smaller diameter and extends through slide blocks 277 and worm brackets 279, which is fastened to the upper extremities of guide bars 263. The block 277 is slidably mounted between guide bars 263 and on rod 271 and is urged downward toward the lower threaded portion of yoke 273 by the action of a spring 281, whose pressure may be varied through the threaded bushing 275. The rollers 331 are ball-bearing-mounted on rods 283, which are pinned to the slide blocks 277.

Keyed or pinned to the upper portion of rod 271 above the worm bracket 279 is worm gear 285, which meshes with worm 287, pinned to shaft 289, journaled in brackets 279. Pinned to the shaft 289 outside the brackets 279 is a crank handle (not shown), provided for manually adjusting the vertical position of roller 331 with respect to the upper surface of the combined web and workpiece. It will be evident from the above description and from Fig. 35 that turning of shaft 289 will turn rod 275 through worm 287 and worm gear 285. Turning of rod 271 will cause yoke 273, which acts like a nut, to move up or down on the threaded portion of rod 271. This motion will also be imparted to the block 277, since this block is urged into contact with yoke 273 by the action of spring 281. Raising or lowering of the yoke 273 will, therefore, raise or lower the slide block 277 and, consequently, the rollers 331, carried by rod 283, which is pinned to block 277. It will also be evident that for any one setting of the yoke 273 corresponding to a given work thickness the block is free to float within the yoke under the action of spring 281, thereby accommodating slight variations in work thickness in any one run.

As previously mentioned, the pressure exerted by the spring 281 on block 277 and, therefore, on roller 331 is adjustable through threaded bushing 275. This pressure is adjusted to that necessary to press the workpieces 16 into active, frictional contact with the belt 325, so that workpieces are urged through the cut-off station properly spaced. In this connection it was pointed out previously that the speed of belt 325 is slightly higher than work speed. The pressure exerted by the springs 281 should, therefore, be sufficiently high to ensure that the belt will carry the workpieces at work speed but should be low enough to allow slippage of the belt with respect to the workpieces without tearing the web or imposing excessive tension on the web which would damage the treated surface of the workpieces. At this station, therefore, the workpieces proceed in spaced relation at work speed with a slight tension in the web bridging the gap between successive workpieces, this tension being produced by the slight difference between work speed and belt speed.

This section of the machine is also provided with adjustable side guide rollers. These rollers are identical in construction and serve a similar purpose as the side guide rollers at the charging end of the machine, illustrated in Figs. 44 and 45.

Cut-off mechanism

Reference will now be made particularly to Figs. 3 and 33-40 of the drawings. It will be appreciated that, because the coating material is in the form of a continuous web 106, successive workpieces 16 will be attached to each other by the web, end to end and slightly spaced from each other, so that it becomes necessary to sever the web between adjacent workpieces before discharging the workpieces from the machine. It has already been noted that the workpieces are fed forward slightly spaced from each other, and means are provided to be described in detail later on, to maintain this space with a predetermined range. The cut-off mechanism must operate so as to sever the web at each gap between adjacent workpieces. At this time it should be noted also that the work is advancing continuously in a horizontal plane, and, inasmuch as the cut-off knife or blade is in effect a vertically movable knife, it becomes necessary, in addition to its vertical movement, for this knife to move horizontally in the direction of travel of the workpieces, so that, when it engages the web 106, it will not only be moving vertically but forwardly in very close synchronism with work speed to ensure that the blade descends between workpieces. After the work has been severed and with the blade still traveling in the direction of work travel in close synchronism with work speed, the blade must be raised above the top surface of the work and in such raised position be returned to its initial starting position against the direction of work travel.

Referring to Figs. 33-38 and particularly to Figs. 33 and 34, it will be seen that 340 designates the cut-off blade or knife, which, as shown in Fig. 33, is mounted above the work. Extending transversely of the machine, behind and in front of the cut-off blade 340, is a hold-down plate or pad 342. These plates press upon the work during the cut-off operation and hold the work against a pair of lower rollers 344, located beneath the work. The cut-off blade is affixed to a blade-supporting member 346, extending transversely of the machine and mounted at each end in a bracket 348, carried by vertically extending posts 350. Each bracket 348 is provided with a worm gear 352, threaded on the posts 350, so that, by rotating the worm gears 352 through the medium of worms 354, the cut-off blade can be adjusted vertically of the posts 350 to accommodate workpieces of different thickness. The hold-down pads or plates 342 are carried by vertically extending studs 356, which extend freely through thimbles 358, threaded through the web of the blade-supporting member 346 (see Fig. 37). Each stud 356 carries an adjusting nut 360 at its upper end, and by adjusting these nuts, the hold-down pads can be adjusted vertically relatively to the blade. Between the threaded thimble 358 and the pads is a spring 362, whose load on the pads may be adjusted through the threaded thimble 358.

Upon reference to Figs. 3 and 33-43, inclusive, it will be seen that each of the posts 350, which carry the cut-off blade 340 and the pads 342, extends through a carriage 364. These carriages also carry the rollers 344, which cooperate with the hold-down pads 342. Each carriage 364 is supported by a rod 366, which extends lengthwise of the machine, each rod being supported by mounts or brackets 368, affixed to the machine frame (Figs. 39 and 40). Each carriage is provided with rack teeth 370, constantly meshing with a gear 372, fixed to each end of a rotatable rod or shaft 374, which extends transversely of the machine.

As best seen in Fig. 34, an anti-rotation element 359 is pinned to each post 350 and overlies a machined surface at the upper portion of each carriage 364. The function of elements 359 is to prevent rotation of the posts 350 and to confine their motion to vertical translation and limit their upward movement. Threaded through the lower portion of each carriage 364 is a bushing 361, to enable the pressure of springs 384, which surround the posts 350, to be adjusted.

Upon reference to Figs. 33 and 34, for example, it will be seen that a cam follower or roller 376 is affixed to the lower end of each of the blade-carrying posts or rods 350, each roller cooperating with a cam 378, each of which is pivoted at 380 to a fixed part of the machine, the cams being prevented from pivoting counterclockwise by a pin 418, acting against the tail 420 of each cam. From Fig. 33 it will be apparent that movement of the carriages 364 to the right will cause the rollers 376 to ride along the face 382 of each of the cams 378, so that the posts 350 and, hence, the cut-off blade 340 etc. will be cammed downwardly toward the work against the action of the loading springs 384 of the posts. It will be apparent also that, when the rollers 376 ride off the cam faces 382, the cut-off blade can move upwardly away from the work under the action of the springs 384.

As previously pointed out, the cams 378 pivot in a clockwise direction, and it is obvious, therefore, that, as the cam follower roller 376 engages the face 386 of a cam 378, the cam will be pivoted clockwise by the roller as the roller is forced upward by spring 384. The cam follower roller, therefore, would not be constrained to follow cam face 386 but would suddenly be forced vertically by spring 384. To prevent this action and oblige the cam follower rollers to follow the face 386 of the cams and, hence, obtain a gradual shock-free rise of the blade assembly, I provide rollers 363, which are carried by chains 414, which constitute part of the actuating mechanism for the carriages 364, these rollers being spaced properly with respect to the driving lugs 416 with which the chains are provided. These rollers 363, moreover, are of such dimensions as to fill the space between the top of each cam 378 and the bottom of carriages 364. It will be obvious, therefore, that, as a cam follower roller 376 passes from cam face 382 to cam face 386, the rollers 363 will overlie the top of the cam to prevent pivoting of the cam clockwise and constrain the cam follower roller to follow the cam face.

Referring to Figs. 33, 34, 38, and 39, it will be seen that the shaft 374, which carries the carriage-actuating gears 372, carries another gear 388. This gear 388 is in constant mesh with a rack bar 390, extending lengthwise of the machine, one end of this rack bar being attached to the face of a rotary crank disc 392, to effect reciprocation of the rack bar. Keyed to the shaft 374 is an inner jaw clutch member 394, the hub of which extends into the bore of the gear 388, to provide a bearing for the gear, the gear being rotatable on this hub.

The inner clutch member 394 (Fig. 39) carries a raised sector extending roughly 135° from rear face 399 to front face 401. The hub of gear 388 is partially machined away, leaving only a sector 402 extending roughly 135° from its front face 395 to its rear face 403. In operation, the sectored hub 402 of gear 388 acts as the outer jaw clutch member, the face 395 of sector 402 acting on the face 399 of the inner clutch member to drive this member and, hence, shaft 374 clockwise. The space between the face 401 of the inner clutch member and the face 403 of the outer clutch member represents the amount that the inner clutch member can override the outer clutch member in a clockwise direction. Mounted on the gear 388 is a circular plate 398. This plate is bored a free fit on the sectored hub of gear 388 and is secured to the gear 388 by screws 396, passing through curved, counterbored slots 397 in plate 398. The slots 397 permit limited adjustment of the plate 398 with respect to the gear 388. The plate 398 also carries a pin 412, which actuates a pawl 406 and the limiting stop pin 405 for the pawl. Keyed to the shaft 374 immediately adjacent the inner clutch member 394 is a ratchet 404. Rotatably mounted on the hub of this ratchet is the pawl carrier arm 408, carrying the pawl 406, this arm being held from axial movement by a collar 407, fastened to the shaft 374. The pawl 406, which is pivotally carried at the outer end of the carrier arm 408, is bifurcated at its outer end to receive a pin 412, carried in plate 398.

The rack bar 390 is held in constant mesh with the gear 388 by a guide 409, which is pivotally mounted on the shaft 374. The outer end of rack bar 390 is pivotally connected to crank plate or disc 392 by crank pin 411. The crank disc 392 is fastened to a shaft 560, journalled in bearings in a bracket 413, which is fastened to the discharge conveyor side frames at the far side of the machine. This shaft 560 and the crank disc 392 are driven intermittently through a single-revolution clutch 558, which is tripped by a pin 415 on the carriage chain 414, through a lever 419 mounted on rocker shaft 421, which is also pivotally mounted on the bracket 413. The lever 419 is urged toward the shaft 560 by spring 423, one end of which is fastened to the bracket 413 and the other to the lever 419. The rocker shaft 421 also carries the stop lug or lever for the single-revolution clutch 558, this stop lug being similar to the lug 720, shown on Fig. 41.

Each chain 414 for the carriages 364 is provided with a plurality of lugs 416. The lugs 416 straddle the chain 414 and are pivotally mounted at their forward end to the chain. At their rear end these lugs are provided with rollers 425, which ride on rails 417, carried by the brackets 368. These rollers are urged into contact with the rails 417 by spring 427. The upper run of each chain 414 is supported by a rail 429, which is also carried by the brackets 368.

With the above description in mind, the operation of the cut-off cycle is as follows:

Before the beginning of the cut-off cycle the carriages 364 are stationary in their extreme left-hand position. (Fig. 33 shows the carriages in the position they occupy approximately one-quarter of a cycle after a cut-off cycle has been initiated.) At this time the chains 414 are also stationary with the lugs 416 spaced rearwardly of the carriages a definite calculated distance. Meanwhile, workpieces are moving continuously through the machine. As the leading edge of a workpiece passes past the second hold-down roller 331, it closes switch 712 (in a manner to be described later on), which energizes a solenoid which trips single-revolution clutch 536. Tripping of the clutch 536 sets the chains 414 in motion at close to work speed. The carriages are still stationary, since the lugs 416 are not in contact with the carriages as yet. As the chain travel continues and a lug 416 approaches a carriage 364, single-revolution clutch 558 is tripped by pin 415. Tripping of the clutch 558 allows crank disc 392 to rotate, and the rack bar 390 is urged to the left, turning the gear 388 clockwise.

Fig. 39 shows the relation of the inner and outer jaw clutch members at the beginning of the cut-off cycle. It will be seen from this figure that the face 399 of the inner clutch member 394 is separated by a small space from the face 395 of the outer clutch member on gear 388. As the rack bar 390 moves to the left, the gear 388, its hub sector 402, and the plate 398 start to rotate clockwise, no motion being imparted to the shaft 374, since the faces 395 and 399 of the inner and outer clutch members are not yet in contact. Rotation of the plate 398 rotates the pin 412, pivoting the pawl 406 out of the path of the teeth of ratchet 404 against the stop pin 405. As the rack bar 390 moves further to the left, the faces 395 and 399 come in contact, thereby imparting motion to the inner clutch member 394 and to the shaft 374. Turning of the shaft 374 turns gear 372, which in turn moves the racks 370 and thereby the carriages 364 to the right (as viewed in Fig. 32). It should be noted that the crank-actuated rack bar 390 gradually accelerates the carriages 364 from zero velocity to a maximum velocity equal to the velocity of chains 414. As the carriages are accelerated to maximum velocity, the lugs 416 (traveling at constant speed) approach the carriages 364 and finally, at one-quarter turn of the crank disc 392, engage them. From this point on, the chains 414 take control of driving the carriages and, hence, the shaft 374 through gear 372, while the gear 388 decelerates as the rack bar 390 continues to the left during the second quarter of a revolution of the crank disc. As may be seen from Figs. 38 and 39, the inner clutch member 394 is free to overspeed the gear 388, due to the space between the face 401 of the inner clutch member and the face 403 of the outer clutch member. Moreover, as previously mentioned, the pawl 406 has been moved out of the path of the teeth of the ratchet wheel 404. This ratchet, therefore, is also free to rotate with the shaft 374 without interference with the pawl 406, which is contrained to move at the speed of gear 388 by the pin 412. As the carriages 364 are moved to the right by the chain lugs 416, the roller 376 impinges on the face 382 of the stationary cam 378, causing the roller, the rods or posts 350 and, therefore, the blade assembly to descend to sever the web as the blade 340 passes through the gap between the leading and trailing edges of successive workpieces. Further movement of the carriages 364, still under the control of the lugs 416, allows the rollers 376 to be urged upward along the face 386 of each cam 378 by the springs 384, thus returning the blade to its original position above the top surface of the workpieces.

As soon as the blade 340 has been allowed to return to its position above the work, the lugs 416 fall away from active engagement with the carriages 364 by dropping (under the action of spring 427) into cut-outs 419 in the rails 417. Here the carriage stops, while the chain 414 continues to run until the end of one revolution of the single-revolution clutch 536, when it is stopped by the action of the clutch stop and the positive stop cam. While the chains had control of the carriages 364, the gear 388 was continuing to move clockwise at an ever decreasing rate of speed, this action continuing until the face 395 of the outer clutch member of gear 388 catches up to the face 399 of the inner clutch member, which has been stationary since the lugs 416 dropped out of engagement with the carriages 364. It should be noted that at this time the gear 388 is traveling at a very low rate of speed, so that the faces 395 and 399 come in contact with hardly any impact.

By this time the crank disc 392 has almost completed one-half revolution. The rack bar 390 now takes control of the carriages, causing them to move a short distance to the right until the crank disc has rotated a full one-half revolution. As the crank disc continues to rotate, the rack bar 390 is drawn to the right, turning gear 388 counterclockwise. Counterclockwise rotation of this gear will not impart motion to the shaft 374, since the sector 402 is free to rotate in the space between the face 403 of sector 402 and the face 401 of the inner clutch member 394. However, turning of the gear 388 counterclockwise causes the pin 412 to swing the tail 408 of pawl 406 into engagement with a tooth of the ratchet 404. The initial movement of gear 388 in forcing the pawl 406 into active engagement with ratchet 404 re-establishes the small gap which existed at the beginning of the cycle between the faces 395 and 399 of the inner and outer clutch members. Continued counterclockwise rotation of gear 388 will cause the shaft 374 to rotate counterclockwise through the pawl and ratchet. Turning of shaft 374 counterclockwise will move the carriages 364 to the left under the action of gears 372 and racks 370 until the carriages are returned to original position at the end of a full revolution of the crank disc 392, when the motion of the crank disc is stopped by the stop lever acting on the single-revolution clutch 558. It should be noted that the carriages are brought back to their original position by gradually accelerating them from zero velocity to chain velocity and then gradually decelerating back to zero velocity. Furthermore, it should be noted that, during the return stroke, the blade 340 is carried back into "up" or elevated position and is not caused to descend, since the cam 378 is pivoted clockwise by the roller 376 as it is returned to the left to its original starting position.

Drive

It now will be appreciated that, in operation, it becomes necessary to drive the feed chain 18, the adhesive-applying roller 114, the combining rollers 124 and 126, the cut-off mechanism, and the discharge conveyor pulley 327. An expanded layout of the drive is shown in Fig. 43, to which particular reference will now be made.

421 designates the driving motor for the machine. This motor drives a main drive shaft 424 through chain 422 and sprocket 423. Fixed on the shaft 424 is a sprocket 426, which, through chain 427, drives one element of an idler compound sprocket 428, on a shaft 430. The other element of compound sprocket 428, through chain 429, drives a sprocket 432, which is fixed to shaft 434 of a friction clutch 436. On the hub of this clutch is a sprocket 438, which, through chain 440 and sprocket 442, drives the adhesive-applying roller 114.

On the outer end of the main drive shaft 424 is a sprocket 444, which drives a sprocket 446 on main drive clutch 448, which is mounted on shaft 430, so that, when the clutch is engaged, shaft 430 will be rotated. Fixed to the shaft 430 is a sprocket 450, which, through chain 451, drives sprocket 452 on a shaft 454, carrying a gear 456, meshing with gear 458 on the lower combining roller 126.

The gear 458 meshes with a compound gear 460, which idles on fixed stud 462, mounted on the machine side frames and carrying a bracket 464 (see Fig. 21). This bracket is forked, as seen at 466, so as to receive the shaft of the upper combining roller 124. The bracket 464 is provided with a stud 468, carrying idler gear 470, meshing with the inner element 472 of the compound gear 460 and with gear 474, mounted on the shaft of the upper combining roller 124. This construction permits the upper combining roller 124 to be raised considerably to accommodate work of different thickness without appreciably disturbing the mesh of gears 474 and 470.

Feed chain drive

Fixed to the shaft 430, which is driven when the clutch 448 is engaged, as will be understood, is a sprocket 476, which drives a sprocket 478 through chain 477. This sprocket is fixed to the input shaft of a variable-speed drive 480. The output shaft of this variable-speed drive carries a sprocket 482, which drives a sprocket 484 on a shaft 486. On one end of this shaft 486 is a gear 488, meshing with a gear 490 on a shaft 492, carrying an overrunning clutch 494. On the hub of this clutch is a sprocket 496, driving a sprocket 498 on the shaft 26. Affixed to shaft 26, as above pointed out, is one sprocket 22 for the feed chain 18, the other sprocket 20 for the feed chain idling on tie rod 24.

Discharge conveyor drive

The output shaft 499 of the variable-speed drive 480 carries a sprocket 500, which, through chain 502, is connected to one element of a compound idler sprocket 504 on the shaft 430. The other element of this compound idler sprocket is connected by a chain 506 to a sprocket 508 on a shaft 510. This shaft 510 carries a gear 512, meshing with a gear 514, mounted on a shaft 516. The shaft 516 carries a sprocket 518, connected by a chain to a sprocket 520, attached to the discharge conveyor pulley 327.

Pusher chain drive

The shaft 516 also carries another sprocket 522, which drives a sprocket 524, fast on a shaft 526. On one end of the shaft 526 is a fixed sprocket 528, and on the other end is a fixed sprocket 530. The sprocket 528, through chain 532, is connected to a sprocket 534 on the hub of a single-revolution clutch 536. The clutch shaft 538 carries a sprocket 540, connected, through chain 541, to sprocket 542, fixed to shaft 544. Fixed to this shaft are sprockets 546 and 548. The sprocket 546 and a sprocket 550, idling on the shaft 526, carry one of the pusher chains 414 of the cut-off mechanism, the sprocket 548 on shaft 544 and a sprocket 552, idling on the shaft 526, carrying the other pusher chain 414. The sprocket 530, already referred to and which is fixed to the shaft 526, drives a sprocket 556, through chain 554, on the hub of a single-revolution clutch 558, carried by shaft 560. This shaft drives the crank disc 392, whose function has been described in connection with the cut-off mechanism.

From the description thus far given of the drive for my machine, it will be apparent that, with the circuit of the main motor 421 closed, the loading chain 18, combining rollers 124 and 126, adhesive-applying roller 114, the cut-off mechanism, and the discharge conveyor 324 will all be driven.

As already pointed out, the workpieces are fed through the machine successively in slightly spaced relation to each other in order that the sheet material with which the workpieces are combined may be severed at the gap between successive workpieces. It has been pointed out also that the workpieces are moved forward by the loading chain 18 until the leading end of each workpiece is nipped between the driven combining rollers 124 and 126. These rollers are driven at a slightly higher peripheral speed than the linear speed imparted to the workpieces by the loading chain 18, to eliminate expensive, accurate machining and to prevent butting and damage to the workpieces such as would occur were chain speed higher than roller speed. It will be apparent, therefore, that, unless some correction is made in the driving mechanism from time to time, the gap between successive workpieces will become wider and wider. In the machine of this invention, the combining rollers are driven at constant revolutions per minute, and, hence, means have been provided for momentarily accelerating the loading or feed chain 18 whenever the gap between successive workpieces reaches the maximum width for which the machine has been designed, which in this instance is about one inch. The minimum gap width is one-half inch. Means have been provided also to bring the speed of the feed chain 18 into very close synchronism with work speed while allowing the gap between successive workpieces to increase at a very slow rate to a predetermined maximum limit, at which point the chain is accelerated to restore the gap to its predetermined minimum width.

Work-speed measuring mechanism

As the machine is automatic in operation, some means must be provided for measuring the work speed and comparing it with the loading chain speed.

With reference to this feature of the invention it will be seen that, as each workpiece advances, it passes between upper roller 92 and lower roller 88 just beyond the brush 72. The lower roller 88 functions as a speed-measuring device in that it is very accurately ground and is driven by the workpieces as they pass between it and the upper roller 92. The speed-measuring roller 88 carries a sprocket 562, which is connected by a chain 564 to a sprocket 566 on the hub of overrunning clutch 567, mounted on one end of the work-speed input shaft 568 of a differential 570. On the opposite end of the work-speed input shaft 568 is a sprocket 572, mounted on the hub of an overrunning clutch 573 and connected by chain 574 to a sprocket 576. The sprocket 576 is compounded with gear 578 and idles on a stationary stud mounted on a bracket which is supported by shafts 424 and 430, these shafts being rotatable in the bracket. The gear 578 is in constant mesh with gear 580, which carries sprocket 582 keyed to its hub. This gear and sprocket combination idles on a second stud carried by the bracket above referred to. The sprocket 582 is connected by a chain to sprocket 584, fixed to shaft 430.

The shaft 586 of the differential 570 may be termed the feed-chain-speed input shaft in that it carries a sprocket 588, connected by a chain 590 to sprocket 592, which in turn is connected through bevel gearing 594 and 596 to the shaft 26, which drives the sprocket 22 for the feed chain 18. The output shaft 597 of the differential carries a sprocket 598, which is connected by a chain 599 to sprocket 600, pinned to the speed-changing screw of the variable-speed drive 480.

The sprocket 566, carried by the work-speed input shaft 568 of the differential 570 and connected by chain 564 to the sprocket 562, attached to speed-measuring roller 88, is mounted on overrunning clutch 567.

Differential

The differential 570 is of the conventional three-shaft, spur-gear type and operates as follows:

If the two outside or input shafts 568 and 586 rotate at the same rate, the center or output shaft 597 remains stationary. However, if the two input shafts revolve at different rates, the output shaft revolves at a rate equal to one-half the difference between the r.p.m. of the two input shafts, revolving either clockwise or counterclockwise. The direction of rotation depends on the "high" input speed. For example, the output shaft 597 will revolve clockwise if the input shaft 586 revolves faster than the input shaft 568, and, conversely, the output shaft will revolve counterclockwise if the input shaft 568 revolves faster than the input shaft 586.

The function of the differential is to bring the speed of the feed chain 18 and the cut-off chains 414 into very close synchronism with work speed. It has been previously pointed out that the "design" speed of the chains above referred to, that is, the speed as calculated from the diameter of the sprocket 22 of the feed chain and the sprockets 546 and 548 of the cut-off chains, is lower than the "design" speed of the combining rollers 134 and 126. This is done to prevent the butting and overlapping of workpieces which would result if the chain speed were slightly higher than the combining roller speed. However, the speed difference above referred to would eventually interfere with the proper operation of the machine, for, in spite of the small magnitude of this difference (being a fraction of 1%), it would allow the gap between the trailing and leading edges of successive workpieces to increase gradually to a maximum of a work-cycle length. It should be obvious that this is objectionable not only because of the waste of the relatively expensive coating web, but excessive gap width would interfere with the cut-off operation, as it would allow the tacky, coated web to be laminated with the discharge conveyor belt 325.

As previously pointed out, the rollers 124 and 126 are rubber-covered, and these rollers, when under pressure, impart a speed to the workpieces which is greater than the surface speed of the combining rollers as calculated from the product of the circumference of the rollers and their angular velocity. This difference between "actual" work speed and "design" work speed may be 6% or greater and is dependent upon the pressure at the nip of the combining rollers 124 and 126. This speed difference would interfere with the cut-off blade in that the workpieces might be forced against the blade with a force which may be sufficient to prevent the blade from being returned by the action of spring 384, or to move the carriage beyond the limit set by the cut-out 419 of the rails 417, thereby preventing the carriage and cut-off blade from being returned in the properly phase relation required to restore the conditions existing at the beginning of the cut-off cycle.

Control means for feed chain speed and for limiting gap between workpieces

To eliminate the above difficulties, I provide the machine with two control means, one to bring the chain speed into sufficiently close synchronism with the actual work speed so as not to interfere with the cut-off cycle, and another control means to measure and limit the gap width to a value of one-half inch minimum to one inch maximum.

The speed matching or synchronizing is accomplished through the work-speed measuring roller 88, the differential 570, and the variable-speed transmission 480. Initially, the variable-speed transmission is set at a 1:1 ratio, so that its output shaft revolves at the same rate, and, as will be explained later, means are provided automatically to set the variable-speed transmission to precisely 1:1 ratio and to limit the speed of the output shaft 499 to a minimum value equal to the speed of the input shaft. The speed matching is accomplished as follows:

The workpieces 16 are forced into active driving contact with the work-speed-measuring roller 88 by the pressure roller 92 adjacent the brush station. These two rollers are placed as close to the combining rollers as possible in order that the speed-measuring roller 88 be under the control of the combining rollers 124 and 126 for as long a time as possible. As previously pointed out, the feed chain 18 moves the workpieces 16 to the nip of combining rollers 124 and 126, the feed lug on feed chain 18 at this point falling away from active engagement with the trailing edge of the workpiece. It will, therefore, be seen that, with the workpiece engaged by the rollers 124 and 126, the work-speed-measuring roller will be forced to rotate at a rate proportional to the actual work speed. As previously mentioned, this speed is introduced to input shaft 568 of the differential 570 through sprocket 562, chain 564, and sprocket 566, while chain speed is introduced at the input shaft 586 through bevel gearing 596, 594, sprocket 592, chain 590, and sprocket 588. At the beginning of a run the chain speed is less than the actual work speed, and, therefore, the two input shafts of the differential 570 are rotated at different rates, and the output shaft of the differential would, therefore, rotate at one-half the difference of the speed of the input shafts. This rotation of the output shaft 597 of the differential turns the speed-changing screw of the variable-speed transmission 480 to increase the speed of its output shaft 499, thereby increasing the speed of the feed chain 18 and the cut-off chains 414. The rotation of the speed-changing screw continues until the chains are brought into synchronism with work speed. At synchronism, the two input shafts of the differential rotate at the same rate, and, therefore, the output shaft 597 of the differential does not rotate. The output shaft 597 of the differential, when it is rotating, transmits motion to the speed-changing screw of the variable-speed transmission through the sprocket 598, mounted on the differential output shaft, the chain 599, and the sprocket 600 pinned to the speed-changing screw of the variable-speed transmission. It should be noted that minimum chain speed is always furnished to the work-speed input shaft 568 through the sprocket 572. The sprockets 572 and 566 are mounted on the hub of overrunning clutches 573 and 567, respectively, these clutches allowing the shaft 568 to be driven by the faster moving sprocket, that is, the shaft 568 will be driven by the sprocket 566 if this sprocket revolves faster than sprocket 572, and, conversely, the shaft 568 will be driven by sprocket 572 if this sprocket were to revolve faster than sprocket 566.

It should further be noted that, except for the short time when the gap between workpieces passes over the speed-measuring roller 88, the action of the differential is either to match work speed or to hold the setting, for it will be seen that, with the exception cited above, chain speed is introduced to each of the input shafts of the differential as the work is fed to the nip of the rollers 124 and 126, and the output shaft would remain stationary and, therefore, would not impart any motion to the speed-changing screw of the variable-speed transmission 480. Furthermore, the effect of the gap between workpieces passing over roller 88 is minimized since, as previously mentioned, the input shaft 568 is always driven at minimum chain speed through sprocket 572. It will be readily seen that, when the gap passes over roller 88, this roller could not impart any motion to the input shaft 568, and, therefore, the output shaft of the differential would rotate at a rate proportional to one-half chain speed in a direction to decrease the chain speed.

It is quite apparent from the above description that the differential acts to bring the speed of the feed and cut-off chains into close synchronism. As previously mentioned, exact synchronism is not essential to proper operation of the machine, and the chains are brought to as close a synchronism with work speed as will allow the cut-off blade to function properly without workpiece interference. To prevent the feed chain from being driven faster than work speed, the speed-measuring roller is accurately ground to a dimension which will allow the feed chain to come into close synchronism with work speed but never allow it to be brought to a speed equal to or greater than work speed. The gap will, therefore, increase gradually as successive workpieces are fed through the machine.

As hereinbefore pointed out, the gap width between workpieces is to be kept within a range of from one-half inch to one inch. Consequently, when the gap width has increased to the maximum for which the machine has been set up, which occurs after a run of, say, fifteen or twenty workpieces, the speed of the feed chain 18 is momentarily accelerated. This will, of course, restore the gap between workpieces to the minimum width of one-half inch, and, while it will immediately begin to increase again, another fifteen or twenty workpieces may be run through before the next gap-correcting operation is necessary.

Figure 4:
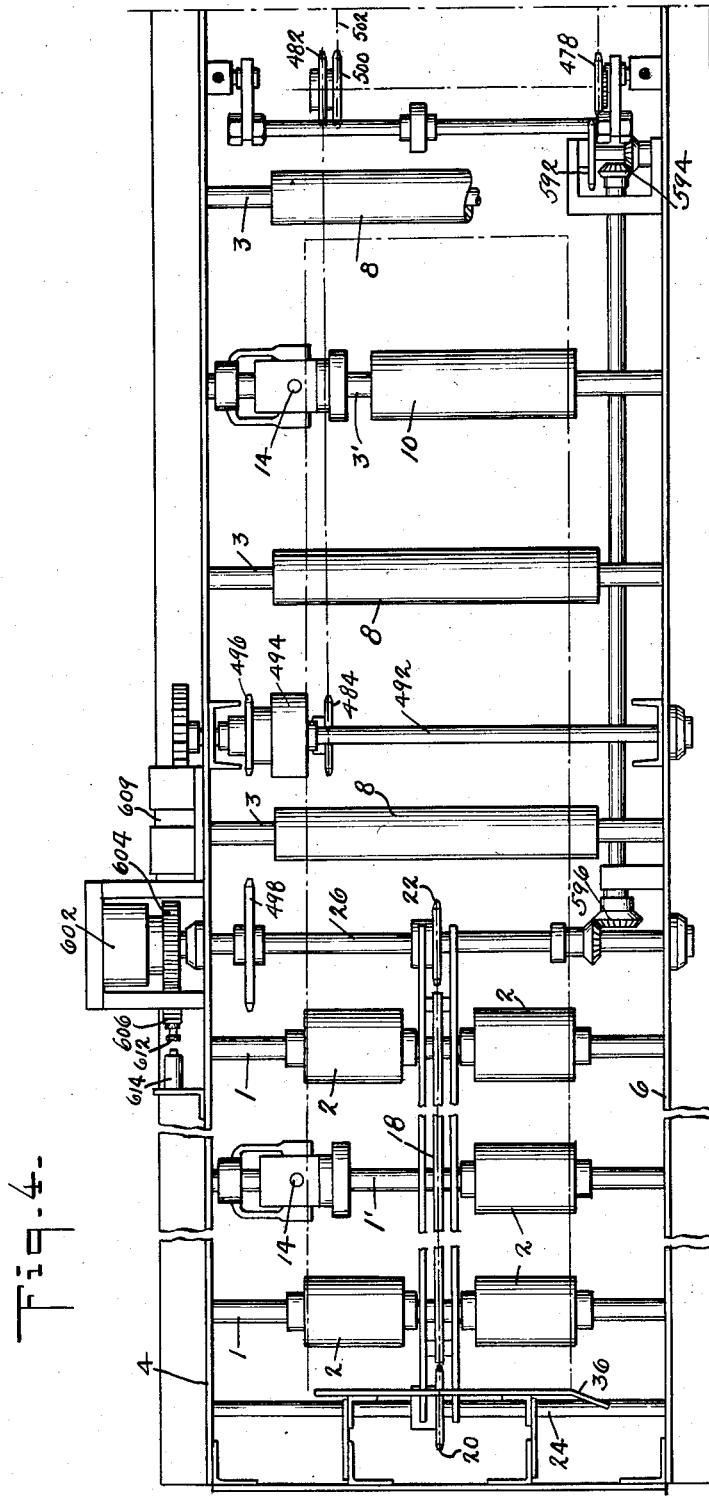
Figure 5:
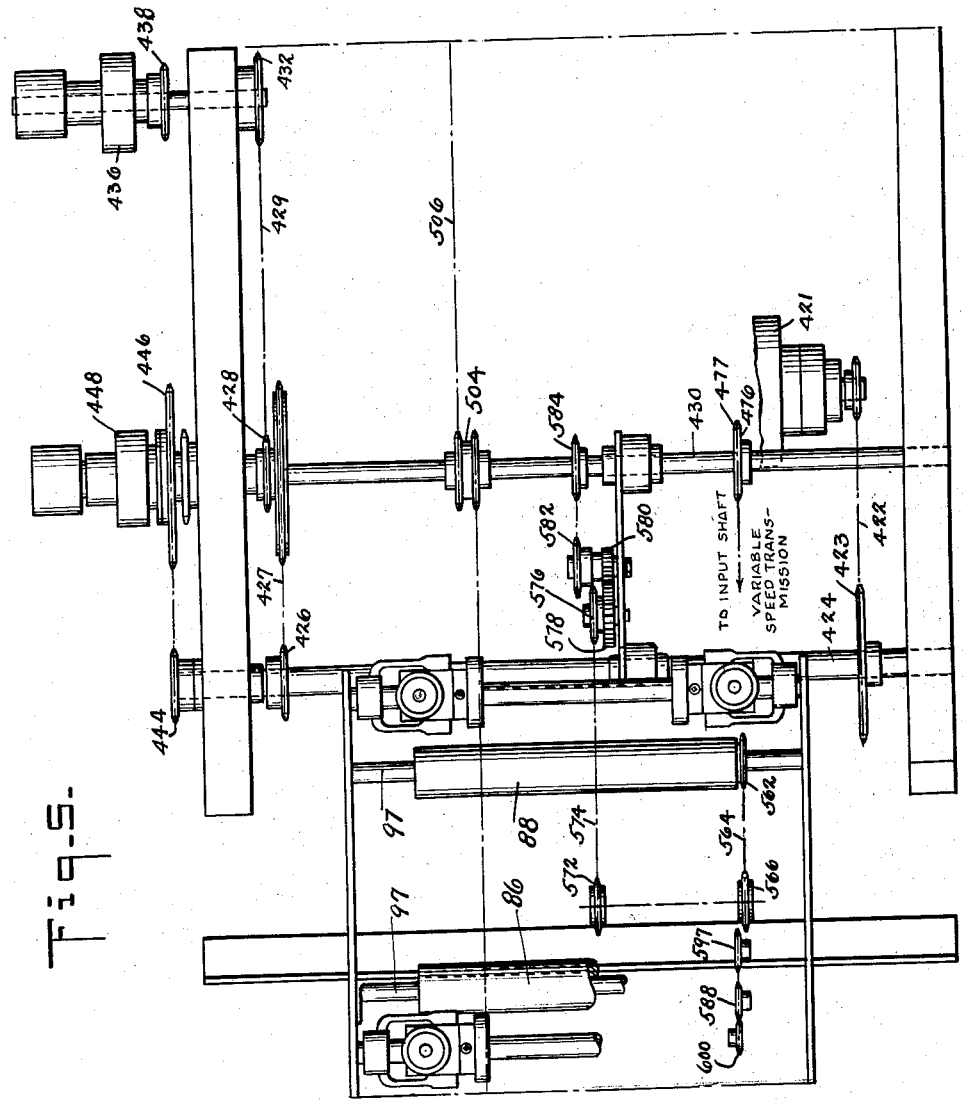

As will be seen from Figs. 4 and 43, for example an an overrunning clutch 602 is mounted on the feed chain shaft 26. On the hub of this clutch is a gear 604, meshing with a rack 606, carried by the piston rod 608 of an indexing, double-acting cylinder 609, which is controlled by a four-way solenoid valve 610 (shown schematically in Fig. 46). The outer end of the piston rod 608 of this cylinder carries an adjustable, threaded stud 612, cooperating with a switch 614, which acts in the control circuit of the four-way solenoid valve 610. This valve responds to signals from the control circuit, so that compressed air will be admitted in back of the piston of cylinder 609 to move the piston rod 608 on its outward stroke, for example, and then on the opposite side of the piston to retract the piston rod. The circuits for the control of solenoid valve 610 are controlled by the mechanism best illustrated in Figs. 16, 17, and 18 and to be referred to as the gap-sensing or gap-measuring station.

*Gap-sensing mechanism*

Referring to Figs. 16, 17, and 18, 616 designates a normally open switch, operative to energize the solenoid valve 610 when the width of the gap between successive workpieces 16 reaches or approaches the maximum for which the machine is set up. Mounted in the path of the workpieces 16 as they advance through the machine so as to be deflected thereby is a gap-sensing lever 618, fulcrumed at 620. This lever is urged to pivot counterclockwise by spring 622 each time the trailing end of a workpiece has passed it. Behind the lever 618, as viewed in Fig. 16, is a switch-actuating lever 624, fulcrumed at 626. The upper end of this lever 624 is forked to receive a pin 628, carried by the gap-sensing lever 618 below the fulcrum 620. The lower end of switch-actuating lever 624 is provided with an adjusting screw 630, which will engage switch-actuating stem 632 of the gap switch 616 when the gap between adjacent workpieces has reached a predetermined width, say, one inch.

As so far described, it will be seen that, as the leading end of each workpiece 16 engages the lever 618, the latter will be pivoted to the right, as viewed in Fig. 16, and will remain in that position until the workpiece clears it. It will then snap back into engagement with the leading end of the next workpiece, and if the gap between the two workpieces is below the maximum width, the lower end of the switch-actuating lever 624 will be prevented from depressing the switch stem 632 sufficiently to actuate the switch 616. On the other hand, if the width of the gap between workpieces has reached the maximum allowed, it will be apparent that the gap-sensing lever 618 can pivot to the left a sufficient distance to throw the switch-actuating lever 624 far enough to actuate the switch 616 to energize the solenoid valve 610 and admit air in back of the piston of cylinder 609 to move the piston rod 608 and rack 606 to the left (as viewed in Fig. 1) to effect acceleration of the feed chain 18 momentarily, thereby restoring the gap between following workpieces to the original minimum value of one-half inch.

As previously mentioned, to narrow the gap between successive workpieces, it is necessary to accelerate the work feed chain 18. This is possible since, as previously mentioned, the shaft 492, which drives the feed chain shaft 26, is provided with the overrunning clutch 494 and drives the sprocket 498, fixed to shaft 26 through sprocket 496, mounted on the hub of the overrunning clutch 494. This clutch will, therefore, allow the shaft 26 to overspeed the shaft 492 during the period of acceleration. The acceleration of the chain is accomplished by a quick stroke to the left of the cylinder-actuated rack 606. This rack drives gear 604, mounted on the hub of overrunning clutch 602, carried on shaft 26. The clutch 602 is arranged to drive the shaft 26 clockwise. It should be pointed out here that the pitch diameter of the gear 604 is substantially equal to the pitch diameter of the feed chain sprocket 22. Therefore, if the feed chain 18 were stationary, a one-half inch stroke of the cylinder 609 would move the chain lug forward one-half inch. However, in actual operation the chain 18 is continuously moving, so that the stroke of the cylinder 609 would have to be greater than one-half inch, and the piston speed would have to be considerably greater than the chain speed. The amount by which the chain is advanced or indexed during the accelerating period is equal to the stroke of the cylinder 609 less the distance the chain would have traveled under the drive of shaft 492 during the period of acceleration. Since the amount of indexing of the feed chain is a function of piston speed and piston stroke, provisions are made in the design of this machine to vary both of these two variables. The length of the stroke is varied by screwing the threaded stud 612 inward or outward in the rack 606, and the speed of the piston is controlled by speed-control valves (not shown) fitted to the exhaust ports of the four-way solenoid valve 610. It should be evident that, by adjusting either one or both of the above variables, a suitable combination of piston stroke and piston speed may be obtained to yield an indexing motion of one-half inch to the feed chain. At the end of its outward stroke, the rack 606 actuates the switch 614 through the stud 612. The switch 614 acts in the control circuit of the four-way solenoid valve 610 to actuate this valve to admit air on the opposite side of the piston to return the piston rod 608 and rack 606 to their initial positions, no motion being imparted to the shaft 26 during the return stroke of the rack 606, since the overrunning clutch 602 can only impart clockwise rotation to the shaft 26. The overrunning clutches used in this machine are of the well known cam and roller variety, and since these clutches can drive in one direction only, the indexing motion above described may be preformed without interference with the drive. It should also be pointed out at this time that this indexing motion does not affect the differential, since during the time of acceleration the workpiece is under the complete control of the feed chain 18, and, therefore, the speed of the cut-off chains 414 is not affected.

Occasionally in practice, the underside of a workpiece may be chipped—in effect, bevelled—and under such circumstances, when the bevel is at the trailing edge, it will be apparent that, unless means are provided to prevent it, the bevel will permit the lever 618 to snap back into initial position before the upper edge of the workpiece has cleared the sensing zone, so that gap correction would be made before the gap has actually reached maximum width. To prevent such an occurrence, I provide a vertically movable member 634 immediately behind 624, as viewed in Fig. 16. This member is forked at its upper end to accommodate the fulcrum 620 and slotted adjacent its lower end to accommodate fulcrum 626, the members 620 and 626 providing guides for the member 634. The extreme upper end of this slidable member 634 is bevelled, as shown at 636, so that, as each workpiece comes along, this slidable member will be depressed against the action of its spring 638 and will be returned to its initial position as soon as the workpiece clears it. The parts will function normally so long as the trailing end of each workpiece is normal. However, in the event that the underside of the trailing end of a workpiece has been damaged so that, instead of being square across the end, it is slightly undercut, it will be apparent that the slide 634 will begin to rise before the workpiece has fully cleared it. The lower end of the slide 634 is provided with a stop pin 640, adapted to engage the switch-actuating lever 624 along the face 623, when the slide is depressed, preventing lever 624 from functioning. Consequently, unless slide 634 is in its fully elevated position, lever 618 cannot pivot to the left, as viewed in Fig. 16, to engage the leading end of the next workpiece. With the trailing end of a workpiece bevelled, as assumed, it will be appreciated that the slide 634 will begin to rise when it engages the leading end of the bevel but will not move to its full upper position so as to free lever 618 until the upper edge of the workpiece has cleared the sensing zone.

Last-workpiece switch

At the gap-sensing station (best seen in Figs. 16, 17, and 18) I also provide a last-workpiece switch 642. This switch is operated by the bell crank 641, pivoted at 643. This switch acts in a circuit in conjunction with switch 722 automatically to stop the machine when the last workpiece of a run passes through the machine, as will be described later in connection with the wiring diagram.

In operation, this switch is held in the normally open position by the action of the workpieces acting on rollers 645, carried by the horizontal member of bell crank 641. These rollers are spaced apart a distance considerably greater than the maximum gap width, so that the gap will not have any effect on the bell crank 641. The bell crank 641 is urged clockwise to actuate the switch 642 by the action of spring 623'. It will readily be seen that, when the last workpiece of a run goes past the roller 645 closest to the pivot 643, the bell crank 641 is free to swing clockwise to actuate switch 642 by the action of tension spring 623'.

Back-up roller

The back-up roller 118 is carried in the vertically movable blocks 254, which also carry the roller 120. These blocks are raised and lowered through the medium of the pneumatically driven piston rod of pneumatic cylinder 211 (Fig. 2), which is controlled by the four-way solenoid valve 656, having "up" coil 658 and "down" coil 660.

By raising the back-up roller, the adhesive-applying roller can be run idly, if desired, to prevent setting up or hardening of the adhesive on the roller. In fact, as will be brought out hereinafter, it is possible to rotate the adhesive-applying roller while the rest of the machine is at rest and to run the machine with the back-up roller in raised position. This last feature is of importance in starting a run in that it enables make-ready workpieces to be run through the machine without coating the web 106, in order to bring the feed and cut-off chains into close synchronism with work speed.

As previously mentioned, the position of the back-up roller is controlled by the four-way solenoid valve 656. The control circuit for the solenoid valve contains the manually operated switch 646, the double-pole relay 668, the single-pole, double-throw relay 672, the double-throw switch 662, the coil of starter 648, and the starter contact for line 652. The double-throw switch 662 is operated by a dog on the operating rod 664 (Fig. 20) of the main drive clutch. The switch 662 is actuated so that, when the clutch is thrown out of driving engagement, the common 676 of switch 662 is placed on contact 675 of the switch, while, when the clutch is in driving engagement, the common 676 is on contact 674. When the machine is not operating, the back-up roller 118 is normally in its "up" position, away from the coating roller. It is clearly seen from Fig. 46 that, by manually opening the switch 644, the coil of relay 668 would be opened, and the four-way solenoid valve 656 would be electrically isolated from the rest of the circuit.

As will be described later, when the last workpiece of a run passes the switch 642, the machine will be automatically shut off. When this happens, the switch 644 is in its closed position (as required for automatic operation). At this point it is desirable to run the coating roller 114 in order to prevent the adhesive from setting up or hardening on the surface of the roller, and since no work is passing through the machine, it is further required that the back-up roller 118 be in its "up" position, so that the now stationary web 106 be kept away from the revolving roller 114 to prevent damage to the web. This is done by operating the rod 664 so as to throw the clutch 448 out of driving engagement. As previously mentioned, the dog on rod 664 will put the common 676 of switch 662 on contact 675, which will establish a circuit from line 650, the common 676, the contact 675, the coil of starter 648 to line 652. This circuit will energize the starter 648 to start the motors 421 and 84. With starter 648 closed, the coil circuit of relay 668 is energized by a circuit from line 652, the closed contact of starter 648, the closed switch 644, the coil of relay 668 to line 650, thereby closing the contacts of relay 668. Relay 672 will be de-energized, since its coil circuit is opened at switch 662, the common 676 having been moved away from contact 674. With relay 672 open and relay 668 closed, the "up" coil 658 of solenoid valve 656 is energized by a circuit from line 652, the closed contact 670 of relay 668 to one side of the "up" coil 658, through coil 658, the contact of relay 672 at position 682, through the closed contact 678 of relay 668 to line 650. With the "up" coil 658 of valve 656 energized, the back-up roller 118 will be raised away from the coating roller 114. The coating roller 114 will be driven, however, since the starter 648 has been energized to run the motor. The rest of the machine is, of course, at rest, since the clutch 448 has been thrown out, and the shaft 430 is, therefore, at rest. It will be apparent that the feed chain, the combining rollers, the cut-off chains, and the discharge conveyor are at rest, since these elements take their drive from saft 430, as previously described in connection with the drive of the machine. It will be seen from Fig. 43 that, with motor 421 running, the coating unit will be driven from the motor sprocket chain 422, sprocket 423 fixed to shaft 424, sprocket 426 fixed to shaft 424, chain 427, to compound sprocket 428 idling on shaft 430, chain 429, sprocket 432 fixed to shaft 434, the clutch 436 keyed to shaft 434, the sprocket 438 keyed to the hub of clutch 436, the chain 440, to sprocket 442 keyed to the shaft of coating roller 114.

It is evident, therefore, that the coating roller may be run with the back-up roller 118 in its "up" position, while the other parts of the machine are at rest.

*Operation*

In starting up, the button of the two-circuit push button station 646 is pushed and held until a workpiece is fed over the lever 641 of the last-workpiece switch 642. Operating the button 646 energizes the coil of the magnetic starter 648 of the main drive motor 421. Closing the starter 648 will effect energization of the starter 649 of the brush motor 84, since its coil circuit is on the load side of starter 648. When the first workpiece depresses the lever of last-workpiece switch 642, the push button of 646 may be released, and the main drive motor 421 and brush motor 84 will continue to run in that a holding circuit will have been established to starter 648 from line 650, the now closed last-workpiece switch 642, coil of starter 648, to line 652.

At the end of a run, when the trailing end of the last workpiece clears the lever 641 of last-workpiece switch 642, the switch will open and tend to open the coil circuit of the starter 648. However, a circuit is maintained for the starter 648 through switch 722, which is wired in parallel to switch 642.

Assuming that the main driving motor 421 is running, the main drive clutch 448 may be engaged by operating clutch-operating rod 664 (Fig. 20) to drive the loading or feed chain 18, combining rollers 124 and 126, and discharge conveyor 325, etc. The back-up roller 118 and associated parts are in "up" position. In engaging the main drive clutch 448, a circuit is established from line 650, through coil of relay 668, normally closed switch 644, the contact starter 648, to line 652, to energize the coil of relay 668. The relay 668 closes to establish a circuit from the line 650, common 676, contact 674 of switch 662, the coil of relay 672, contact 670 of relay 668, to line 652. The relay 672 now being energized, the "down" coil 660 of the back-up roller solenoid valve 656 is energized. The circuit for the coil 660 may be traced from line 650, the now closed contact 678 of relay 668, the now closed contact 680 of relay 672, "down" coil 660 of the solenoid valve 656, the now closed contact 670 of the relay 668, to line 652. This will bring the back-up roller 118 and the web 106 down into cooperative relation to the coating roller 114. When the last workpiece moves past the lever 641 of the last-workpiece switch 642, the motor 421 will be de-energized, as previously described, opening the circuit of the coil of relay 668; the contacts 670 and 678 of this relay open, thereby opening the circuit of the coil of relay 672. As relay 672 is de-energized, the contact of relay 672 goes to position 682, and the solenoid valve 656 is disconnected from line 652 at the now open relay 668.

The last-workpiece switch 642 is opened after the cut-off cycle is initiated, but before the latter is completed. It is, therefore, necessary to maintain the drive until the cut-off cycle is completed, when an automatic shut-down of the machine is effected by the switches 642 and 722. This is accomplished as follows:

Before the cut-off cycle is started, the switch 722 is held open by the blade carriage 364. When the cut-off cycle is initiated, the carriages move away, and switch 722 closes. Switch 642 opens as the trailing edge of the last workpiece passes past the lever 641, but the circuit to the coil of the starter 648 is maintained through the now closed switch 722. As the cut-off cycle is completed and the carriages 364 are returned to initial position, switch 722 is opened, thereby breaking the coil circuit of starter 648 to stop the machine.

At this point the whole machine is at rest, but the back-up roller 118 is still in the "down" position. As previously pointed out, to prevent adhesive from setting up on the coating roller, it is desired to keep the coating roller 114 in motion and at the same time have the back-up roller in "up" position, away from the coating roller. To accomplish this, the main drive clutch 448 is disengaged, and the dog on the clutch-actuating rod 664 will act on switch 662 to start the motor and at the same time actuate the solenoid valve 656 to bring the back-up roller 118 to its "up" position.

As already pointed out, the gap between successive workpieces is constantly being measured by the apparatus illustrated in Fig. 16, for example, and when the gap width reaches the maximum—one inch, for example, then the feed chain 18 is momentarily accelerated through the medium of the piston rod 608, controlled by the solenoid valve 610.

Referring to the electrical side of this feature of my invention and with particular reference first of all to Fig. 16 and the wiring diagram of Fig. 46. As already explained, the lever 618 of the gap-measuring system is deflected to the right, as viewed in Fig. 16, each time the leading end of a workpiece engages it and is held deflected until the trailing edge of the workpiece clears it. During this period, switch 616 remains open, inasmuch as it is not engaged by actuating lever 624. As the trailing edge of a leading workpiece clears the lever 618, the lever will snap to the right under the action of its spring 622, so as to engage the leading end of the next workpiece. If the gap between the two workpieces does not exceed one inch in width, this return movement of the lever 618 is too short to cause lever 624 to engage the switch 616 and the latter remains open. However, if the gap width is one inch, then the lever 618 moves far enough to cause lever 624 to close the switch 616 momentarily, the switch opening again as the workpiece passes over the lever 618. On this momentary closure of the switch 616, single-pole, double-throw relay 684 is closed, a circuit being established to the coil of this relay from line 650, coil of relay 684, switches 614 and 616, and switch 686 operated by a second dog on the operating rod 664 of the main clutch 448, the normally closed contacts of push button 646, through closed contact of starter 648, to line 652. With the relay 684 closed, the "out" coil 688 of solenoid valve 610 is energized from line 650, the contact of relay 684 at position 690, through "out" coil 688, to line 652. Simultaneously with the closing of relay 684, a single-pole, double-throw relay 692 closes. The circuit to the coil of relay 692 is from line 650, the contact of relay 684 at position 690, the coil of relay 692, to line 652. The closing of the relay 692 establishes a holding circuit to the coil of relay 684, which allows the piston rod 608 to go through its cycle of operation without regard to the length of time switch 616 remains closed. This holding circuit for the coil of relay 684 may be traced from line 650, coil of relay 684, switch 614, closed contact of relay 692, to line 652.

The energizing of the "out" coil 688 of the solenoid valve 610 causes the piston rod 608 and rack 606 to move outwardly so as to advance or accelerate the feed chain 18. As the piston rod approaches the end of its outstroke, the stud 612 opens switch 614, which will open the coil circuit of relay 684. As relay 684 opens, relay 692 also opens, since its coil circuit is disconnected from line 650 by the contact of relay 684, which is now at position 696. Opening of relay 684 will energize the "in" coil 694 of solenoid valve 610 from line 650, contact of relay 684 at position 696, through the "in" coil 694, to line 652. This will cause the piston rod 608 and rack 606 to be retracted to original position.

When the last workpiece has been fed through the machine and the main drive clutch 448 disengaged to run the coating roller 114, as above described, switch 686 is opened, thereby opening the circuits of the accelerating mechanism for the feed chain 18. The switch 686 is operated by the second dog on the actuating rod 664 of the main drive clutch 448, the arrangement being such that, when the actuating rod is operated to disengage the clutch, the switch 686 is operated. Opening of the switch 686 will prevent the continuous operation of the indexing cylinder 609 when no workpieces are going through the machine and the driving motor is energized to drive the coating roller 114.

The cut-off blade 340 at the beginning of its working cycle is in raised position, as already explained. It is necessary that the blade be moved downward on its cutting stroke and forward at the same time in the direction of travel of the work. After the cut-off, the blade is retracted and moved back to its original position, ready for the next cycle.

Mechanism for initiating cut-off cycle

Referring to Fig. 33, it will be seen that I provide switch-controlling mechanism to be engaged by the leading edge of each workpiece just before it reaches the cut-off station. The function of this mechanism is to initiate the cut-off cycle.

This mechanism comprises a bell crank 700, fixed to a shaft 702, which is pivotally mounted in block 701, fixed to tie rod 703. One arm of the bell crank 700 is connected with switch-actuating lever 705 by the connecting link 706. The lever 705 is pivoted at 708 and carries roller 707 above the switch actuator 710 of micro-switch 712, this switch being wired normally open. The bell crank 700 is urged counterclockwise against stop pin 709, carried in block 701, by spring 714. The block 701 and, therefore, the bell crank 700 and all other elements carried by the block are away from the path of the workpieces. The shaft 702, however, extends transversely inwardly toward the center of the machine. Pinned to its inner extremity, the shaft 702 carries short lever 711, this lever, of course, being in the path of the workpieces.

In operation, the leading edge of a workpiece comes in contact with lever 711, pivoting the lever, shaft 702, and bell crank 700 in a clockwise direction against the action of spring 714. These parts remain in this deflected position until the workpiece clears the lever, when they will be pivoted counterclockwise by the spring 714 as lever 711 swings in the gap between successive workpieces. The counterclockwise rotation of lever 711, shaft 702, and bell crank 700 is limited by the stop pin 709. Deflecting the bell crank 700 in the clockwise direction will, through the lever system described, close the normally open switch 712, and this switch will remain closed during the greater part of the work cycle. As the switch 712 closes, it will close a circuit to the coil of a single-pole, single-throw, normally closed relay 716, to close a circuit to a solenoid 718, whose plunger is attached to the trip lever 720 (Fig. 41) of the single-revolution clutch 536.

The cutting cycle is completed in one revolution of the clutch 536, which is equivalent in time to one-fifth of the work cycle. The solenoid 718, therefore, must be de-energized before one-fifth of a work cycle is elapsed, in order that the trip lever 720 of the clutch 536 may be restored to initial position in time to stop the clutch 536 at the end of one revolution. While the switch 712 remains closed until the workpiece which closes it clears the lever 711, it will be apparent, however, that the solenoid 718 does not remain closed. From the wiring diagram it will be seen that initial closure of switch 712 closes the circuit to the solenoid 718, and that it also at the same time closes a circuit to the relay 716. These circuits are in parallel and are arranged so that the solenoid 718 remains energized only momentarily, since its energizing relay 716 opens its normally closed contact, thereby opening the circuit to the solenoid coil, so that the trip lever 720 of clutch 536, while it is retracted out of operative position with respect to the clutch, is almost immediately placed under the action of spring 721 to restore it to its initial position, even though the switch 712 remains closed. The solenoid 718 cannot be energized again until the lever 711, which closed the switch 712, is allowed to swing counterclockwise as the trailing edge of a workpiece passes this lever and the lever swings to its initial or upright position in the gap between adjacent workpieces, opening switch 712 and de-energizing relay 716. As the next workpiece deflects the lever 711, the cycle will again be initiated.

As previously pointed out, when the trailing end of the last workpiece passes the lever 641 of the last-workpiece switch 642, this switch opens. The switch 642 is in the coil circuit of the starter 648 for the motor 421. In operation, the switch 642 opens after the cut-off cycle is started, but before it is completed. To prevent opening of the motor circuit at the starter 648 by opening of switch 642 before the cut-off cycle is completed, I provide the switch 722, which is wired normally closed and in parallel to switch 642. As previously mentioned, the switch 722 is held open by the blade carriage 364 until the cut-off cycle is started. As soon as the cut-off cycle is initiated, the carriage moves away from the switch 722, allowing this switch to close. It will be seen, therefore, that, while the last-workpiece switch 642 opens when the last workpiece passes it, the circuit of the motor 421 will remain closed through switch 722, and the motor will continue to run until the blade carriage returns to starting position and opens the switch 722, whereupon the machine stops.

Lateral adjusting mechanism is provided for the rollers 170 and 173, both of which are beyond the combining rollers 124 and 126 but short of the cut-off station. This construction is identical with the side roller adjustment at the infeed end of the machine, already described, and, hence, has not been illustrated in detail. By making the rollers 170 and 173 laterally adjustable, different widths of workpieces will be fed properly to the cut-off station.

From all of the foregoing it will be appreciated that I have provided a machine for combining flexible sheet material in the web progressively with workpieces which are fed successively through the machine in slightly spaced relation.

It will be appreciated also that I have provided means operating automatically for maintaining the gap between successive workpieces within a certain range. This is necessary due to the fact that in the first part of their travel the workpieces are advanced at a certain linear speed, but as their leading ends move into the nip of the combining rollers, the workpieces are accelerated due to the peripheral speed of these rollers being higher than the linear speed of the workpieces before reaching the rollers. This will cause the gap between workpieces to increase in width, so that the automatic means above referred to will periodically restore the gap to initial width.

It will be appreciated also that means are provided for shutting off the machine automatically at the end of a run; means being provided also for effecting raising of the back-up roller for the adhesive-applying roller in order that the adhesive-applying roller may be allowed to rotate out of contact with the sheet material to prevent undesirable setting up of the adhesive on the adhesive-applying roller.

It will be appreciated furthermore that I have provided means whereby the cut-off blade not only moves downwardly through the sheet material at the proper time but at the same time moves forwardly at workpiece speed. It will be seen also that the blade rises and returns to its original position ready for the next cut-off cycle in timed relation to the length of the workpieces, so that the cut-off will occur in the gap between successive workpieces.

I wish it to be understood that changes may be made in the details of construction and arrangement of parts above described without departing from the spirit and scope of my invention.

What I claim is:

1. In a machine for applying a continuous length of flexible sheet material to one face of a plurality of flat workpieces as the workpieces are advanced successively through the machine, the combination of a loading station or magazine for a plurality of workpieces; positively actuated work-feeding means at the loading magazine for moving the workpieces successively from the said magazine and advancing them successively in spaced relation; driven combining and work-advancing rollers in the path of the advancing workpieces functioning to receive the workpieces successively from said feeding means and effect their further advance at a speed higher than the linear speed imparted to them by said work-feeding means, thereby gradually widening the gap between successive workpieces; and means operating when the gap width reaches a predetermined maximum momentarily to accelerate the said work-feeding means to reduce the gap to substantially its initial minimum.

2. In a machine for combining flexible sheet material with one face of slab-like workpieces as the latter are advanced successively in spaced relation through the machine, the combination of a loading station or magazine for a plurality of workpieces; work-feeding means at the loading station for successively moving workpieces from the said magazine and advancing them in succession and in spaced relation; means in the path of the advancing workpieces functioning to receive the workpieces successively from the feeding means and effect their further advance at an accelerated speed while the sheet material is being applied, thereby gradually widening the gap between successive workpieces; and a gap-sensing device intermediate the loading station and the said work-accelerating means for measuring the gap between successive workpieces as they pass said device and operable when the gap width reaches a predetermined maximum to initiate a momentary acceleration of the said work-feeding means to reduce the gap width to substantially its original minimum.

3. In a machine for combining flexible sheet material with one face of slab-like workpieces as the latter are advanced successively in spaced relation through the machine, the combination of a loading station or magazine adapted to receive a stack of workpieces; a driven, lug-carrying chain at the loading station for successively removing workpieces from the bottom of the stack and advancing them successively in spaced relation; means in the path of the advancing workpieces functioning to receive the workpieces successively from the feeding means and effect their further advance at an accelerated speed, thereby gradually to widen the gap between successive workpieces; and a gap-sensing device intermediate the loading station and the said work-accelerating means for initiating an increase in the speed of said chain momentarily whenever the gap between successive workpieces reaches a predetermined maximum, thereby to reduce the gap width substantially to minimum.

4. In a machine for combining flexible sheet material with one face of slab-like workpieces as the latter are advanced successively through the machine, the combination of a loading station adapted to receive a stack of workpieces; a driven chain at the loading station for successively removing workpieces from the bottom of the stack and advancing them in spaced relation; a pair of rollers in the path of the advancing workpieces for receiving the workpieces from the chain, combining the workpieces with the flexible material, and continuing the advance of the workpieces at a speed higher than that imparted to them by said chain, whereby the gap between successive workpieces gradually increases; and gap-sensing means intermediate the loading station and said rollers, controlled by the gap between successive workpieces, said gap-sensing means initiating momentary acceleration of said chain when the gap between workpieces reaches a predetermined maximum, thereby to restore gap width to a predetermined minimum.

5. In a machine for applying a continuous length of flexible sheet material to one face of a plurality of slab-like workpieces as the latter are advanced successively through the machine in spaced relation, the combination of a loading station; feeding means for moving the workpieces successively out of the loading station and advancing them in spaced relation; means in the path of the advancing workpieces for receiving the same from the feeding means, applying the sheet material, and continuing the advance of the workpieces in spaced relation; and cut-off means beyond the last-mentioned means moving across the path of the advancing workpieces and in the same direction as the workpieces in such timed relation to the linear speed of the workpieces as to sever the sheet material at the gap between successive workpieces.

6. In a machine for applying a continuous length of flexible sheet material to one face of each of a plurality of slab-like workpieces as the latter are advanced successively through the machine in spaced relation, the combination of a loading station; feeding means for moving the workpieces successively out of the loading station and advancing them in spaced relation; means in the path of the advancing workpieces for receiving the same from the feeding means, applying the sheet material, and continuing the advance of the workpieces in spaced relation; and a cut-off blade beyond the last-mentioned means moving across the path of the advancing workpieces and laterally in the direction of travel of the workpieces at the linear speed of the workpieces to sever the sheet material at the gap between successive workpieces.

7. In a machine for combining flexible sheet material with one face of slab-like workpieces as the latter are advanced successively through the machine, the combination of a loading station or magazine; a pair of cooperating combining rollers; feeding means for moving the workpieces successively out of the loading station and advancing them in spaced relation to the nip of the combining rollers, said combining rollers progressively combining the sheet material with the upper face of each workpiece and accelerating the advance of the workpieces, thereby increasing the gap between workpieces; a cut-off blade beyond said rollers; carriages carrying said blade; means for moving said carriages in the direction of travel of the workpieces to impart lateral movement to the said cut-off blade; means for moving the blade in a vertical plane across the path of the advancing workpieces during said lateral movement of the blade; and means for synchronizing the speed of feed of the workpieces and the cut-off mechanism with work speed so that the cut-off blade will sever the sheet material at the gap between successive workpieces.

8. In a machine for applying a continuous length of flexible sheet material to one face of slab-like workpieces as the latter are advanced successively through the machine, the combination of a loading station or magazine; work feeding means for moving the workpieces successively out of the loading station or magazine and advancing them successively in spaced relation; means in the path of the workpieces for successively receiving the workpieces from said feeding means and continuing their advance at an accelerated speed while effecting application of the sheet material to the workpieces; a transversely extending cut-off blade beyond the combining station; carriages for mounting said blade above the plane of travel of the workpieces; means for driving said carriages forward in the direction of travel of the workpieces in a plane parallel to the plane of travel of the workpieces; means to impart a downward movement to the blade simultaneously with its lateral movement; a motor; a driving connection between said motor and said feeding means and between said motor and carriages; and a work-speed measuring roller engaged and driven by the successive workpieces for synchronizing the speed of the feeding means and cut-off mechanism with work speed, to effect operation of said cut-off blade at the gap between successive workpieces and while the blade is moving laterally in the direction of travel of the workpieces at substantially the linear speed of the workpieces.

9. In a machine for combining flexible sheet material with one face of flat workpieces as the latter move successively through the machine in spaced relation, the combination of a loading magaine; driven means for advancing the workpieces from the magazine successively in spaced relation; means for receiving the workpieces successively from the said advancing means and continuing their advance at an increased linear speed whereby the spacing of the workpieces is gradually increased; rack and pinion mechanism adapted intermittently to accelerate the first-mentioned work-advancing means; an electric control for said accelerating means comprising a normally open switch; a lever in the path of the advancing workpieces adapted to be deflected by each workpiece and remain deflected until cleared by the trailing end of each workpiece; and a spring for moving the lever toward initial position, after deflection by a workpiece, until engaged by the leading end of the next workpiece, the movement of said lever toward initial position when the gap between successive workpieces reaches a predetermined maximum being sufficient to close said switch, thereby to initiate momentary operation of said accelerating means momentarily to accelerate the first-mentioned work-advancing means to restore the gap between successive workpieces to initial width.

10. In a machine for combining flexible sheet material with one face of flat workpieces as the latter move successively through the machine in spaced relation, the combination of a loading magazine; a lug-carrying chain for advancing the workpieces successively from the magazine in spaced relation; means for receiving the workpieces from said chain and continuing their advance at an increased linear speed, whereby the spacing of the workpieces is gradually increased; a main driving motor for driving said chain and said last-mentioned advancing means, the driving connection between said motor and chain comprising a differential and a cooperating variable-speed drive, whereby the linear speed of said chain may be accelerated without varying the speed of the said last-mentioned advancing means; rack and pinion mechanism for momentarily accelerating said chain; an electric control for said rack and pinion including a normally open switch; and a switch-closing lever in the path of the advancing workpieces and adapted to be deflected thereby, said lever, upon clearing the trailing end of one workpiece, moving automatically toward initial position until it is engaged by the leading end of the next workpiece, the movement of said lever from the trailing end of one workpiece into engagement with the leading end of the next workpiece being sufficient, when the gap between successive workpieces reaches a predetermined maximum, to close said switch, thereby to effect actuation of said rack and pinion mechanism momentarily to accelerate said chain, to restore the gap between successive workpieces to normal.

11. In a machine for progressively combining flexible sheet material with one face of flat workpieces as the latter are advanced through the machine, the combination of a loading magazine; work-forwarding means for advancing the workpieces out of said magazine successively and in spaced relation; means in the path of the advancing workpieces to receive the same from said forwarding means and to continue their advance at an accelerated speed whereby the gap between workpieces gradually increases in width; and gap-sensing mechanism in the path of the workpieces for measuring the gap between successive workpieces, said mechanism comprising a lever in the path of the workpieces and adapted to be deflected thereby about an axis transverse of the path of travel of the workpieces, a spring for pivoting the lever into contact with the leading end of a workpiece piece has cleared it, a second pivoted lever adapted to be actuated by the first lever, a switch for initiating acceleration of the work-advancing means, said switch being normally open and adapted to be closed by the second lever when the travel of the first lever exceeds a predetermined distance due to excessive gap width between successive workpieces, thereby to effect momentary acceleration of the first-mentioned forwarding means to restore the gap between workpieces to initial width; a spring-loaded, vertically movable slide adapted to be depressed by each workpiece, and a stop carried by said slide and cooperating with said second lever to prevent pivoting of said second lever until the trailing end of a workpiece has cleared the slide.

12. In a machine for combining flexible sheet material progressively with one face of workpieces passing through the machine, the combination of means for advancing the workpieces successively and in spaced relation through the machine; an electric motor for driving said advancing means; a manual switch for starting said motor; a last-workpiece switch adjacent the discharge end of the machine in position to be closed and held closed by the advancing workpieces; a holding circuit for the driving motor controlled by said last-workpiece switch to permit the manual switch to be released as soon as a workpiece has engaged the last-workpiece switch; and a third switch wired in parallel to said second switch for maintaining the circuit of the driving motor closed after the last workpiece of a run has passed through the machine.

13. In a machine for combining flexible sheet material progressively with one face of workpieces passing successively through the machine, the combination of means for advancing the workpieces successively and in spaced relation through the machine; an electric motor driving said advancing means; cut-off mechanism comprising carriages for a cut-off blade, said carriages being driven by said motor; a last-workpiece switch in the circuit of said motor held closed by the workpieces but opening after the last workpiece has passed it; and a second switch wired in parallel to the last-workpiece switch for maintaining the motor circuit closed after said first switch has opened, said carriages holding said second switch open initially, said second switch closing on movement of the carriages after operation of the cut-off mechanism has been initiated, and return of said carriages to their original position after completion of the cut-off cycle again opening the second switch, whereby the motor circuit will be opened after the last workpiece has passed through the machine.

14. In a machine for combining flexible sheet material progressively with one face of workpieces passing successively through the machine in spaced relation, the combination of means for advancing the workpieces through the machine; a combining station at which the workpieces and sheet material are progressively combined; a cut-off station beyond the combining station where the sheet material is severed between successive workpieces; and switch-controlling mechanism adapted to be engaged by the leading end of each workpiece just before it reaches the cut-off station to initiate the cut-off cycle.

15. In a machine for applying a continuous length of flexible sheet material successively to one face of a plurality of flat workpieces as the workpieces are advanced successively through the machine, the combination of a loading station or magazine for a plurality of workpieces; work-feeding means for moving the workpieces successively from said magazine and advancing them in spaced relation; means in the path of the advancing workpieces functioning to receive the workpieces successively from the feeding means and effect their further advance at an accelerated speed while the sheet material is being applied, thereby gradually widening the gap between successive workpieces; and means operating when the gap width reaches a predetermined maximum, momentarily to accelerate the work-feeding means to reduce the gap to approximately its initial minimum.

16. In a machine for applying a continuous length of flexible sheet material to one face of a plurality of flat workpieces as the workpieces are advanced successively through the machine, the combination of a loading station or magazine; work-feeding means for moving the workpieces successively from said magazine and advancing them successively in spaced relation; means in the path of the workpieces for successively receiving the workpieces from said feeding means and continuing their advance at an accelerated speed while effecting application of the sheet material to the workpieces; cut-off mechanism beyond said last-mentioned means; a motor; a driving connection between said motor and feeding means and between said motor and cut-off mechanism; and means operating automatically to synchronize the speed of the feeding means and the cut-off mechanism with work speed to effect operation of the cut-off mechanism at the gap between successive workpieces.

17. In a machine for applying a continuous length of flexible sheet material to one face of a plurality of flat workpieces as the workpieces are advanced successively through the machine, the combination of a loading station or magazine; work-feeding means for moving the workpieces successively from said magazine and advancing them successively in spaced relation; means in the path of the workpieces for successively receiving the workpieces from said feeding means and continuing their advance at an accelerated speed while effecting application of the sheet material to the workpieces; cut-off mechanism beyond said last-mentioned means; a motor; a driving connection between said motor and feeding means and between said motor and cut-off mechanism; and a work-speed-measuring roller engaged by the successive workpieces and driven thereby for effecting synchronization of the speed of the feeding means and the cut-off mechanism with work speed, thereby to effect operation of the cut-off mechanism at the gap between successive workpieces.

18. In a machine for applying a continuous length of flexible sheet material to one face of a plurality of flat workpieces as the workpieces are advanced successively through the machine, the combination of a loading station or magazine; work-feeding means for moving the workpieces successively from said magazine and advancing them successively in spaced relation; means in the path of the workpieces for successively receiving the workpieces from said feeding means and continuing their advance at an accelerated speed while effecting application of the sheet material to the workpieces; cut-off mechanism beyond said last-mentioned means; a driving motor common to the said work-feeding means and said cut-off mechanism; a work-speed-measuring roller engaged and driven by the successive workpieces; and means, including an interconnected differential and speed-changing device intermediate the work-speed-measuring roller and said feeding means and said cut-off mechanism, to synchronize the speed of the feeding means and the cut-off mechanism with work speed, to effect operation of the cut-off mechanism at the gap between successive workpieces.

19. In a machine for applying a continuous length of flexible sheet material to one face of a plurality of flat workpieces as the workpieces are advanced successively through the machine, the combination of a loading station or magazine; work-feeding means for moving the workpieces successively from said magazine and advancing them successively in spaced relation; means in the path of the workpieces for successively receiving the workpieces from said feeding means and continuing their advance at an accelerated speed while effecting application of the sheet material to the workpieces, the accelerated speed of the workpieces gradually increasing the gap between successive workpieces; gap-sensing means in the path of the advancing workpieces for intermittently accelerating the work-feeding means when the gap between workpieces reaches a predetermined width, to reduce the gap between successive workpieces to a predetermined minimum width; cut-off mechanism beyond the point of application of the flexible sheet material to the workpieces; and means engaged by the accelerated workpieces for synchronizing the speed of the feeding means and cut-off mechanism with work speed, to effect operation of the cut-off mechanism at the gap between successive workpieces.

20. In a machine for applying a continuous length of flexible sheet material to one face of a plurality of flat workpieces as the workpieces are advanced successively through the machine, the combination of a loading station or magazine; work-feeding means for moving the workpieces successively from said magazine and advancing them successively in spaced relation; means in the path of the workpieces for successively receiving the workpieces from said feeding means and continuing their advance at an accelerated speed while effecting application of the sheet material to the workpieces, the accelerated speed of the workpieces gradually increasing the gap between successive workpieces; gap-sensing means in the path of the advancing workpieces for intermittently accelerating the work-feeding means when the gap between workpieces reaches a predetermined width, to reduce the gap between succeeding workpieces to a predetermined minimum width; cut-off mechanism beyond the point of application of the flexible sheet material to the workpieces; and a roller engaged and driven by the accelerated workpieces for bringing the speed of the feeding means and cut-off mechanism into synchronism with work speed, to effect operation of the cut-off mechanism at the gap between successive workpieces.

References Cited in the file of this patent

UNITED STATES PATENTS

| | | |
|---|---|---|
| 789,776 | White | May 16, 1905 |
| 1,302,352 | French | Apr. 29, 1919 |
| 1,394,613 | Drury | Oct. 25, 1921 |
| 1,417,117 | Tyler | May 23, 1922 |
| 1,772,580 | Swift | Aug. 12, 1930 |
| 2,133,542 | Jensen | Oct. 18, 1938 |
| 2,541,591 | Lemmon | Feb. 13, 1951 |
| 2,565,868 | Mann et al. | Aug. 28, 1951 |
| 2,654,687 | Fridolph | Oct. 6, 1953 |
| 2,765,838 | Brown | Oct. 9, 1956 |